US008849784B2

(12) United States Patent
Alber et al.

(10) Patent No.: US 8,849,784 B2
(45) Date of Patent: Sep. 30, 2014

(54) STORAGE TAPE ANALYTICS USER INTERFACE WITH MEDIA VALIDATION

(71) Applicant: Oracle International Corporation, Redwood City, CA (US)

(72) Inventors: Chad Norman Alber, Boulder, CO (US); Jitesh Baku Jhatakia, Superior, CO (US); Michael Paul Abramovitz, Thornton, CO (US); John Mitchell Black, III, Loveland, CO (US); Cathleen Susan Wharton, Superior, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/169,485

(22) Filed: Jan. 31, 2014

(65) Prior Publication Data
US 2014/0146650 A1 May 29, 2014

Related U.S. Application Data

(63) Continuation-in-part of application No. 13/627,016, filed on Sep. 26, 2012.

(60) Provisional application No. 61/541,372, filed on Sep. 30, 2011.

(51) Int. Cl.
G06F 17/30 (2006.01)
G11B 5/008 (2006.01)
G11B 27/36 (2006.01)
G11B 27/00 (2006.01)
G11B 27/34 (2006.01)
G11B 27/10 (2006.01)

(52) U.S. Cl.
CPC ............ G11B 27/36 (2013.01); G11B 5/008 (2013.01); G11B 2220/90 (2013.01); G11B 27/002 (2013.01); G11B 27/34 (2013.01); G11B 27/105 (2013.01)
USPC ............... 707/705; 707/E17.001; 369/53.41

(58) Field of Classification Search
CPC ...... G11B 27/105; G11B 27/34; G11B 27/36; G06F 17/30197
See application file for complete search history.

(56) References Cited

U.S. PATENT DOCUMENTS

2005/0044451 A1* 2/2005 Fry et al. ............... 714/38
2006/0023275 A1* 2/2006 Feiner et al. .......... 358/527
2008/0198489 A1* 8/2008 Ballard et al. .......... 360/31

* cited by examiner

Primary Examiner — Anteneh Girma
(74) Attorney, Agent, or Firm — Marsh Fischmann & Breyfogle LLP; Kent A. Lembke

(57) ABSTRACT

A method of accessing tape storage analytics data from tape libraries. The method includes generating a user interface on client devices. The user interface includes a first screen displaying graphics or an analysis table based on the tape storage analytics data. The method includes receiving user input selecting the displayed graphics or an item within a cell of the analysis table and displaying a second screen, which presents a subset of the tape storage analytics data and provides data on operation of at least tape libraries or library components (e.g. robots, elevators, CAPs, pass through ports), tape drives, and tape media within the tape libraries, or alternatively, activities involving any or a combination of these components. The receiving and modifying steps are repeated to navigate between data corresponding to a tape library or its comprising components, a tape drive, media, or corresponding activities.

24 Claims, 43 Drawing Sheets

| | | ACTION | | | |
|---|---|---|---|---|---|
| DRIVE MANUFACTURER | STK | HP | IBM | UNKNOWN | DRIVE MANUFA |
| SL3000_57100000001 | | 0 | 0 | 0 | 0 |
| DRIVE LIBRARY NUMBER TOTAL | 0 | 0 | 0 | | 0 |
| SL3000_57100020056 | 0 | 0 | 0 | 0 | 0 |
| DRIVE LIBRARY NUMBER TOTAL | 0 | 0 | 0 | | 0 |
| SL3000_57100020060 | 0 | 0 | 0 | 0 | 0 |
| DRIVE LIBRARY NUMBER TOTAL | 0 | 0 | 0 | 0 | 0 |
| SL500_52200000004 | 0 | 0 | 0 | 0 | 0 |

FIG. 21C

TABLE

DRIVES WATCH LIST

| DRIVE SERIAL NUMBER | DRIVE MODEL | DRIVE HEALTH INDICATOR | DRIVE HEALTH TREND |
|---|---|---|---|
| 50000020937 | 9840C | ⊗ | ? |
| 5790001000133 | T10000D | ⊖ | ⇨ |
| 5790001000134 | T10000D | ⊖ | ⇦ |

FIG.22B

REPORT

MEDIA VALIDATION REPORT  ⓘ  ✕

2230

TOTAL VALIDATIONS PERFORMED : 8
NUMBER OF PENDING VALIDATIONS : 0
NUMBER OF ACTIVE VALIDATIONS : 0
NUMBER OF FAILED VALIDATIONS : 1
NUMBER OF COMPLETED VALIDATIONS : 7
NUMBER OF MEDIA USED IN VALIDATIONS : 8
NUMBER OF DRIVES USED FOR VALIDATIONS : 5
LAST VALIDATION DATE AND TIME: 8/17/13  10:35 AM
TOTAL TIME USED FOR VALIDATIONS : 1:22:25
AVERAGE TIME USED PER VALIDATION : 0:10:18.1

FIG. 22C

ADD/EDIT

| | | |
|---|---|---|
| REPORT NAME: | * | CAPACITY PLANNERS — 2410 |
| SOURCE DASHBOARD TEMPLATE: | * | CAPACITY PLANNERS ▽ — 2420 |
| LOCALE: | * | ENGLISH ▽ |
| START DATE: | | 2013-09-01 — 2430 |
| RUN FREQUENCY: | | EVERY 7 DAYS ▽ — 2440 |
| SHARED: | | ◉ PUBLIC  ◎ PRIVATE |
| EMAIL RECIPIENTS: | | michael.abramovitz@oracle.com ▽ — 2450 |

[ SAVE ] [ SAVE AND RUN ] [ CANCEL ]

STORAGE TAPE ANALYTICS USER INTERFACE WITH MEDIA VALIDATION

CROSS-REFERENCE TO RELATED APPLICATIONS

This application is a continuation-in-part of application Ser. No. 13/627,016, filed Sep. 26, 2012, which claims the benefit of U.S. Provisional Application No. 61/541,372, filed Sep. 30, 2011, both of which are incorporated herein by reference in their entireties.

BACKGROUND

1. Field of the Description

The present description relates to magnetic tape data storage and, in particular, to methods and systems for providing a user interface to data for monitoring operations of a tape-based data storage system, with such data including data gathered, processed, and correlated from tape libraries including determining and predicting health of media, tape drives, robotic tape libraries, and other storage system components and providing drill down capabilities within the tape-based data storage system.

2. Relevant Background

For decades, magnetic tape data storage has offered cost and storage density advantages over many other data storage technologies including disk storage. A typical medium to large-sized data center will deploy both tape and disk storage to complement each other, with the tape storage often used for backup and archival data storage. Due to the increased need for securely storing data for long periods of time and due to the low cost of tape, it is likely that tape-based data storage will continue to be utilized and its use will only expand for the foreseeable future.

Briefly, magnetic tape data storage uses digital recording onto magnetic tape to store digital information, and the tape is packaged in cartridges and cassettes (i.e., the storage media or simply "media"). The device that performs writing and reading of data is a tape drive, and tape drives are often installed within robotic tape libraries, which may be quite large and hold thousands of cartridges to provide a tremendous amount of data storage (e.g., each tape may hold several terabytes of uncompressed data).

An ongoing challenge, though, for the data storage industry is how to manage and monitor data centers, and, particularly, how to better monitor tape storage media and devices. For example, customers demand that data be kept safely and with lower tape administration costs. In this regard, the customers desire solutions that efficiently and proactively manage data center tape operations including solutions that provide failure analysis for problematic or suspect media and drives. Further, customers demand data collection regarding operations to be non-invasive, and the management solution should provide recommended corrective actions. Data storage customers also want their investment in tape technologies to be preserved and data integrity maintained. This may involve monitoring tape capacities in volumes and/or libraries, flagging media to be migrated, and advising on resource rebalancing. Customers also desire a management solution that provides an effective and useful user interface to the collected tape operations data and reporting of detected problems or issues.

Unfortunately, existing tape data storage management solutions and systems have not met all of these needs or even fully addressed customer dissatisfiers. For example, existing management tools typically only collect and report historical data, and it can be very difficult after the fact or a problem with tape operations occurs to determine whether a particular drive or piece of media was the cause of a failure. This can lead to cartridges or other media being needlessly replaced or a tape drive being removed for repair or even replaced without verification of a fault. Some systems manage media lifecycles, but this typically only involves tracking the age or overall use of media to provide warnings when a tape or other media is potentially nearing the end of its useful life to allow a customer to remove the media. Existing systems also often only provide alerts after a failure or problem has occurred, e.g., alert when already in a crisis mode of operation. Further, reporting is limited to predefined reports that make assumptions regarding what information likely will be important to a customer and provide the customer with no or little ability to design a report or select data provided to them by the tape operations management system.

The data storage industry's current tape monitoring approach may be categorized as falling within one of three categories, with each having issues or problems limiting their widespread use or adoption. First, tape monitoring may involve a datapath breach approach. Such an approach only works in a storage area network (SAN) environment, and it also introduces drive availability risk and exposes data to vendors. Second, tape monitoring may involve a media vendor lock-in approach, but this results in reporting only being available if the media in a data center or tape library was sourced from a particular vendor. Third, tape monitoring may be limited to a single library within a data center, and this may be undesirable as each library has to launch its own monitoring application and the data is not aggregated for analysis or for reporting to the customer or operator of the data center.

Hence, there remains a need for improved systems and methods (e.g., software products) for providing customers with timely information to efficiently manage data center tape operations. Preferably, the information would include tape analytics that would allow proactive management of the tape operations rather than merely reactive management based on vendor-selected sets of historic data.

SUMMARY

To address the above and other issues, a method and a system are provided for monitoring and analyzing operations of a tape infrastructure, as may be found in a data center performing tape-based data storage. For example, a data storage system may include a server or appliance running a storage tape analytics (STA) application or software suite/tool that implements a data warehouse approach to monitoring a tape infrastructure. The STA application receives or gathers raw data from a number of data sources that may include a library management mainframe and one, two, or more tape libraries. The library data may be transmitted using a data transport mechanism such as via SNMP (Simple Network Management Protocol) or any other useful data transport such as a direct connection Ethernet to drives or an API to connect to a mainframe or other open systems that also support library or tape system control or related operations to send or retrieve data to those systems.

The raw data may include data pertaining to operations of the library as well as its components including tape drives and tape media (or cartridges) such as mount records, I/O or other records indicating what occurred while media was mounted in a drive, and dismount records. The data is not tied to a single library or drive but will, instead, include data on multiple libraries (when applicable) and numerous drives and media (which may be of differing types and fabricated by differing manufacturers). The raw data may be real time data collected during ongoing operations of a system of tape libraries that is used to build up a historical picture of tape library operations. In other cases, though, historical data may be mined or gathered to analyze past operations of a tape library or system of such libraries. This historical data may be gathered from various input sources such as from a library management mainframe or the like.

The STA application applies the data warehouse approach by utilizing a database to stage or store the received data records in staging tables, to clean up or transform the data into useful standard or normalized form(s), and to summarize the collected operations data. The STA application includes a user interface module for providing a user with an interface (e.g., a browser-based graphical user interface (GUI)), and the STA application makes no or few assumptions about which data will be pertinent to the user. Instead, the user is able to interact with the tape operations data in the database via the GUI to view and process all of the gathered data, which may include historical data as well as current operating data to facilitate trending-type analyses. The user is able to customize views and screens in the GUI, and these may be saved for later use by that user or for sharing with other monitoring personnel.

The STA application includes an analytics subsystem that may perform the summarization and also may perform algorithms and computations on the raw and summarized data to determine the current health of various components of the tape infrastructure. For example, drive health indicators may be provided for all the drives in each library of a data center in a view of the GUI. An alerting module of the STA application may provide alerts to one or more recipients based on monitored operating conditions such as when an operating parameter of a tape library crosses a predefined (or user-defined) threshold. The alerts may also be provided in views in the GUI and stored in the STA database for later viewing or processing. Further, the STA analytics subsystem may use algorithms and computations to determine or predict when a component of the tape infrastructure may have operational problems (or reduced health). For example, the STA analytics subsystem may predict failure of a tape media or a drive so that they may be proactively maintained/replaced or tape infrastructure operations may be altered to limit or avoid use of these components.

More particularly, a data storage system is providing for monitoring and analyzing operation of a tape infrastructure or tape storage in a data center. The system includes a tape library including a plurality of tape drives and a plurality of tape media for use in the tape drives. The system further includes a server (or appliance) communicatively linked to the tape library and a tape analytics database in memory (within or accessible by the server). On the server, a storage tape analytics application is provided that functions to extract raw data sets from the tape library corresponding to operations of the tape library. The operational data may pertain to use of the tape drives and the tape media during data storage in the tape library (e.g., mount and dismount records and I/O records for when the tape media was in a drive). The storage tape analytics application stores the extracted data sets in the tape analytics database, e.g., in staging tables. Further, the storage tape analytics application provides a user interface for viewing data in the tape analytics database, e.g., a GUI operable by monitoring personnel to view and interact with the gathered and processed tape operations monitoring data.

The data storage system is not tied to a single library. Hence, the system may include multiple tape libraries linked to the server. In such an implementation (two or more libraries being monitored such as in a tape enterprise data center with multiple libraries), the storage tape analytics application extracts data sets from the second tape library, stores the extracted data sets for the second tape library, and provides access to all the data sets in the tape analytics database. In this way, the user interface is operable to concurrently access operations data for all the tape libraries and the drives and the tape media in the tape libraries.

In some embodiments, the storage tape analytics application processes the extracted data sets to determine current and historical health of the tape library and its drives and tape media. Further, it acts to predict a failure of one of the tape drives or tape media occurring at a future time (e.g., a failure may be predicted when its likelihood or a suspicion level rises above a certain preset value). In some exemplary but not limiting cases, the extracting of the data sets includes receiving Simple Network Management Protocol (SNMP) data directly from the tape library, e.g., the data transport mechanism is SNMP and the STA application may utilize SNMP loaders to stage the data and then use SNMP transformers to normalize the raw data for use by a data analytics subsystem.

The data storage system may also include a library management system (an application running outside the libraries) that operates to manage operations of the tape library. In such embodiments, the storage tape analytics application may receive data corresponding to operations of the tape library from a data collection agent provided on the library management system. Then, the storage tape analytics application stores the received data in the tape analytics database for access via the user interface (e.g., the data from the two differing data sources are normalized for concurrent processing including summarization, which may be useful as the two sources may provide at least some sets of differing data useful in monitoring tape operations).

The user interface is generated, in some cases, based on user input that defines a subset of the data in the tape analytics database to be presented on a screen of the user interface (or how the presented data is arranged). The subset of the data may include historical data for the tape library such that the health of the tape library is viewable over a user-defined time period and is not limited to only current health or operational data but may, instead, be used for determining causes of a failure or change in tape-based data storage operations. The user interface may be dynamically derived based on the available data sets. For example, data provided by a mainframe virtual view of a library versus a physical view of the library may yield different capabilities and options available in the user interface. The user interface typically is able to be defined dynamically (on-the-fly) based on what systems that STA application is connected to and receiving data from (e.g., not just, in some cases, plugging into a library or system of libraries and showing what is there).

While the storage tape analytics (STA) application may process and analyze operational data, it may also provide an analysis of control activities. In other words, the processed operational raw data may not just be I/O from a tape library, but the STA application may also gather, load, and transform data related to actual control operations such as library audits or robotic movements. The STA application may also be integrated with backup (e.g., Oracle OSB or the like) and other tape management applications (e.g., Oracle ACSLS, Oracle HSC/ELS, and so on). The STA application may provide information to these applications based on its data gathering, loading, and transformation and analysis processes so that these applications may better optimize behavior. For example, if the STA application notifies these applications that a tape drive or a tape cartridge is bad, these applications can ensure that they do not use them when doing backup operations.

BRIEF DESCRIPTION OF THE DRAWINGS

FIGS. 13-16 illustrate screen shots of an embodiment of a graphical user interface (GUI) generated by the STA application to display data gathered and computed by the STA application to a user of the STA system;

FIG. 17 provides a flow chart of a tape operations monitoring and analysis method that may be performed during operations of a data storage system described herein that includes and uses an STA application such as the STA applications shown in FIGS. 1-4 or the like;

FIGS. 21A-21C illustrate partial screen shots of the GUI of FIG. 20 showing modification of the analysis table to change data presented in a column to a row of the analysis table;

FIGS. 22A-22C illustrate partial screen shots showing examples of three types of portlets that may be provided in a dashboard (or other screen) of an STA GUI via operation of an STA application of the present description;

FIG. 24 illustrates a dialog box that may be used to facilitate a user definition of an executive report in an STA GUI (e.g., the dashboard screen);

FIG. 43 illustrates a screen that provides a media validation overview; and

DETAILED DESCRIPTION

Figure 1:
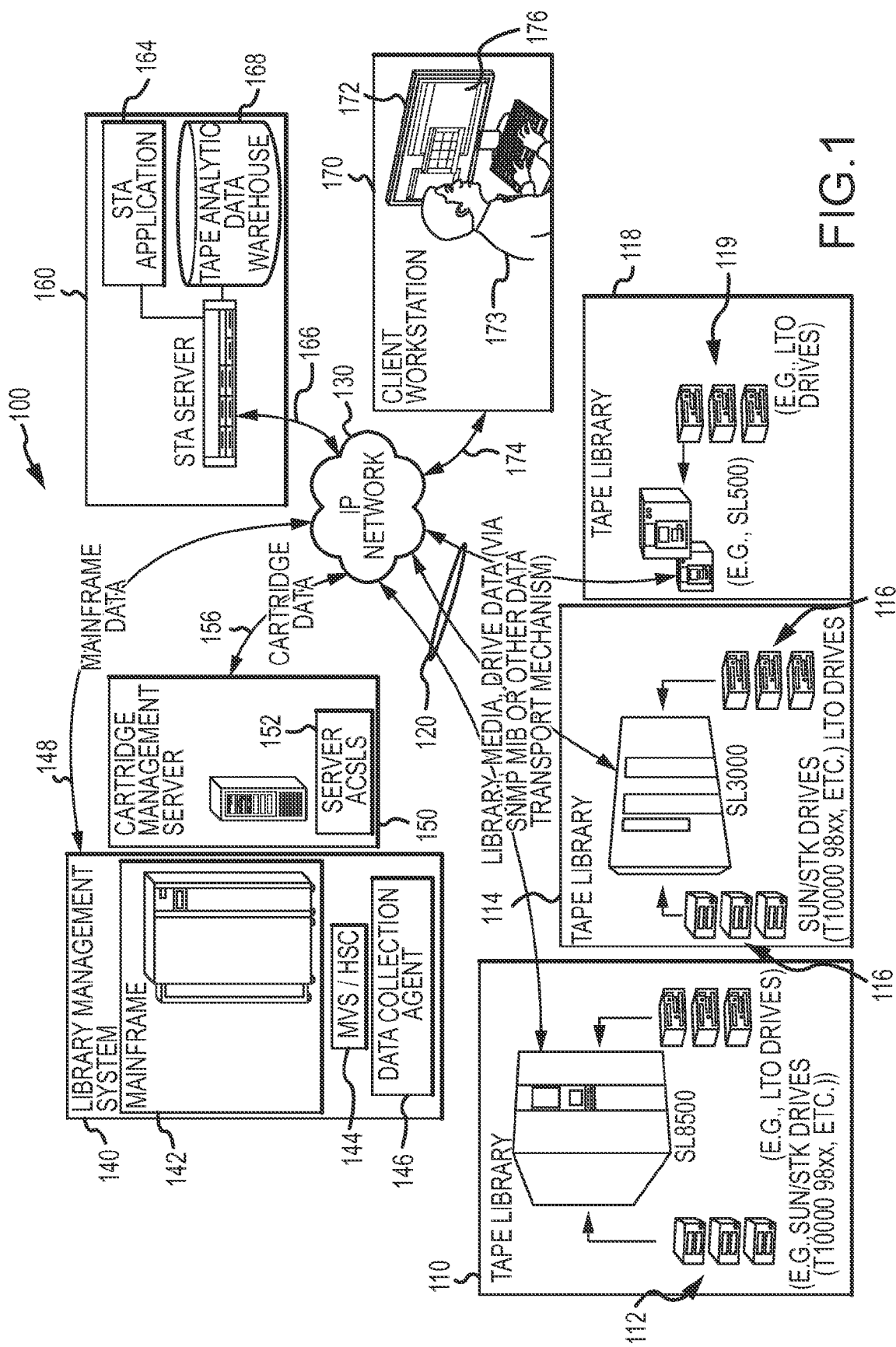
FIG. 1 is a functional block or schematic illustration of a data storage system implementing a storage tape analytics (STA) tool of the present description to monitor and analyze operations of tape-based data storage in the system.

Briefly, a tape analytics system and method is described that is built up around a storage tape analytics (STA) software suite, application, or product that may be run or executed upon a customer's (or tape operation monitor's) computer system such as on a server that is communicatively linked with a tape-based data storage system or data center (e.g., automated tape libraries, tape drives, and tape media). The STA application is an integrated management solution for the tape infrastructure of the data center that functions to capture data about the tape infrastructure, and this data is warehoused in a database that can be accessed in user-defined or default interfaces, alerts, and reports. The data gathered may include data about tape mounts, dismounts, I/O that occurs while tapes are mounted, errors during I/O or robotic processes, and the status of all the tape infrastructure components.

The STA application provides a customer or other monitor of a tape infrastructure with tape business insight to efficiently and proactively manage data center tape operations. As will become clear from the following description, the STA application can provide a user a number of advantages. For example, lower tape total cost of ownership (TCO) may be achieved via increased tape system reliability and a single pane-of-glass for monitoring tape operations (e.g., a graphical user interface (GUI) provided by the STA application on a client device). The STA application also provides simplified tape management through the following: (1) proactive tape media and drive health management; (2) customizable alerts and reporting; (3) functions and features supporting novice and expert users; and (4) analytics to help customers/managers make decisions about the tape hardware and media in their managed environment or data center. Increased tape performance may be achieved as the STA application provides a database of library movements, tools to optimize existing hardware, and insights into drive balancing solutions. The STA application presents a scalable and flexible tape management solution as it may support monitoring of thousands of drives and even larger numbers of tape media while typically also being interoperable with existing and future hardware. The STA application may be deployed with a simple deployment model such as standalone software.

Prior to turning to an exemplary data storage system utilizing an STA application, it may be useful to further explain how an STA application may address top problems and reasons of dissatisfaction of data center or tape storage managers or customers. It is desirable to keep data safe and to lower tape administration costs. In this regard, the STA application provides a comprehensive set of analytics to predict drive and media failures. Failure analysis is also provided for problematic or suspect media and drives as well as generating recommended corrective actions. The STA application further may provide alerts and workflow management for critical situations. Data collection is non-invasive with the STA application providing a low-touch approach for the analysis of tape operations. In some cases, the STA application provides integration with leading-edge tape capabilities with DIV (Data Integrity Verification).

Tape operation managers also wish to preserve their investment in tape technologies. With this in mind, the STA application monitors tape capacity of current volumes and also predicts capacity for future growth. The STA application may also flag media to be migrated and advise on resource rebalancing according to identified usage patterns. Tape capacity may be mapped to public tape technology roadmaps and to planned tape generational migrations. Further, the STA application may monitor tape partition usage and support various business metrics that can be defined by the customer.

Significantly, the STA application also provides a "single pane of glass" for tape intelligence. Specifically, the STA application can provide a single UI for statistics across tape libraries, tape media, tape drives, and host applications. It can also correlate data that previously would have to have been accessed (if available at all) through separate applications. The STA application provides a flexible systemic view instead of silo-only statistical views. The STA application also can provide predefined, custom, and what-if queries across data sets for enhanced tape analytics. Management is provided at scale and across a hybrid set of tape solutions including logical groupings (which may be defined or set by the customer or user of the STA application).

The STA application is a scalable solution to tape analytics and management that is able to grow in both physical scope and in terms of types and numbers of devices that can be monitored. Its open and extensible architecture permits the inclusion of increased functionality in a seamless, non-disruptive manner. Support for new hardware types and facilities may be easily added to the STA application. The STA application exposes a rich graphical interface via a web browser, for example, to act as the interface between a user and the server upon which the STA application is provided or running.

The STA application will typically not require explicit installation but will, instead, be provided via a web interface displayed on the client's workstation. The STA application may use industry standard technologies such the JAVA™ technology so that it is feature-full and robust and can be used on a variety of different end-user workstations and personal computers with no (or little) further installation requirements. An install may go on a virtual box in addition to a dedicated server. In some embodiments, the STA application will generally be delivered as either a software product that customers/users may install onto an existing server (e.g., a Solaris server, a Linux server, or a server with another operating system) or as part of an appliance where all necessary components are pre-installed on the appliance, which is then communicatively linked to the monitored tape infrastructure as part of its installation at the customer's/user's site.

Turning now to the figures, FIG. 1 illustrates a data storage system 100 that may implement the monitoring and analytics described herein to provide enhanced management of a tape infrastructure. In this regard, the system 100 includes a number of tape libraries 110, 114, 118 each with a number of tape drives 112, 116, 119. Tape media (e.g., cartridges) is automatically mounted and dismounted from these drives 112, 116, 119 although particular media is not shown in FIG. 1. Exemplary libraries and drives are shown in FIG. 1, but the system 100 may be implemented with nearly any type of library, drives, and tape media (e.g., not limited to those of a particular manufacturer in the data storage industry). During operation of the data storage system 100, library, media, and drive data 120 is transported via a data transport mechanism (e.g., SNMP, an Ethernet port, SCSI, or the like) over a network (e.g., a local area network (LAN), storage area network (SAN), or the like) to an STA server 160. For example, the data 120 may include mount records, records of what occurred while a tape media was in a drive, and a dismount record. Also, it should be noted that the data 120 is for a full tape storage infrastructure, here shown as including 3 libraries 110, 114, 118 but could include more, and is not limited to monitoring data from a single drive or library.

The data storage system 100 further includes a library management system 140 and a cartridge management server 150. For example, the library management system 140 may include a mainframe or other computer device running an operating system and management software applications 144, with the operating system shown to be MVS provided by IBM and the management software being Host Software Component (HSC) provided by Oracle, but other operating systems and library management software may be utilized in the data storage system 100. A data collection agent 146 is provided in the data storage system 100 to act to collect library management-specific (e.g., HSC-specific) data 148 that is transmitted via IP network 130 to the STA server 160. The cartridge management server 150 may run one or more applications 152, such as Automated Cartridge System Library Software (ACSLS), to control an automated cartridge system, and cartridge management-specific (e.g., ACSLS-specific) data 156 is provided by the application 152 over IP network 130 to the STA server 160 for use in analytics of tape operations in the tape libraries 110, 114, 118.

Significantly, the data storage system 100 includes the STA server 160 that runs or executes the STA application 164 to manage collection and storage of the data 120, 148, 156 from all the tape analytics data sources in system 100 in the tape analytics data warehouse 168 (e.g., a database(s) in memory of server 160 or accessible by server 160) and to perform analytics functions as described herein. Briefly, the STA application 164 provides a data warehouse approach to management of a tape infrastructure, and this involves gathering/receiving a wide variety of data 166 (which includes data 120, 148, 156 from all sources in system 100), storing and processing this data in the database 168, performing analytics on this data such as predicting health issues of the media or drives in libraries 110, 114, 118, and presenting out all the data available in the database 168 including the predictive health attributes of media/drives as shown at 174 to a user 173 operating a client node or workstation 170. The client workstation 170 includes a monitor/display device 172 that is operable (such as with a browser) to allow the user 173 to view and process the data 174 via a user interface, which is described in more detail below. The STA application 164 is adapted to allow customer-driven analysis of the data 168 and may include reporting tools, customizable UIs 176, and other devices to enable the user/customer 173 to drive analysis of the tape infrastructure in the data storage system 100.

The tape monitoring approach shown in system 100 may be considered a direct library communication approach, which differs from prior monitoring techniques (such as the data path breach approach, the media vendor lock-in approach, and single library approach). The system 100 provides monitoring with data path protection and media vendor flexibility. Also, a single monitoring application 164 may be used for multiple library environments 110, 114, 118.

In general, the STA application may be deployed into a customer's/user's environment on a network (such as network 130). The tape analytics system, either a STA appliance or the STA software 164 installed onto a server 160 belonging to a user/customer, is provided connectivity to tape libraries 110, 114, 118 and to one or more workstations 170 where STA users may use a browser-based GUI 176 to interact with the tape analytics system. A number of transport mechanisms may be used to collect the data 120 from the libraries 110, 114, 118. In one useful implementation, the communication link uses SNMP for interactions between the libraries 110, 114, 118 and the STA application 164. The communications with the client workstation 170 may be provided with a link using http and https or the like to run a browser-based GUI 176. Communications to the mainframe 142 and the management software application 144 and data collection agent 146 may use a protocol (e.g., a proprietary or a non-proprietary protocol) over TCP/IP sockets or the like. The system 100 typically is fully under the control of the user 173.

The STA application 164 may be thought of as being provided in a technologies or software stack. From top to bottom, this stack may include: applications; middleware; a database; an operating system; a virtual machine; a server; and storage. The application is the STA application 164 and the data collection agent 146, both of which may be provided in nearly any programming language with one exemplary implementation using Java J2EE for the STA application 164 and assembly language for the data collector 146 (e.g., IBM assembly language for an SMF data adapter on mainframe 142). The applications may also include analytics such as Crystal Ball (CB) from Oracle for tape analysis. In some cases, the STA application 164 may be written in Java and use Oracle's MySQL, JDMK, ADF 11g, and Weblogic 11g software products, but, again, the description is not limited to such an implementation.

The middleware may be used, in part, to provide a browser-based UI and may include WebLogic from Oracle or similar application and/or web server software. The database is used to implement the tape analytics data warehouse 168 and may utilize MySQL or similar database management technologies. The operating system may be Linux, Solaris, or any other useful operating system provided by Oracle or other OS providers. The virtual machine may be implemented using Virtual Box or the like. The server also may take numerous forms to practice the system 100 such as a Sun Fire server from Oracle or the like. The storage in the technology stack is provided by a tape storage implementation as shown with tape libraries 110, 114, 118 with tape drives 112, 116, 119. Again, the hardware supported and used in system 100 may be widely varied to practice the tape analytics and monitoring described herein and may take the form shown in FIG. 1. For example, the libraries 110, 114, 118 may be Oracle's StorageTek libraries (e.g., the SL8500, SL3000, SL500, or similar or future libraries), and the drives 112, 116, 119 may be Oracle's StorageTek drives (and media) (e.g., the T10000 A/B/C/D, T9840 C/D) or LTO 3/4/5/6 from HP and IBM.

Figure 2:
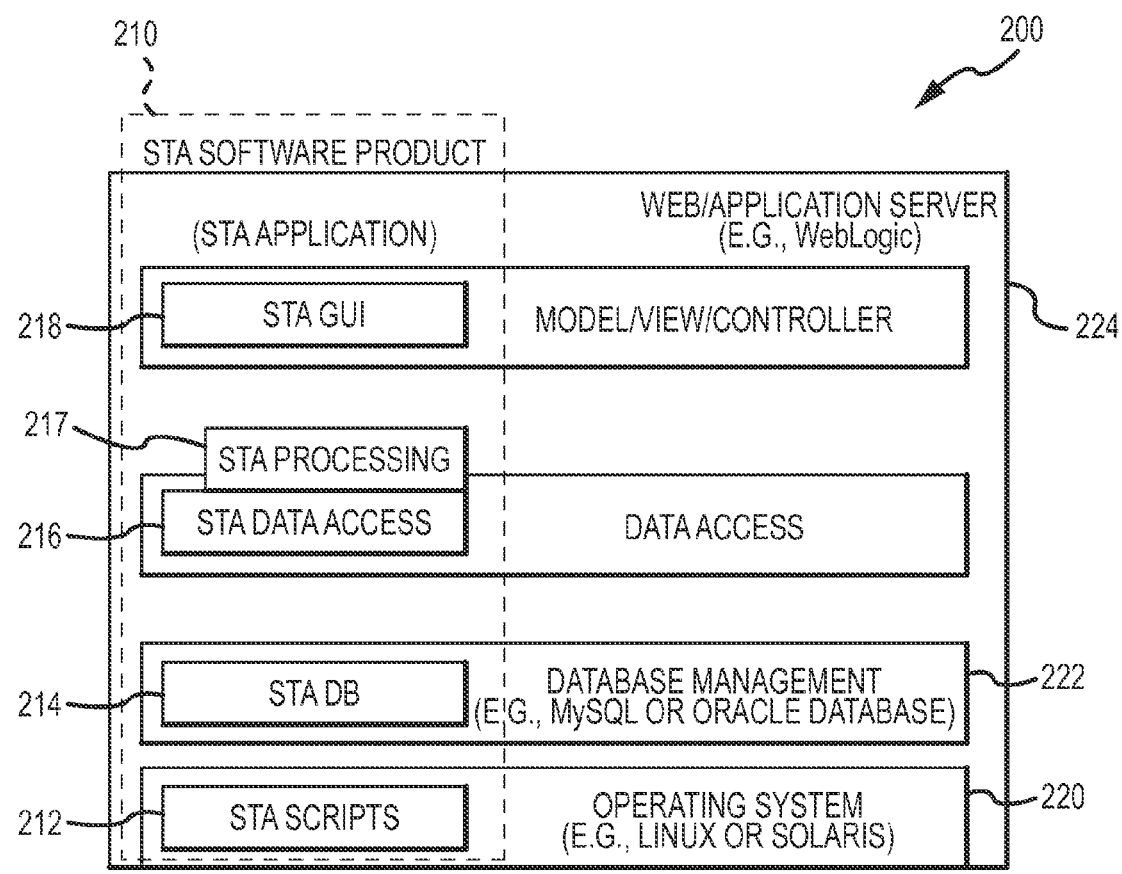
FIG. 2 provides a diagram of key software components or technologies that may be provided in an implementation of a STA product or an STA application provided on an appliance or installed on a customer's/user's server.

FIG. 2 provides a diagram of a software stack 200 with software components or technologies that may be provided in an implementation of an STA product or an STA application 210 provided on an appliance or installed on a customer's/user's server. At the bottom of the stack 200, an operating system 220 such as Linux, Solaris, or the like is provided, and the STA application 210 may include STA scripts 212 to perform portions of the STA functionality described herein. In the stack 200, a database (e.g., MySQL, an Oracle database, or the like) 222 and a web and/or application server (e.g., Web Logic or another useful technology/product) 224 are also provided. A STA database module or component 214 is provided in the STA application 210 to manage and provide the data warehouse/STA database.

The stack 200 may include a MVC (model, view, controller) architecture or similar technologies as part of the web/application server 224, and business intelligence such as STA data access 216 with intelligence subroutines such as STA processing 217 is used to provide business component of the STA application 210 (such as data loaders, data transformers, data summarizers, data analyzers, and alert/report generators). The MVC provides a number of functions that are well known by those skilled in the arts and are shown as high-level groups of functionality in the stack 200 of FIG. 2. The MVC business components, including the STA data access and processing components 216, 217, provide an interface into the database 222. Above the MVC business components, MVC provides three layers defined in the MVC (model, view, controller) architecture, and the STA GUI 218 is implemented using these three layers. The STA processing subroutines (Java enterprise Java beans, for example) 217 can directly use the database interfaces provided by the MVC business components implementing STA data access 216. Part of the functionality of these routines 217 is implemented using the application modules that may be part of the MVC business components. The STA application 210 may include a database schema for the database 214, 222 and may have shell scripts 212 that are used to install and run the STA system.

Figure 3:
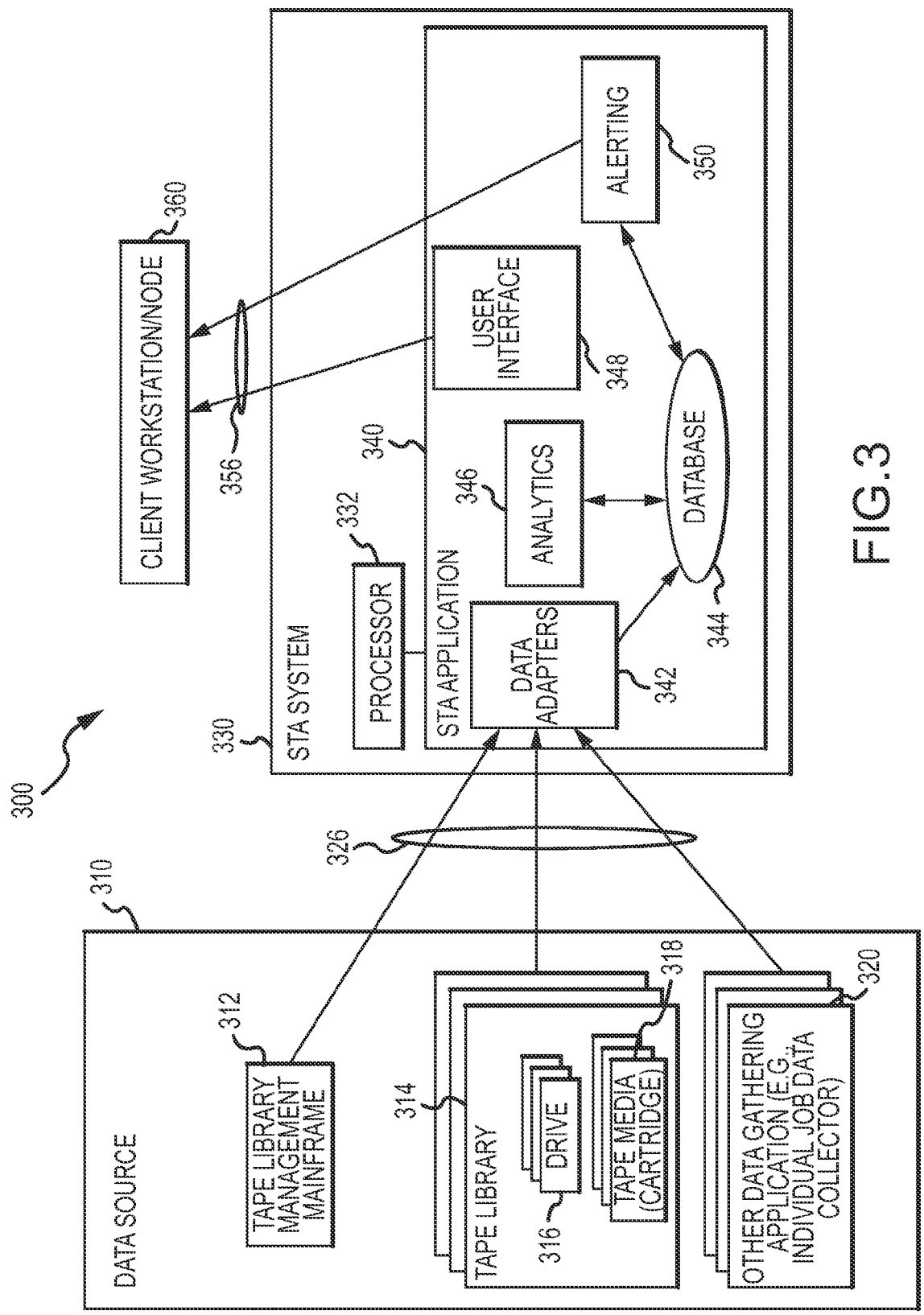
FIG. 3 is a functional block diagram of the architecture of an exemplary data storage system implementing the storage tape analytics of the present description.

FIG. 3 illustrates a functional block diagram of the architecture of a data storage system 300 implementing the storage tape analytics described herein. The system 300 includes a data source 310, an STA system 330, and one or more client workstations or mobile nodes/client devices 360. The STA system 330 receives or gathers raw data 326 from the data source 310, warehouses the data in raw and processed/analyzed form in a database 344, and presents the data 356 to the user of the client workstation/node 360. The data sources 310 may include nearly any data source useful for monitoring and analyzing operation of a tape-based data storage infrastructure. As shown, the sources 310 include mainframe data from a mainframe 312 performing tape library management functions and also other data gathering applications 320, such as applications run or executed by a server to collect data on individual jobs or functions occurring within a tape library 314. Further, the data sources 310 include one, two, three, or more tape libraries 314, and the tape library data may include data pertaining to the tape drives 316, tape media or cartridges 318, and other library components such as robots. The raw data or records from a tape library may include, but is not restricted to, mount records, records of I/O or what occurred while a cartridge 318 was mounted in a drive 316, and dismount records.

The STA system 330 (e.g., a server connected via a communications network to the data sources 310 and client workstation 360) includes a processor(s) 332 that functions to execute code or run software to provide the STA application 340 and perform its methods/processes. The STA application 340 has an architecture made up of the following five major components: data adapters 342, a database/data warehouse 344 in memory, analytics modules 346, a user interface module 348, and an alerting module 350. Briefly, the database 344 holds all data and system configuration information. The user interface module 348 generates a browser-based graphical user interface that can be viewed and manipulated by the user of workstation/mobile device 360, and the user interface presents tabular and graphical information and performs all configurations of the STA application 340. The STA application 340 further includes a set of adapters or adapter modules 342 that gathers or receives data 326 from external data sources 310 and transforms it into a standardized form. The alerting mechanism 350 provides notification to the user via workstation/mobile node 360 or other communication methods when significant events (which may be defined by the user) are detected by the STA application 340. With this overview in mind, it may now be useful to describe each component of the STA application in greater detail.

The database 344 may be considered the heart of the STA application 340. It includes a set of modules that contain related types of data. Two primary modules are the "tape system model" and the "tape warehouse." The tape system model contains a representation of the libraries 314, media 318, drives 316, and other entities that exist in the tape infrastructure being monitored/managed with the STA application 340. The term "model" is used since this data is only a representation of the real world, and the tape system model holds not only the current state of the world but also its history. The tape warehouse module contains detailed information about what is happening in the tape infrastructure. This starts with the raw data 326 such as that provided when a tape is mounted or dismounted or when an error is detected. The facts stored in the warehouse/database 344 also include derived results that are calculated by the analytics or analytical subsystem 346 of the STA application 340. These derived facts may span a range of complexity from simple calculations based on a few numbers from a specific event to long term analytical evaluations.

In addition to the tape system model and the warehouse module, the database 344 may also hold the information needed by the STA application 340 for operations. This may include configuration information needed to attach to the external data sources, data staging areas used by the data loaders (provided by adapters 342) to process the external data 326, information needed to produce reports and graphs provided by the user interface module 348, alerts and rules needed by the alerting module 350 to detect and process alerts, and any other persistent information needed by the STA application 340.

The human interface to the STA application 340 is its graphical user interface provided by the user interface module 348. The human interface may be implemented using web browser technology to avoid use of a separately installed component. The GUI may provide authentication (login), authorization (permissions), and user roles (e.g., administrator, operator, viewer, and the like) functions to control access to the stored data provided by the database 344 and system functions. The user interface 348 provides the ability to define and view a variety of reports. Generally, the reports may include tabular and/or graphical displays that show some subset of the facts available in the database 344. Various pre-defined (by the STA application 340 or by the user of workstation 360) reports and displays are available to view both the raw data and the analytical results. These reports can be customized, for example, by filtering the data shown based on either the model data (e.g., to a specific set of the libraries 314) or by the dimensions of the fact data (e.g., specific time ranges, after or before a particular event occurred, data for a particular building or business unit, and so on). Additionally, the GUI provided by interface module 348 may provide administrative functions useful to manage the STA application 340. These may include configuring data sources 310, managing user access to the STA application 340 (e.g., to configure LDAP servers or the like), configuring alerts, servicing the STA application 340, and other functions.

The STA application 340 collects and uses data 326 from various external sources 310. These sources 310 may include tape libraries 314 and a mainframe HSC or other tape management system 312. Further, other sources may be provided or added to the system 300 as shown at 320. The data loaders or adapters 342 acquire the data 326 by either pulling it from the external source 310 or by receiving this data 326 as messages from the external source 310. Either or both mechanisms may be used for a specific source within the set of sources 310. The loaders 342 are responsible for parsing the input data 326, performing any transformations needed, and inserting the data into the raw fact tables and model tables of the database 344.

The loaders 342 may work via a multi-step process such as the following exemplary two-step process. The first step may be to acquire the input data 326, parse it, and insert it into staging tables in database 344 (or in other areas of memory accessible by the STA application 340). The second step may be to perform any transformations needed to put the data into the standard structure used in the tape system model and fact module or tape warehouse. The parsed input data may be retained in the staging tables indefinitely to allow reprocessing of the data, which may be very useful in many cases such as should issues be found in the data or in the transformations.

The analytics subsystem 346 may include routines/programs that perform a series of calculations on the raw facts data. These calculations may be predetermined and/or pre-defined in some cases. For example, one routine or program may implement a "suspicion algorithm" that analyzes the data from the mount and dismount records to determine drive and media health. The calculations may further include aggregation operations to produce periodic (e.g., daily, monthly, or another time period) summaries. The calculations, of course, may be driven by the reports desired/provided by the user interface module 348. The analytics modules 346 work by retrieving the raw facts and existing analytics facts from the database 344, performing the calculations, and then storing the results back into the database 344. The analytics calculations may be triggered by an event, such as loading data or based on a schedule.

Alerts generated by the alerting module 350 represent significant events in the tape environment of data storage system 300 that are detected by the STA application 340. An alert, as managed by the STA application 340, may be a direct result of something that happens in the tape environment, such as the report of an error by a tape library 314. Significantly, alerts generated by alert module 350 may also be derived by the STA application 340 from the input data 326 and/or data calculated by analytics 346. For example, a suspicion value that exceeds a threshold may result in an alert, with this alert being a predictive or proactive alert indicating that operational status or health of a component of a tape infrastructure (such as a tape drive, a tape media, or the like) will degrade in the near future and its use should be halted or maintenance/replacement should soon be performed. Alerts may also be generated when the STA application takes action on itself (e.g., restarts itself because there is a problem with the system).

Alerts may be created by an alert detection subcomponent of the alerting subsystem/module 350. This component may have rules for examining the tape system model and facts data in the warehouse module of database 344 and then for generating alerts when appropriate. This may be a rules-based subsystem that understands a few rules such as filtering and thresholds and applies user-specified or default criteria and its rules to create alerts. Once generated, alerts may also be stored in the database 344. Screens may be available via user interface 348 to display the generated alerts at workstation 360. In many cases, an alert refers to a specific entity in the user's environment, such as a tape drive 316 or a tape cartridge or media 318. Alerts may also have a state that can be "new," "acknowledged," "dismissed," and/or other states. Alerts may also go through a workflow to better enable a user to track the status of a given alert. For example, an alert may be put into a new, acknowledged, in progress, dismissed, unknown, or other useful state. The workflow may be manual or automated within the STA application. Alerts may be for components or for events. A component may be one of CAP, complex, drive, elevator, library, media, PTP, robot, or the like. Events can include exchanges, media drive validation operations, STA system restarts, and other events.

A second portion of the alert subsystem is alert notification. Alerts may have a severity level, which indicates how frequently an alert should be generated (e.g., once per day, once every 24 hours, only one time ever, or other period) and are used by alerting module 350 in providing the alert to a user (e.g., via an e-mail, via a text message or voice message to a wireless client device, in a report in a user interface, and so on). Alerts may result in notifications with a GUI provided by user interface 348 and/or in e-mails being sent to users of the STA application 340. A newly detected alert may result in notification appearing on the screen of any active GUI. This function is part of the user interface 348 and may simply be a matter of a GUI or interface module 348 actively polling the database 344 for new alerts. The e-mail function may be a background task initiated after an alert is detected. There may be a default set of alert policies given to a user at install time. The user can use these as their policies, add more, or modify the default ones for their own use/needs.

Figure 4:
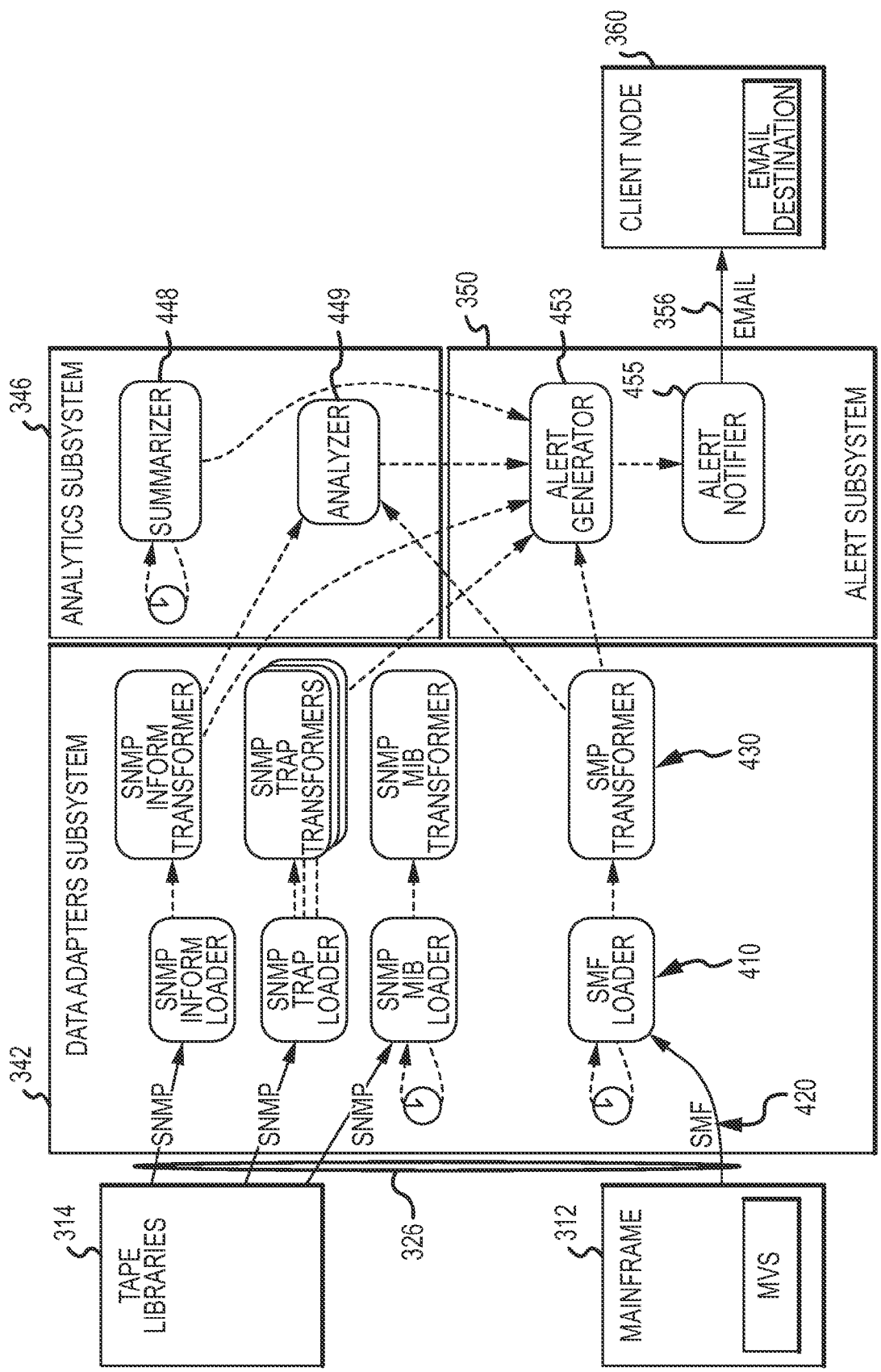
FIG. 4 is functional block diagram providing an implementation view of an STA architecture with further detail on components or features of the data adapters subsystem, the analytics subsystem, and the alert subsystem of the STA application of FIG. 3.

The components of the STA application 340 shown in FIG. 3 may be implemented using a series of Java beans or similar program devices. For example, FIG. 4 illustrates portions of the system 300 of FIG. 3 showing more details of the components that may be used to implement the functionality described for the STA application 340 within system 300. For example, the data adapters subsystem 342 may include a set of loaders 410 for collecting and receiving data 326 from the management mainframe 312 and from tape libraries 314, and these may be implemented as Java beans or the like that are timed routines that execute periodically or that are message driven to execute as a result of an incoming message 326. The transport mechanism 420 for data 326 may be based on a protocol such as SNMP (Simple Network Management Protocol), as shown for libraries 314, and the loaders 410 may include data loaders configured for such a data transport protocol (e.g., an SNMP inform loader, an SNMP trap loader, and SNMP MIB loader). The mainframe 312 may, in some cases, utilize a proprietary data transport mechanism 420 such as SMF when the mainframe 312 implements MVS to manage the libraries 314. The received raw data may then be passed from the loaders 410 to a series of data transformers 430 adapted for processing the types of data provided by each loader 410.

The analytics subsystem 346 may include one or more analyzer routines/processes 449 for further processing the transformed tape operations data, and the output of the analyzer subroutines 449 will be stored in the data warehouse of the database and also will be provided to the alert subsystem 350 as shown. The analytics subsystem 346 also includes a summarizer module/routine 448 (e.g., a timer bean(s)) that periodically summarizes the transformed data, with the summarized data being stored in the database and also, when appropriate, being provided to the alert subsystem 350. The alert subsystem 350 includes an alert generator 453 for determining when an alert needs to be provided and to then generate the alert, and the generated alert is provided to an alert notifier 455 for communication 356 of the alert to a user such as via an e-mail message to an e-mail destination for receipt/viewing with a client device or node 360.

With regard to the architectural principles of the STA application, it can be seen that it is database focused, data is retained, history is maintained, data is warehoused, and the STA application is message based. First, the STA application is database focused, which means that to the extent practical all data gathered, transformed, and analyzed is held in the STA database. Here, "data" is any information received by the STA application, generated by the STA application, and input by a user. As a result, flat files and configuration files are typically not used. Being database focused also means that knowledge is held in the database when possible. Developers are sometimes faced with a choice of building knowledge into the code or placing it in the database. Where practical, the choice when implementing an STA application is to place knowledge into the database rather than embedding it into code. However, the function of parsing an input record apart may be better handled in code, but, in contrast, the knowledge needed for converting between codes found in that input record and STA meanings typically is placed in the database.

Second, data is retained or held rather than discarded. For example, when a result is computed or data is received, the STA application acts to hold onto or retain the data in its least-processed form. Then, as additional results are calculated, both the input data and the calculated results are retained by the STA application in the database. Third, the STA application maintains not only the current state of the tape infrastructure but also its history. This impacts the data structures because the infrastructure changes over time. Both current information and historical information are stored in the same tables. This allows queries to be the same whether searching for current or past records. A consequence of this approach, though, is that queries may be more complex as queries that only want current data have to screen out past data.

Fourth, the STA application is fundamentally based on a data warehouse that captures data about a user's tape infrastructure. The STA database may be structured as a star schema to the extent possible. Because the STA application may provide navigation using the familiar hardware hierarchy of tape libraries, the STA database may use a hybrid model, e.g., the majority of the data is in star tables while the hardware hierarchy is in tables that hang off the dimension tables of the star. Fifth, the STA application is message based. The STA application has a number of different functions including loading incoming data into the database, parsing apart the incoming data, and performing computations on the data. The STA application may use a message-based approach to handling these different functions. Once one function has completed its work, it may send out a message to be received and processed by another function of the STA application.

At this point in the description, it may be useful to describe the STA application and data storage systems implementing this software tool by providing several functional walkthroughs, e.g., outlines of the workflow a user would use to perform various functions with the STA application. The functional walkthroughs are provided in the following outlines: (1) a user model; (2) data viewing; (3) data collection and processing; (4) alerting; (5) data source configuration; and (6) installation.

With regard to a user mode, there are several different types of users that may use the STA application or a data storage system with such a program/tool provided for monitoring tape storage. A basic user may want to see a simple view of the tape infrastructure using the STA user interface. Such a user may use predefined views provided as default views in the STA application or may use customized views created by other users. A basic user may navigate from screen to screen as they view different aspects of their tape environment and investigate problems. An analytical user may spend more time performing detailed investigations of their tape infrastructure. While this type of user may use the STA application's pre-defined data views, they will likely customize these views (which may then be used again by them or others). This user may export data to other tools for further analysis (e.g., Crystal Ball or similar tools that may be useful for performing ad hoc investigations of their data). A report-viewing user may make use of reports defined by basic or analytical users. Such reports may be e-mailed directly to this type of user such as in the form of pdf or similar documents. An administrator may be a user that is responsible for the management of the STA application, and such management may include software or appliance installation, configuring data sources, performing backups of the STA database, and installing new versions of software.

With regard to data viewing, viewing the data elements collected by the STA application may be considered a core STA function. Data elements may be grouped into "information sets" that gather related elements. Examples of such information sets may include "drive health" and "media health." While the STA application is typically focused on drives and media, it also collects information about tape libraries and their component parts and is capable in some cases of displaying this library and library component information. Data may be displayed in graphical or tabular form, and numerous options are typically provided for selecting the data to be displayed in the user interface, for controlling which specific attributes are displayed, and modifying the appearance of generated and displayed charts.

At this point it may be useful to provide an example of user interface flow. When a user connects to the STA application (e.g., via a browser-based GUI or the like), a "dashboard" view is typically shown to the user on their display or monitor of their workstation or client device. The dashboard gives a summary of the status of the overall system, and a more detailed, but typically still summarized, "overview" is available to provide more details. From there, the user can choose to investigate drives, media, libraries, or the various other entities known to and monitored by the STA application. The user can direct the STA application to show a table of many entities, such as a list of drives, in a "multi view." This data may be summarized by the various attributes in the list into an "aggregate view" or the user may choose to view details about an individual device (e.g., a tape drive) in a "single view" or the user may view a graph of some attribute of the device (e.g., the drive) over time in a "chart view." The STA application provides great flexibility in terms of what data is shown and how the data is presented.

Exemplary flow through the GUI may include the following steps. First, the user may login and once login is validated be presented a dashboard of their monitored tape-based data storage system. The user may notice that there is a problem with one of the tape drives in one of the libraries. The user may respond by choosing an aggregate view of drive health versus drive type, and this may result in the user determining that a number of a particular type of drive is in a "faulty" or other state (a multi view of drives). The user may then decide to look more closely at the first drive in the list and bring up a single view of that particular drive.

From this point, the user may want to see the recent activity of the drive and choose, for example, to see a time-ordered multi view of the exchanges performed by that particular faulty drive. Then, if no obvious problem is noted, the user may select a line chart of throughput for the drive, where the user may notice a recent exchange with throughput lower than other drives. Then, the user may jump back to the multi view of the exchanges so that they can select the tape media in that exchange by clicking on the volume serial number ("volser"), for example, in the list of exchanges. This brings up a single view of that particular tape in the user interface. From here, the user may request a list of exchanges involving that tape and then a line graph of the associated throughput. The user may then notice via the user interface-provided data that the tape media has consistently been producing lower throughput than typical for that type of tape media regardless of which drive the tape was used in. The user may then respond by freezing the tape media in their application, leaving it available for reading but blocking any further writes to that problematic tape media.

The STA application provides considerable flexibility about the appearance of most of these display screens in the user interface. The tables shown in a multi view, for example, can be sorted. Selection criteria may be applied to limit the entities (e.g., drives) shown. Columns can be reordered and hidden. Similarly, for aggregate views, selection criteria may be applied to limit the data shown. The user may control which attributes are used for columns and rows and which attribute is used for the cells and how that data item is summarized (e.g., count, sum, average, or the like). Although the STA application provides a number of default views and templates, the STA application also provides the user the ability to save a screen once it has been tailored to the user's preferences or user-provided design. Once a user has adjusted the content and appearance of a screen, it can be given a name and saved as a template, and a saved template may be made available to other users or reused by the saving user as the template can be retrieved at any later time. Generally, the template will not retrieve the same data at later dates since new data is continuously being added to the STA database, and the same template, when retrieved at a later point in time, will show the latest data. A saved template typically only shows a fixed set of results when the template is configured with a specific date or date/time range. The user may rely on a starter set of default templates that can be organized into a number of categories of templates with many (10 to 20 or more templates) within each such template category. The user may also modify one or more of these templates to suit their needs or the entire set may be extended by adding user-created or new templates. Some of the templates may focus on media, on drives, or other components within the data storage system.

With regard to data collection and processing, the STA application or system collects data from external sources. For example, data may be collected directly from tape libraries (e.g., SNMP data or data using other data transport mechanisms) and from a library management system (e.g., SMF data from a mainframe), and the actions of the STA application may be similar for these two data sources. Data may be initially acquired by the STA application by either it being sent by the data source or it being retrieved from the data source. For mainframe data (e.g., MVS SMF data or the like), an agent ("the data collection agent") may be installed on the mainframe (e.g., on the MVS system or the like). The STA application may periodically request data from the data collection agent, and the data collection agent may retrieve data from the library management system (e.g., from MVS and from the HSC) and send it back to the STA application. Some library data (e.g., SNMP data) may be sent in the form of trap or other data (e.g., for SNMP it may be SNMP Traps and SNMP Informs), and additional data may be retrieved from the libraries (e.g., using SNMP Gets when the data transport mechanism is SNMP).

Once data is received by the STA application, the received data is inserted into staging tables, with these staging tables holding the data in a minimally processed or raw form. Data elements are extracted from the incoming data for the staging tables (e.g., the incoming Traps or MIBs for SNMP). Some data may not require any parsing such as the SNMP Informs and SMF records from the library management mainframe. This allows the STA application to reprocess input records if more information is desired in a future version or if a problem in the data requires special processing in some cases. After loading the data into the staging tables, the STA application acts to transform the staged data into a standardized form and inserts the transformed results into the "raw fact" tables in the STA database. This step may require updating "dimension" tables such as if a move involving a new tape media is received. Once the data is in the raw fact tables, analytic processing is performed. Some calculations are performed as each new record is received, and these are started when new records are inserted into the raw fact tables. Other calculations/analysis are performed periodically (e.g., hourly, daily, and the like), and these are run as time periods pass based on rules specified by the STA application (default periods) or the STA application users (user-specified analysis periods).

With regard to alerting, alerts are typically generated in response to significant events being detected by the STA application. In some implementations, there are at least three sources of alerts including: (1) changes in the top level conditions of libraries; (2) SNMP Traps or similar data being received from the libraries; and (3) an input or calculated value provided by the analytics module being determined to exceed a threshold value. When the STA application detects an event condition, it creates an alert record that is stored in the STA database. The STA application may then send notification about the alert to a user of the STA application (or one that has subscribed for particular alerts). Each alert may have a severity level, and notification may vary in practice including transmitting e-mail messages, communicating voice/audio messages to a wired or wireless user device, providing a text message, and the like.

Regarding alert configuration, library top level condition and other settings, such as SNMP Traps, may require no configuration. However, threshold alerts may require that the user specify a variable to monitor and the threshold for that monitored variable, with such configuration being performed via the user interface in some embodiments. Once set up, the STA application, e.g., with the alert subsystem or module, may check any new record in the database that contains the specified variable and may create an alert when the variable is determined to exceed (or fall below if so specified) the threshold. Users may also configure notification rules that are used to specify an alert type and/or severity level and provide a recipient for the alert (e.g., an e-mail address, a cell phone number, or the like). Each time a new alert is created it may be compared to the alert notification rules. If the alert meets the type and severity criteria set in the notification rules, the alert is communicated to the specified recipient (e.g., an e-mail alert is sent to an e-mail address).

Now, turning to data source configuration, the STA data sources may have to be configured in the STA application and, in some cases, in the data source before the data will be provided to the STA application. For example, the STA application may use a number of SNMP data sources such as the tape libraries themselves (although other transport mechanisms may be used). SNMP data sources may require configuration in both the libraries and in the STA application. In the STA application/system, the setup may be done using the STA user interface. In each of the tape libraries, the setup may be done using the command line interface or the like. To configure SNMP, the user may choose a username, authorization mechanism, authorization password, privacy mechanism, and a privacy password. The STA application may have an SNMP "engine ID." This is needed in some cases to complete the configuration (and may be displayed in the STA user interface), and the IP addresses of the STA system may also be provided as part of configuration. Once configured, the STA application begins monitoring for SNMP input (e.g., Traps and Informs and may perform the Gets) while each library will start sending Traps and Informs to a configured destination based on the list of Traps/Informs that are specified to be sent (typically, all available Informs and Traps are sent to the STA application).

SMF configuration (or library management system configuration) may involve actions on both the library management system (e.g., the MVS system) and on the STA application system. On the library management system, a data collector agent is installed (e.g., a PTF containing a data collection agent may be provided on the system running HSC or SMC). On the STA application system, a connection may be created to each data collector agent such as via the STA user interface. This may involve specifying the IP address or hostname of the system with the data collector agent, a port number, the MVS or other host name, and whether the target system is running a particular host software (e.g., HSC, SMC, or the like).

With regard to installation, the process will depend on whether the software version or product of the STA application or the appliance version is being installed for a user. If the software-only installation is performed, the STA software is installed onto an existing server or computer device, and the installation can be done by the user or as a professional service. The server need not be dedicated to the STA application, but the server has to have compatible versions of the operating system, web/application server (e.g., Web Logic), and database (e.g., MySQL or the like) already installed on the server. The server further should have network connectivity to the tape libraries, library management system, and any other components/tools that will serve as the data sources for the STA application.

In some embodiments, the STA software is an installable package, such that it may be downloaded from a download site. The STA software may run through an unpack-and-install procedure where the software components are placed into the proper locations on the server and data storage system. The STA application is given the information to be granted access to the database. The user performing the install may specify whether a new database is to be created or if the database already exists (such as after a database restore). If a new database is to be created, the STA application may create the necessary tables, views, and users in the specified database. Once the installation is complete, the data sources are configured as described above, and alert threshold rules, alert notification rules, and summarization rules can be configured. The STA application can upgrade the database from previous releases to the current release. In doing so, some data values may be carried across "as is," others may go through a data transformation, and others may be recalculated using new or refined analytics calculations. Records are also, in some cases, purges as part of this database upgrade process.

In other embodiments, the STA application is provided to users via a network-ready appliance. The appliance version of STA may be delivered as a server with the STA application software pre-installed, e.g., a server physically installed in the user's data center or the like with physical network connectivity to the tape libraries, library management systems, and external SSP (in some cases) being provided. Initial configuration of the system may be done, e.g., with a console interface. Then, once sufficient configuration is done to get the STA appliance onto the network, a connection can be made using the web-based interface to complete the configuration. On initial power up, the user may connect to the console via the server console interface, and the user provides IP address information. This is typically sufficient to bring up the appliance and its web-based GUI or user interface. The user may now connect to the web-based GUI and complete the configuration of data sources, alert threshold rules, alert notification rules, summarization rules, and the like.

As discussed above, a key aspect of the STA application (such as applications 164, 210, and 340) is the STA database, which may be implemented as a MySQL, an Oracle, or other database. The STA database holds the data collected and calculated by the STA application as well as the data the STA application uses to operate. In many ways, the STA application functions fundamentally as a data warehouse. The STA application does not directly control the tape infrastructure, but, instead, it gathers information about the tape infrastructure, stores and processes it, and presents the data to end-users. End-users may use this information to make decisions about the tape infrastructure and may then make changes or take actions based on the information provided by the STA application.

In some embodiments, the STA application is designed using the "star schema" approach often used in designing data warehouses and online analytical processing. However, since the STA application has to capture information about a user's full tape environment and because the equipment in the user's environment may exist in a hierarchy, the STA application may use a hybrid model. In particular, key facts are captured in a set of warehouse tables and the hierarchy hardware data is captured in a set of normalized model tables, and these two sets of tables intersect. Data in the STA database continually grows and is transformed from new records coming in, but the number of records retained is also kept under control. The STA application can purge records that are no longer in use to maintain database equilibrium (e.g., at runtime).

The STA database (such as database 158, 214/222, or 344 in FIGS. 1-3) may be structured into a series of modules that contain distinct sets of data. These modules may include: (a) a tape system model; (b) a tape system warehouse; (c) SNMP staging (or library data that is minimally processed); (d) SMF staging (or library management information from the management mainframe or the like); (e) transformation tables; (f) analytics tables; (g) alerting tables; (h) localization tables; and (i) STA system tables. Each of these tables is discussed briefly below with more detailed descriptions following for several of these tables.

The tape system model is a series of tables that hold information about the configuration of the user's tape infrastructure. These tables may be organized in a normalized form to allow the STA user interface to navigate through the modeled tape infrastructure. The tape system warehouse is a set of tables that capture information from the mount and dismount events that occur in the user's environment (e.g., in their tape-based data storage system). These tables may be organized in a star schema, and the tables of the tape system warehouse may be used to capture data about exchanges and moves as well as data derived from the exchange and move data (e.g., by the analytics module of the STA application). Moves are individual robotic actions that move a cartridge from one location in a library to another. Exchanges encompass two moves with one being the mounting of a tape media in a drive and the other being the dismounting of the tape media, and exchange data also typically captures the data about the I/O performed while the tape media was mounted in a tape drive. The warehouse tables typically link into the tape system model tables to pick up information about the libraries and their components and organization.

The SNMP staging tables capture the information received as SNMP Traps or Informs and information that is retrieved with SNMP Get operations. These tables contain the SNMP data in a minimally processed form. In some implementations, individual fields (e.g., variable bindings or varbinds) are retrieved from the SNMP data and are directly inserted into the SNMP staging tables. Parsing or transformation is done by reading from a staging table, parsing and transforming the data, and then inserting the transformed data into the tape system model tables and the tape system warehouse tables.

The SMF staging tables capture information retrieved from the MVS systems using SMF records and SMF-like records. SMF records are generated by the MVS system and are retrieved by the STA application. The HSC system also generates SMF records. To retrieve configuration data, the STA application queries HSC for the configuration and retrieves this information in records formatted similarly to SMF records (hence, the "SMF-like" label). The SMF staging tables hold these records in raw form. After loading into the SMF staging tables, these records are read, parsed, and transformed and inserted into the tape system model tables and the tape system warehouse tables.

The transformation tables capture the rules for converting from the various input codes (e.g., drive type, media type, and the like) into normalized STA fields. An example of this is the media codes that appear in the incoming records from SNMP and SMF. One input code, such as "LTO_800W" implies a media family of "LTO," a generation of 4, a native capacity of 800 GB, that is a WORM tape (versus a normal data tape or a cleaning cartridge). This mapping is captured in the transformation tables, and the transformer subroutines (e.g., Java beans or the like) use these tables to decode these codes into their components.

The analytics tables provide the information used to perform the analytical calculations such as tables that contain the directions for calculating periodic summaries. The alerting tables contain the alerts detected by the STA application and the instructions for alert notification. The localization tables contain the localized values to be used when displaying data values that are to be localized. Values such as drive health, which may be "good" or "faulty" may be converted to the user's locale before being output, and the localization tables hold the conversion information. The STA system tables hold persistent data used by the STA application or system itself.

It should be understood that some of the values stored in the STA database are actually enumerations. An example is the drive health variable, which can have values such as, but not limited to, "unknown," "good," "suspect," and "faulty." In database design, these sort of values are often held in lookup tables that have integer indexes, and the integer is used in other tables as a foreign key. Queries would then typically join to the lookup table and "Where" clauses may refer to the lookup table value. Many programming languages provide enumeration types that allow a list of meaningful text values to be defined and used in the code. Some databases, such as MySQL, allow definition of enumeration types while others, such as Oracle 11g, do not, which may prevent use of enumeration features. To address this issue, the data in the database may be stored using short strings rather than integers as is commonly done. This will usually avoid a Join, yet let the code still use meaningful values. Where necessary, a "lookup table" may be created that contains the list of allowed values. These string values may make it easier to look directly in the database and make for simpler and cleaner code but are not the values that will be displayed to users of the STA GUI nor provided in printable reports. Values shown in the GUI and on reports will also typically be localized.

Returning to the tape system model, the STA database may include a tape system model module that maintains a hierarchical view of a user's tape system architecture. This module contains tables that capture the various physical entities and groupings of physical entities present in the real world (e.g., in a data center), and these tables may be normalized in practice. The tables of the tape system model maintain a history of the various entities (such as a library, a tape drive, a tape media, and so on).

Each record in these tables contains a starting date and an end date. The starting date is the date and time when the entity was first seen or data received by the STA application, e.g., the date/time when the STA application first detected an entity being installed or that existed upon STA application loading on a user's server (or installation of an STA appliance). The ending date is the last date the entity was seen (or data received for the entity), and the ending date is NULL if, as far as the STA application can determine, the entity still exists in the data center or tape infrastructure. The STA application may identify an end date when an entity is detected to have new attributes, e.g., a library with a particular serial number may be found to have a new firmware version and this may cause the STA application to set an end date as the old library record is no longer applicable.

A current view of the user's environment or tape infrastructure can be selected by querying records where the end date is null. Because of the hierarchy and the tracking of the history of entities in the tape system model, a change higher up in the hierarchy will propagate into lower levels. In the example from above, when a new record is created for the same physical library as a result of loading new firmware, all the library's subordinates will also require and be provided new records in the STA database.

Figure 5:
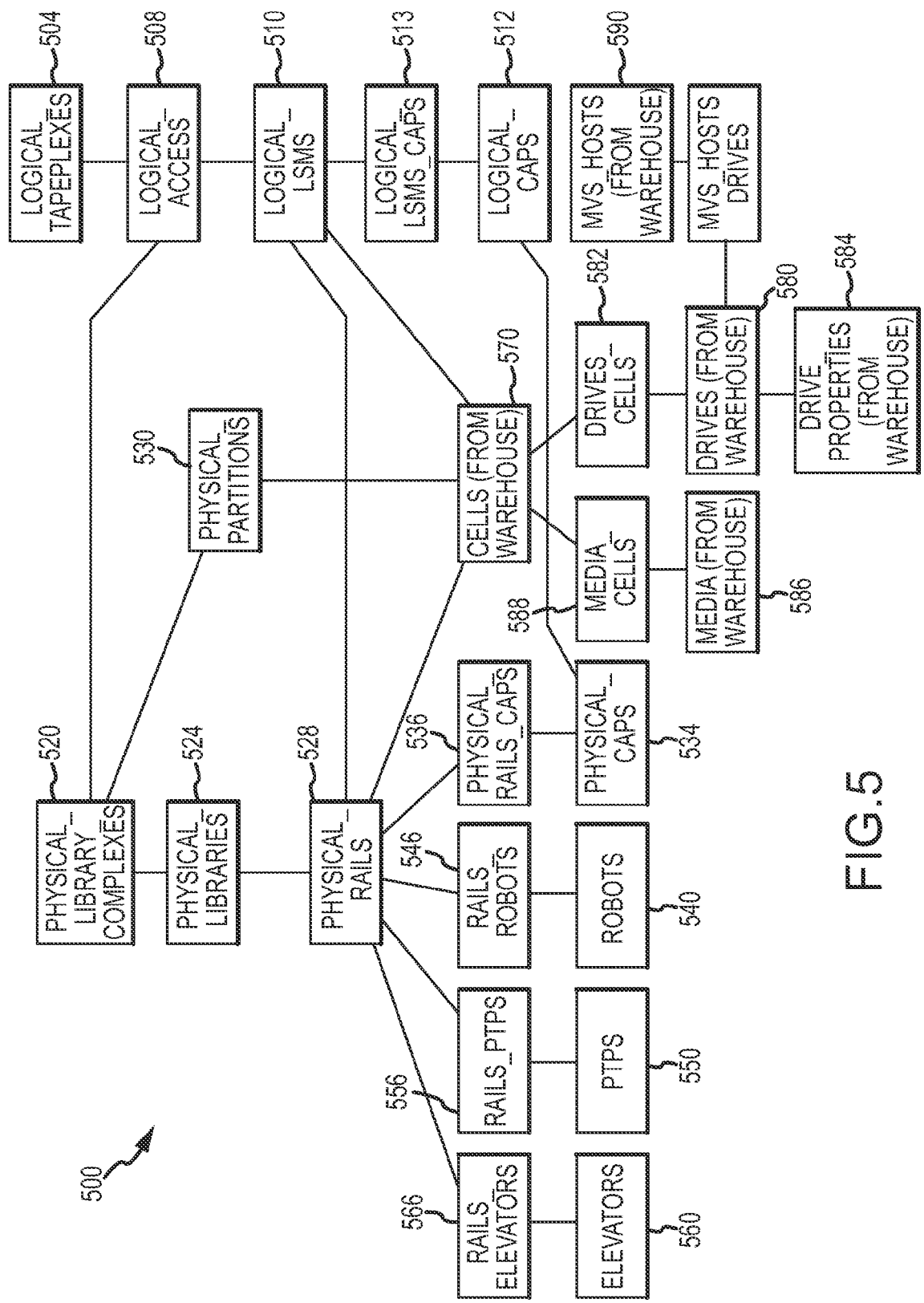
FIG. 5 illustrates an entity-relationship diagram (ERD) of tape system model tables for one exemplary, but not limiting, implementation of an STA application and STA database.

At this point, it may be useful to describe a set of exemplary tables that may be utilized by a tape system model module. FIG. 5 illustrates an entity-relationship diagram (ERD) 500 of the model tables along with a few of the warehouse tables where there is overlap for one exemplary, but not limiting, implementation of the STA application. The tapeplexes 504 represent the HSC or ACSLS instances (or library management component) present in the user's environment or data center. The STA application may initially have no direct connection to ACSLS and may be unable to determine details about tapeplexes 504 that represent ACSLS instances. For MVS HSC systems, though, this information is provided, and these records may be accurately created by the STA application. A tapeplex 504 may contain zero or more ACSs.

The tables include a logical ACS table 508, and an ACS or "automated cartridge system" encompasses a set of drives, media, and storage cells. A characteristic of an ACS is that any tape in the ACS can be moved to any location within the ACS with no human intervention. One tapeplex 504 may contain multiple ACSs 508. An ACS 508 may contain one or more libraries or partitions. An ACS 508 contains libraries if the libraries are not partitioned, but if the actual library is partitioned, then the ACS 508 would contain multiple partitions. In some embodiments, an ACS 508 contains one and only one partition or one or more libraries. This is a consequence of the fact an ACS contains multiple libraries only with certain tape library environments (e.g., the SL8500 environment) and partitioning is not supported in such an environment. Note, neither ACSLS nor HSC explicitly deal with libraries such that as far as both of these products are concerned, ACSs contain one or more LSMs (Library Storage Modules).

In the ERD 500, logical LSM tables 510 are also provided. An LSM is a library or a section of a library. One feature of LSMs is that one robot or a pair of redundant robots can move cartridges anywhere inside the LSM. If a cartridge is moved between LSMs, a pass through-port or elevator is used. Pass-through ports and elevators are robotic devices that move cartridges between LSMs. LSMs 510 contain a number of other entities including storage cells, drives, CAPs (cartridge access ports), and robots. The ERD 500 also includes logical CAPs tables 512, with a logical CAP being a CAP as seen by ACSLS or HSC. Because real libraries can be partitioned and CAPs can be either shared by multiple partitions or dedicated to specific partitions, a physical CAP in the real library may appear as multiple logical CAPs 512 in ACSLS or HSC. The ERD 500 may include a logical LSMs CAPs table 513, which is an association table for mapping logical CAPs to LSMs.

The ERD 500 shows the inclusion of tables 520 for physical library complexes. A string is an interconnected set of libraries that are connected with pass-through ports. In a non-partitioned environment, strings and ACSs are identical. In a partitioned environment, different partitions may be accessed by difference ACSLS or HSC servers and, so, an ACS is only a subset of a string. Physical library tables 524 are provided in the ERD 500, and a library is a physical box containing storage cells, media, drives, robotics, and electronics. Most libraries contain only a single robot or a pair of redundant robots. Thus, a library maps to a single LSM. There are exceptions, though, to this rule, such as the SL8500 where the four rails of the SL8500 are each mapped to an LSM. Tables 528 are provided to represent the rails of a tape system. For example, in an SL8500 library, there are four physically distinct sections. Each has a set of rails that the robots move on, and, so, these four sections are called rails. Other libraries may not have this physical division and, so, are considered to only contain a single rail. A key characteristic of a rail is that a tape can be moved within a rail in a single robotic action.

The tape system model includes physical partitions table 530. Libraries may be divided into logically separate partitions that are represented in table 530. Partitions are presented externally as if they were physically separate libraries. The model shown by ERD 500 also includes a physical CAPs table 534, and a CAP or cartridge access port is used to enter cartridges into the library or to eject cartridges from the library. The physical rails CAPs table 536 maps the rails to the CAPs of a library. A robots table 540 is provided, and a robot in this context may be a robotic device within an LSM that moves tape cartridges. A rails robots table 546 is an association table used by the STA application to record connections between robots and physical rails.

The ERD 500 shows a PTPs table 550, and a PTP is a pass-through port that is a robotic device used to move a tape cartridge from one LSM to another. A rails PTPs table 556 is provided that is an associate table used by the STA application to record the connections between PTPs and LSMs. In current library designs, each PTP may be connected to two LSMs. The tape system model shown by ERD 500 also includes an elevators table 560. An elevator is a vertically oriented robotic device present in libraries (such as the SL8500 library) that moves cartridges between the rails. Because each rail is treated as an LSM, elevators may be considered as pass-through ports (PTPs) in some situations. However, because they are distinct devices, the STA application may, instead, capture them in the table 560 rather than in table 550. The rails elevators table 566 is an association table used by the STA application to record the connections between elevators and rails, e.g., in the SL8500 library for example each elevator connects four rails.

The tape system model shown by ERD 500 also includes a cells table 570. Each LSM, rail, and partition contains some number of cells. Cells are locations that can hold a tape cartridge or a tape drive. Various types of cells exist, including storage cells that hold cartridges, CAP cells that are in CAPs and are used when entering or ejecting tapes from a library, transport cells that are in robots and are used when a robot is moving a cartridge, PTP cells that are locations in a rail where a PTP or elevator can grab the cartridge, and drive cells. Drive cells may be confusing in that there is a large physical location in a library where the drive can be inserted and then a smaller location in the drive where the cartridge can be inserted, and both are typically identified by the same numbering scheme.

In practice, there are three distinct cell numbering schemes in use. One is the physical address, which is the location of the cell within the physical library. A second is the "HLI address used by ACSLS, HSC, and the HLI (host library interface) protocol. This scheme was devised when the only types of libraries were the Powderhorn libraries and predecessors/variants. The HLI addresses are inadequate to represent the more complex libraries such as the SL8500 and SL3000 libraries. A mapping scheme exists between these two addressing methods. In addition, the SCSI medium (or "media") changer protocol uses "element IDs" to address the cells. The STA records all of these various addresses in some embodiments, though not all may be in use in any particular cell.

The cells table 570 is also part of the warehouse of the STA database. As such, it contains many denormalized fields. Specifically, all the various identifiers from tables such as the LSMs table 510, the libraries table 524, the partitions table 530, and the tapeplexes table 504 are denormalized into the cells table 570. The ERD 500 also includes a drives table 580, and this table represents the physical tape drives present in the tape infrastructure. This table maintains information about drives such as firmware version, and a new record may be created when this information changes. The drives table 580 is also part of the warehouse module and contains denormalized fields based on the hierarchy above it in the tape system model tables as shown in the ERD 500, for example. The drive cells table 582 is an association table that maps between drives and cells. Each record in this table 582 represents a period of time when a specific drive was present in a specific cell. A drive properties table 584 may be provided to collect operational properties of each drive in the tape infrastructure represented by the tape system model.

The tape system model shown by ERD 500 includes a media table 586 that represents tape cartridges (or tape media, media, or tapes). As with the drives table 580 and the cells table 570, the media table 586 is one of the dimension tables for the warehouse and contains a number of denormalized fields. A media cells table 588 is included that is an association table that maps between media and storage cells. Each record in this table 588 represents a period of time when a tape is in a particular storage cell. A new record is created in this table 588 when a tape is placed into a storage cell other than the one where it was most recently located. A new record is not created, typically, if a tape is mounted and then returned to the same cell, but a new record is created if the tape is mounted and then moved to a different cell when it is dismounted.

Further, the ERD 500 shows that the tape system model may include an MVS hosts table 590 that is used to represent hosts. Hosts may be physical machines, virtual machines, or MVS LPARs. This table 590 may contain only hosts that the STA application receives information about and is unlikely to be a complete representation of all machines in the user's or customer's environment or data center. The MVS hosts drives table 596 is provided as an association table that maintains a mapping between hosts and drives. Any particular host may be attached to many drives, and any drive may be attached to multiple hosts, with the table 596 containing this mapping. This information may be derived from information received by the STA application and may not represent all drive/host connections actually present in a user's environment or data center.

Returning now to the tape system warehouse module or simply warehouse, the STA database may include a warehouse that contains the detailed information about the operational activities of the tape libraries and drives. These tables may be organized in some implementations as a star schema. In a star schema, the center of the star is some "fact," and arranged around this fact are a number of "dimension" tables that contain information about the fact. For example, in the STA application data model, an exchange is a key event for which the STA application captures data. An "exchange" in this case encompasses mounting a tape onto a drive, performing I/O on the tape, and then dismounting the tape. The drive captures data about the I/O and the drive performance as the I/O occurs. This data is then passed to the library during the dismount process. The library then passes the data to the STA application, either directly using a transport mechanism such as SNMP and SNMP Informs or indirectly such as by passing the data to HSC which then passes it to the STA application using SMF records.

Figure 6:
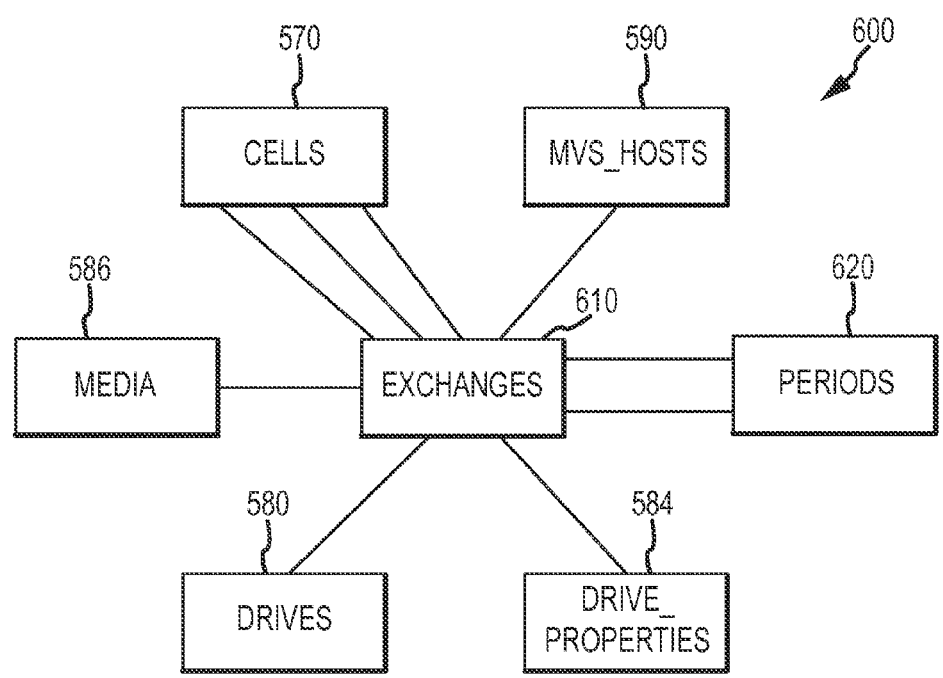
FIG. 6 illustrates a schema for tracking exchanges in the STA database.

FIG. 6 illustrates a diagram 600 of a simplified schema for capturing or tracking data related to exchanges in the warehouse of the STA database. As shown, a table 610 is provided for exchanges as well as tables, as described above with reference to FIG. 5, for cells 570, hosts 590, media 586, drives 580, and drive properties 584. An additional table 620 is used as a dimension, and the periods table 620 contains records for time periods. For the STA application, the smallest period used may be one hour or another useful time period such that there is one record per smallest time period such as one record per hour. These records start at the point in time of the earliest data in the STA database and will periodically be populated to some point in the near future. The periods table 620 may be used to "bucket" the data into time periods to make it more simple to select, for example, all exchanges that completed on a specific day or other range of time.

The exchanges table 610 captures data about each exchange. This includes items such as the start and end date/times for the exchange, the amount of data read and written, read efficiency, write margin, errors, and other information provided by the library and drive. The exchange information may be limited by the interfaces with a high likelihood that it will grow in size over time. The exchanges table 610 may have a number of foreign keys to the dimension tables. The foreign keys to the media table 586 and to the drives table 580 are relatively straightforward as these are the tape and drive involved in the exchange. Further, the hosts 590 is the MVS host involved in the exchange, and this is available only for the MVS environment. There are three foreign keys to the cells table 570 because the tape may start in one cell, be mounted into a drive (which is in some cell), and then be moved to a different cell when dismounted. The two foreign keys to the periods table 620 are for the period when the exchange started and ended.

Figure 7:
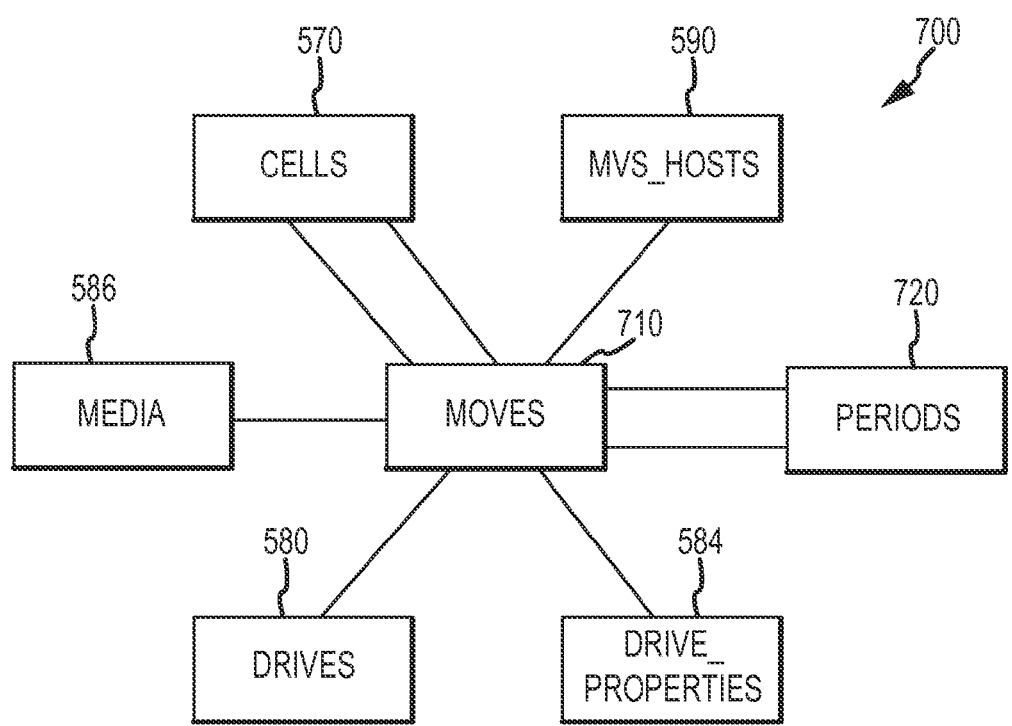
FIG. 7 illustrates a schema that may be used in the STA database to collect data on robotic moves in tape libraries.

FIG. 7 illustrates a diagram 700 of a star schema utilized by the STA application (or database module) for collecting data pertaining to moves in a tape library. A robotic move is the sequence of actions that moves a tape from one location to another. For example, a simple move might involve moving the robot to a specific position, having the robot grab a tape from a location, moving the robot to a different position and having the robot drop off the tape. In contrast, a more complex move may involve several different robots and passing the tape from one LSM to another.

The moves table 710 in the STA application or STA database records these actions. Regardless of the complexity of the actions required, a single record is typically used to capture each move. Data captured for the move is related to the library actions required, such as the time required from the robot(s) and the time the move was queued up waiting for access to the robotics. As shown, the moves table 710 share many of the same dimension tables as exchanges, e.g., the cells table 570, the drives table 580, the drive properties table 584, the media table 586, and the hosts table 590. A periods table 720 is also provided for the moves table 710. A move may only have two foreign keys to the cells table 570 because a move has only a source and a destination. A record in the moves table 710 typically does not have an explicit reference to a drive, though one may be indirectly involved if the source or destination is a drive. Note, moves and exchanges are closely linked. An exchange will have two moves, one to mount the tape and a second to dismount it. However, moves can be done for reasons other than mounting and dismounting tapes. These include entering tapes (e.g., a move from a CAP cell to a storage cell), ejecting tapes (e.g., move from storage to CAP), or a simple move (e.g., storage cell to storage cell).

Figure 8:
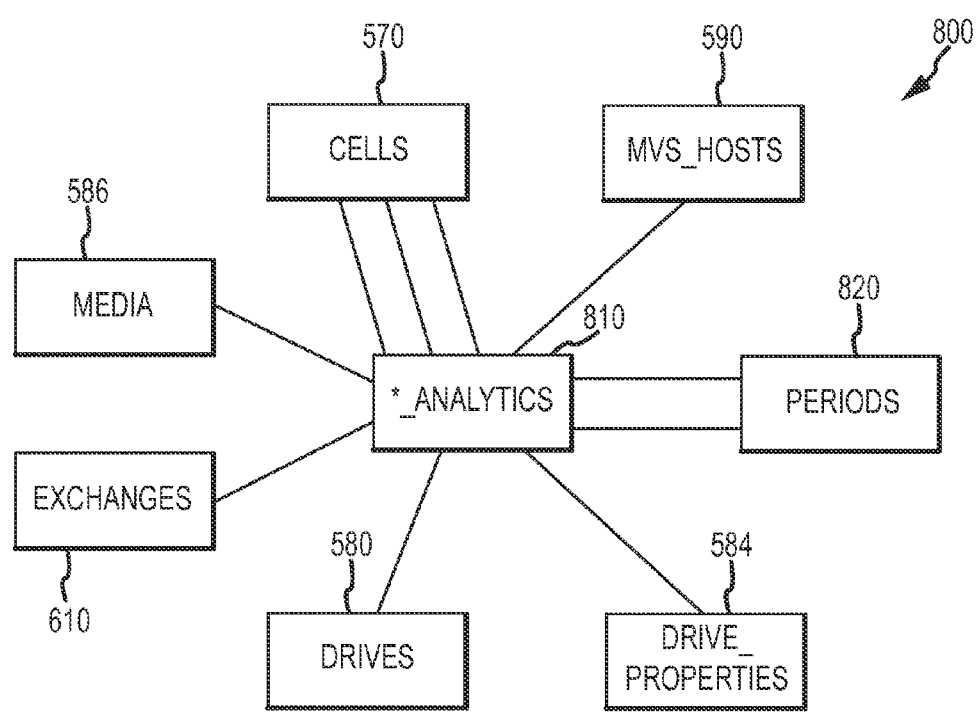
FIG. 8 illustrates a schema that may be used in the STA database to gather and store computed analytics or computed facts/results of analyses.

FIG. 8 illustrates a diagram 800 of a schema used for the analytics tables in the STA database. The analytics tables 810 are fact tables that may be used to store computed facts or results. For example, the computed facts/results may be derived from exchanges data from tables 610. In such an implementation, the tables 810 may include two separate but similar analytics tables for use by the STA application. A drive analytics table may be used to contain results relevant to the drive 580 used in the exchange 610 while a media analytics table may be used to contain results relevant to the tape 586. The relationships from the analytics tables 810 to the dimension tables (including a periods table 820 as well as tables 570, 580, 584, 586, and 590) may be the same as for the exchange table 610, with the addition of a foreign key into the exchanges table 610. While the various foreign keys other than that for exchanges are redundant, their presence simplifies queries and is in keeping with the star schema pattern that may be used for data warehousing in the STA database.

Figure 9:
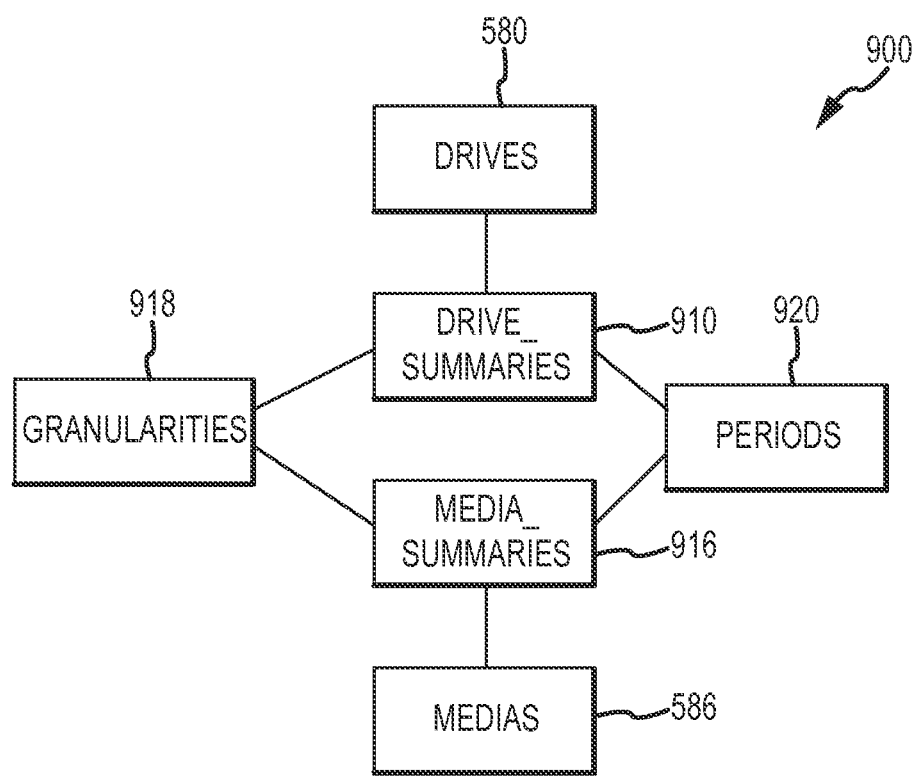
FIG. 9 illustrates a schema that may be used in the STA database to gather data for drives and media that is summarized over time by the STA application.

FIG. 9 illustrates a diagram 900 of a schema used for summaries tables maintained by the STA application in the STA database (or warehouse). The summaries tables 910, 916 contain data for drives 580 and media 586 that is summarized by the STA application (e.g., the analytics module) over some time period 920. The drive summaries table 910 and the media summaries table 916 contain data for drives and media, respectively, and they may contain fields that are similar to the fields in the exchanges and analytics tables 610 and 810. However, while the exchanges and analytics tables 610 and 810 contain data from a single exchange, the summaries tables 910, 916 typically contain data for a longer time period.

The relationships for the summaries tables 910, 916 are simpler than for the analytics and exchanges 610, 810. This reflects the fact that many or no exchanges may have contributed to the summary. Summaries 910, 916 have a relationship to a granularities table 918, which contains entries for hours, days, weeks, and so on. The foreign key to the granularities table 918 gives the length of the time period for the summary 910 or 916. The foreign key to the periods table 920 is for the period record (e.g., an hour) for the start of the time period.

The STA database may also utilize staging tables to hold data as the data loaders receive it from the data sources. The loaders are described below in more detail along with explanation of the data adapter(s) of the STA application. The staging tables may hold the data in a relatively raw form. In other words, each loader may receive or retrieve tape operations data and perform minimal processing on the received data. The transformer module or portion of the data adapter will then read the data from the loader tables, perform any necessary transformations, and then insert the standardized or transformed data into the warehouse and tape system model tables. The staging tables may take the form of SNMP staging tables and SMF staging tables in some embodiments.

Transformation tables may be provided in the database to be used by the transformers of the data adapter to standardize data. One of the steps performed by the transformer (e.g., a transformer bean or the like) in each of the data adapters may be to transform the data from input form into a standardized form. Part of this transformation is to convert from the short codes used in the libraries and related software into meaningful terms. The transformation tables may contain the input version of the various codes along with the standardized values. The transformer then will use the content of the transformation tables to make the mapping from the raw input code into the standardized values.

The database of the STA application may also include alert tables, and the alert tables may include a set of tables that hold information related to alerts. The usage of the alert tables is described in more detail in sections explaining operation of the alerting subsystem of the STA application. The set of alert tables may include an alerts table that contains the alerts generated by the STA application. An alert activities table may be provided that contains the history of each alert, which may include when an action was taken on an alert and which user performed the action. An alert threshold rules table may be included that holds the rules that specify when an alert is to be generated when some drive or media value crosses a threshold. Additionally, the alert tables may include an alert e-mail notification rules table (or other alert communications table) that holds the rules that specify when an e-mail message is sent when an alert is generated.

The STA database is used to retain both current and historical data for a tape infrastructure. That is, not only does the database capture the current tape infrastructure, it also captures the infrastructure, as it existed at any point in time in the past. This information is maintained in the same tables regardless of whether it is the most current information or older information, which allows the STA application to maintain a continuous history of the tape infrastructure. Because characteristics of devices can change over time, the STA application has many records for one physical device. For example, one of the attributes of a tape drive is its firmware version. When the firmware for a drive is updated, the STA application creates a new record in the model drives table for that drive. Unchanged characteristics, like a serial number, are the same as in the previous record, and the changed characteristics are placed in the new record.

Begin and end data are typically kept in each record so as to allow the STA application to provide a continuous history for each device and to show the exact parameters in effect at any point in time. When a change occurs and a new record is created, the ending date/time for the old record and the beginning time for the new record are set. Ideally, these will be set to the actual time of the change if the STA application has the correct time, but, if not, the STA application may use the data and time when it detects the change as the end time for the old record and the begin time for the new record.

The changes preferably propagate through the hierarchy of records in the STA database. In the above example, not only will a new model drive record be created for the updated drive but also a new model drive cells record (see attached figures) will be created to link the new drive record to its proper cell. When a change occurs higher in the hierarchy, the effects are more dramatic. For example, a change in the firmware version of a library may require new records be created for all the dependent records. The need to create new records stops when the process reaches an association table. For example, with reference to the attached figures, when the library firmware changes, new cells records are created to link up to the new library record. New media records, on the other hand, are not required as the media does not change, but, instead, a new model media cells association record is created that links the existing, unchanged media record with the new cells record. Such an arrangement allows the STA application to track the exact history of each monitored entity, and it also allows actions performed in the tape infrastructure (e.g., moves and exchanges) to be tied exactly to the configuration in place when the action occurred. When an exchange occurs, it will be linked by its foreign keys to the specific drive record that is most current when the exchange occurs. After a change occurs (e.g., to the drive firmware) and a new record is created in the drive properties table for the drive, new exchanges will tie to the new record that contains the new drive firmware version, and old records will tie to the old record that contains the old firmware versions.

The STA application will likely deal with a variety of data sources. The specific data elements received by the STA application will depend on the data source and on the specific type of device that is sending the data. In particular, the SNMP and SMF data sources send many of the same data elements, but each sends a few unique items. Further, the specific data elements returned by tape drives depend on the type of tape drive, with many older tape drives (e.g., 9940, LTO gen 1 and gen 2) producing very little data. The libraries holding these drives can provide information that mounts have occurred to these drives, but the drives may not provide the detailed data that newer drive typically produce. Hence, the possibility of missing or sparse data may be considered and addressed in some implementations of the STA application. When a data element is unavailable, the field of a record in the STA database may be set to NULL, and this allows all other parts of the STA application to know that a NULL value means the data is unavailable.

The data adapters are aware of the exact data being processed. When reading records produced for older devices, the data adapter should also be aware of how missing data is represented. In the SNMP Informs, for example, numeric values are modified such that a zero value means there is actually no data. Non-zero values represent actual data, but the value is one more than the true value. Thus, the data adapter is responsible for inserting NULL for a zero input value and subtracting one from non-zero values before inserting the value into the database. When doing calculations in the analytics subsystem, calculations that require inputs where data is unavailable will be unable to produce the output result. The analytics subsystem may be adapted to insert a NULL into the database for calculations that cannot be performed. When doing operations such as summarizing the total amount of data read or written in a library, the summarization module may include data only for exchanges that provide data. If the library contains older (so-called "unsupported") drives, the summarized result may include data only for the newer (so-called "supported") drives.

It may also be useful for the user interface module of the STA application to be configured to deal with missing values. For example, in tabular displays, missing values may be displayed as "NULL" or "unknown" or an appropriate icon. In graphical displays, missing values may be handled in different ways depending upon the graph. In some cases, treating the value as zero may be appropriate. For example, a pie chart that shows the total bytes read with a pie slice for each drive type may show zero as the value if the customer has unsupported drives. In other cases, it may be appropriate to omit the data series altogether. For example, if a line chart is made that shows daily totals of bytes read, with a different line for each type of drive, it may be appropriate to omit the line for unsupported drive types.

With the database (e.g., database 188, 214, 344) understood, it may be useful to explain exemplary implementations of data adapters (e.g., adapters 216, 217, 342) and their functionality in an STA application of the present description. The data adapter subsystem of the STA application functions to receive data from an external source and/or to retrieve data from an external source, and the data adapter subsystem also performs any necessary transformations and stores the transformed data in the STA database.

In one embodiment, the data sources supported are: SNMP data sources and SMF data sources. For example, SNMP (Simple Network Management Protocol) may be used as a data transport mechanism to provide a direct link to tape libraries of a user's data center. The STA application may use the SNMP protocol (or other transport mechanism) to gather data about the libraries, drives, and tape media that are present in the user's/customer's environment or tape infrastructure that is being monitored/managed. The STA application may also receive information from the libraries via SNMP traps and Informs about actions performed by the library. For mainframe-attached libraries, data may also be gathered by the data adapters from the MVS SMF subsystem (or other similar technology) and passed by the data adapters into the STA application for storage and analysis. The data provided by these two data sources may be similar, and there is considerable overlap in the individual data items provided by the two sources. However, it is useful to collect both sets of data as each source provides some data not provided by the other.

Each of the data adapters may follow the same pattern. A loader either receives the incoming data records or requests them from the external data source. The loader places the incoming records into a staging table in the database. The loader then sends a message to the transformer to process the new records. The transformer retrieves the new records from the database, performs the processing necessary to transform the data to the STA data model, and inserts the records into the tape system model and warehouse tables. The processing performed by the transformer may include parsing apart text records, converting from text to numbers or date/times, and performing calculations to convert the data from input meanings into the standardized STA model. The transformer also identifies the correct records to use as foreign keys when inserting new data into the STA database. In some cases it may be useful to retrieve new configuration data in order to populate reference tables or to synthesize records needed to satisfy referential integrity constraints.

Figure 10:
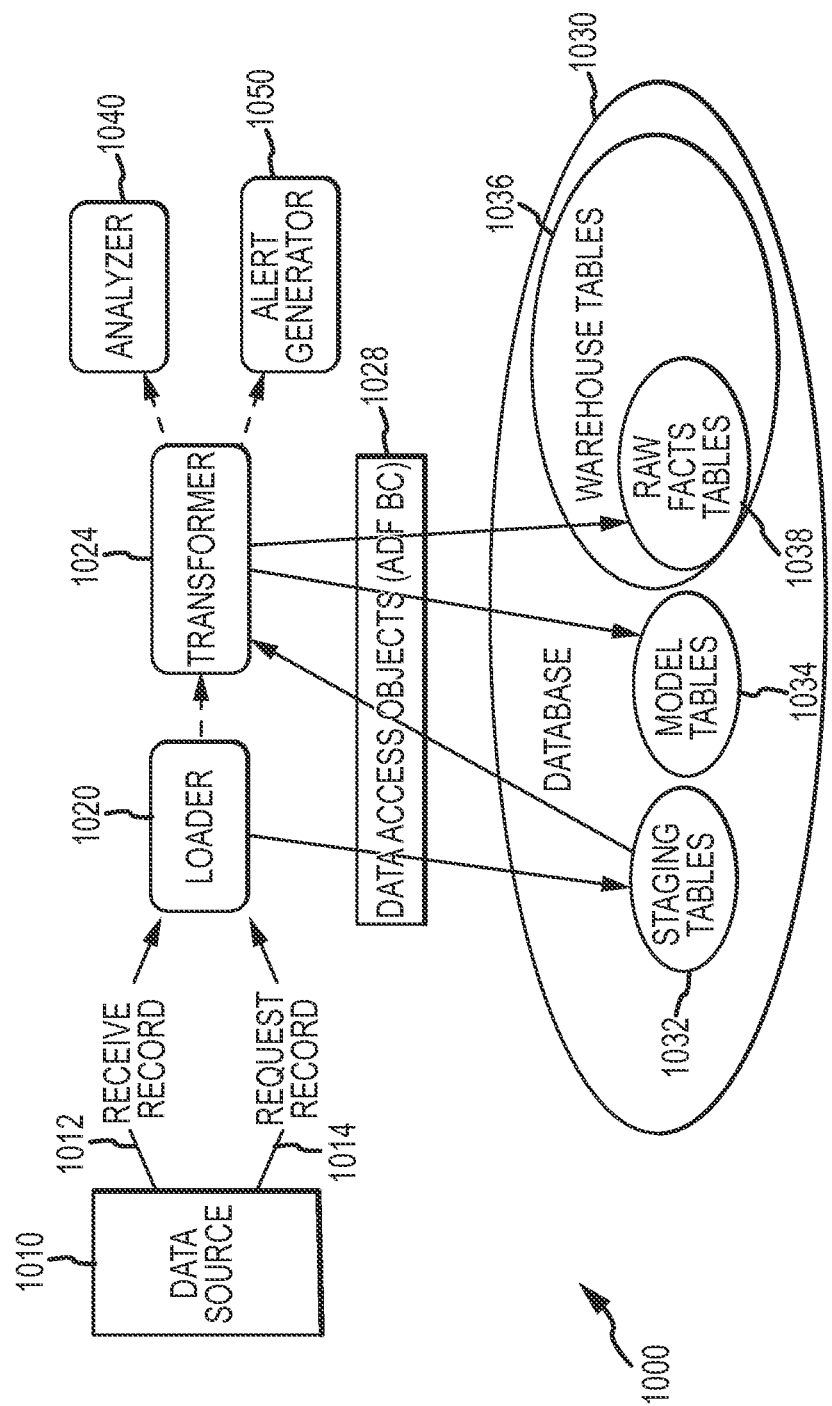
FIG. 10 illustrates a schematic or functional block diagram of a portion of data storage system implementing a data adapter to receive and retrieve data from a data source and provide this data in a raw or transformed form to tables in an STA database.

FIG. 10 illustrates a portion of data storage system 1000 implementing a typical data adapter with a loader 1020, a transformer 1024, and data access objects 1028 (see, also FIG. 2 for ADF BC 216). As shown, the loader 1020 receives 1012 or requests 1014 data records from a data source 1010, and this data is stored in staging tables 1032 in database 1030. Then, the transformer 1024 processes and transforms this data as needed to be suited for tape system model tables 1034, and also the transformer provides portions of the received data as raw or less processed data to raw facts tables 1038 of the warehouse tables 1036. The model tables 1034 and warehouse tables 1036 are then made available to the analyzer module 1040 and alert generator 1050 for further processing or use as described in more detail in other portions of this description.

Because two or more different data adapters are provided that process records from two or more different data sources, each adapter may find that the data it is attempting to load is already in the database. This happens because one event, such as a tape dismount, will cause records to be generated by two or more of the input data sources, and such a duplication of input data is a problem that needs to be addressed by the data adapter subsystem. While the events that the STA application captures have identification information associated with them, the identification may not be unique. For example, a specific tape may be mounted on the same drive twice in quick succession. A dismount event is generated each time the tape is dismounted. These events propagate to the STA application through both the SNMP data source(s) and the SMF (for mainframe tapes). This means the STA application will receive four records for the two events. The identifiers in the records, e.g., volser and drive serial number, will be the same. Further, there is no guarantee that the STA application will receive the four records in any particular order. To further complicate matters, the date/time stamps in the incoming records are typically set by different clocks and may be offset. The reconciliation step in each of the data adapters, thus, preferably is adapted to consider these complexities when determining whether or not a pre-existing database record matches with a new one.

The SNMP data adapter retrieves data directly from the tape libraries. It is the source for data about the libraries, their components, and all drives and media in the library. The SNMP data adapter handles each library independently. For example, in a SL8500 string, the STA application connects to every library in the string and retrieves data, and it uses the data about pass-through ports to assemble connected libraries into a string. The SNMP data adapter typically does not connect to either ACSLS or HSC and it, therefore, is unable to provide any information captured in these two systems. The SNMP data adapter uses the SNMP protocol to interface directly to the tape libraries. The SNMP data adapter may handle at least the following three types of data: (1) the configuration data (e.g., libraries, drives, cells, and tapes) that can be retrieved using the SNMP Get function; (2) the event data (e.g., warnings and errors) that are received from the library in the form of SNMP Traps; and (3) the dismount and move data that are received from the library in the form of SNMP Informs.

The Traps and Informs are received asynchronously by the STA application. The Get data is retrieved by the STA application. This means that two distinct loaders (e.g., loader beans or the like) are typically used in the data adapters with one receiving Traps and Informs and with another one that is executed to retrieve the Get information. A single SNMP transformer (e.g., a bean) may process the data from the staging tables and move the data into the warehouse and the tape system model.

The STA application may use an SNMP Trap loader process that continuously waits for incoming Traps. When a Trap is received, the variables are extracted from the Trap and inserted into a staging table. In some cases, several different staging tables are used in the STA database. The dismount/mount/move Informs all have a similar structure, with the bulk of the data being contained in single string. The other Traps can be grouped into sets of traps that have a similar structure, and each Trap in the same set is loaded into a single staging table. Once the incoming Trap has been inserted into the staging table, the Trap loader sends a message to the SNMP transformer.

The SNMP Get loader runs on a scheduled basis and also in response to events (e.g., SNMP Traps) received from the library. The interval may be varied within the STA application, but it may be limited by the load created on the library when walking the full MIB. The SNMP Get loader runs frequently in order to ensure the library is still active, but it will only typically retrieve the top set of MIB data. The full MIB is retrieved at less frequent intervals. The STA application receives a specific Trap when the configuration of the library changes. When this occurs, the SNMP Get loader retrieves the full configuration. However, some of the data fields available in the SNMP MIB are counters that increment continuously. Retrieving these counters at uniform intervals results in more meaningful data. The SNMP Get loader also runs immediately when the STA application becomes aware of a new library. The SNMP Trap loader uses a series of staging tables for the various components of the library (cells, drives, elevators, and so on). Once a Get operation has been performed for a library, a message is sent to the SNMP transformer.

When the SNMP loader detects a library is non-responsive, it records this in a library status table. It may be possible to hold this in the same table as the SNMP "top level condition" record. The SNMP loader continues polling the library, possibly at a faster frequency than normal. When the SNMP loader detects the library is again responding, it records this fact and then immediately may perform a full MIB walk.

Because the library cannot retain Traps and Informs for more than a short time, the library being inaccessible to the STA application may result in some lost data.

The SNMP transformer reads the SNMP staging tables and inserts the desired data into the warehouse and tape system model tables. The transformer is responsible for parsing apart the dismount/mount/move records and extracting the various data elements. The transformer locates the correct records in the dimension tables that define the foreign keys for the new Exchange or Move record. The SNMP transformer creates dimension records, when needed, such as if the record cannot be located. The SNMP transformer also handles the event traps, which typically translate into status records that hang off the tape system model. Another function of the SNMP transformer is to use the Get records to update the tape system model.

The SNMP transformer sends messages to the analytics subsystem to perform calculations using the Exchange and Move records and sends messages to the alert modules to evaluate new status events. The SNMP transformer is responsible for updating the tape system model and warehouse tables when the retrieved or received SNMP data differs from these tables. This will happen when a new library is detected, for example, and the SNMP transformer builds the initial version of a library's STA records. However, since communications between the library and the STA application may not be fully reliable, the SNMP transformer may at any time detect inconsistencies. In particular, if some Inform records are lost, such as during a period when the library is unable to communicate with the STA application, the STA application may have out of date locations for tapes. The full MIB walk will return current locations, and the transformer uses these to correct tape locations. However, the SNMP transformer preferably retains order of input data. Because walking the full MIB does not happen instantaneously and because robotic actions may occur after the MIB data is retrieved but before it can be processed, the SNMP transformer is adapted to avoid using stale data to override a move or exchange that occurred after the MIB data was retrieved but before it was processed.

The STA's SMF data adapter retrieves data about the tape infrastructure from the mainframe systems used for library management. The SMF data adapter retrieves data, albeit indirectly, from the HSC that runs on the MVS mainframes that are connected to many tape libraries. While the SMF data adapter provides additional data specific to mainframe tape operations, it is able to provide information only for those parts of the tape infrastructure known to the HSC system.

The SMF data adapter utilizes a data collector agent which is installed on the MVS host that is running the HSC system. The data collector agent extracts data from the MVS system and HSC and constructs records in SMF format that are sent to the SMF loader upon request. In some cases, only the fields in the SMF records that are of interest to the STA application are typically filled in. The SMF loader is a timed routine (e.g., a timer-driven bean). Periodically, it sends a request to the data collector agent for new SMF records. The data collector agent returns records created since the previous retrieval. Because the STA application attempts to run in near real time in many implementations, these retrievals are done frequently (such as on the order of every few minutes). The SMF loader places the SMF records into an SMF staging table.

Under normal circumstances, the SMF loader requests SMF records related to mount and dismount events. However, when the library configuration changes, a special record called a "Significant Event Notification" record will be inserted in the record list sent by the data collector agent. The data collector agent sends this as the last record in a batch and holds onto any SMF mount or dismount records generated after the configuration change. Hence, the SMF loader has to watch for this record, and if the record is present, the loader sends a request for the configuration information. This is also delivered in the form of SMF records, which may be better described as "SMF-like records" as they are synthesized by the data collector agent and are not generated by the MVS SMF system. Once these configuration records are received and stored in the staging table, the SMF loader makes another request for normal SMF records.

The SMF transformer parses apart the stored SMF records. It inserts or updates records in the warehouse and tape system model sections of the database. The SMF transformer locates the proper records to use as foreign keys for the fact tables, and it synthesizes these if necessary. The SMF transformer sends messages to the analyzer module of the STA application once it has inserted new records into the warehouse tables.

With regard to reconciliation between the SNMP and SMF data adapters, both the SNMP data adapter and SMF data adapter have access to some of the same information. Therefore, tape operations that are specific to a mainframe system that is connected via the SMF data adapter result in records being sent to both data adapters. Because there are unknown timing delays in both of these data paths, the STA application cannot make assumptions as to which variant of a record arrives first. Therefore, both transformer functions are typically written to handle the fact a record for a move or an exchange currently being processed may in fact have already been inserted into the database.

Both transformers locate the correct records in the dimension tables prior to inserting a new move or exchange record. This may be done by using identification information, such as drive serial numbers, to query the dimension tables to locate the correct dimension table record. These keys are then used to insert into the Move or Exchange tables. Rather than blindly inserting the new move or exchange record, the transformers typically query first to determine if the record already exists. However, it is possible that over time there will be many records in the Move and Exchange tables with the same foreign keys. When querying to determine if a match exists, the transformers may include other fields that will be the same for the two versions of the data yet are unlikely to produce matches with older records. These include fields such as the amount of data written and the number of errors. As a final check, if a record is found, the transformer may check the time. If it is "recent," the existing record may be taken as a match and updated with the fields known only to the transformer processing the record. Otherwise, the new record may just be inserted into the tables/database. The time period that constitutes "recent" may be determined once time delays of the two data paths are understood for a particular STA application implementation.

As discussed previously, the STA application includes an analytics subsystem (e.g., analytics subsystem 346 shown in FIGS. 3 and 4) that performs computations on the raw input from the data sources (e.g., after processing by the transformers of the data adapter module). These computations take two general forms: event based and time based. Event based calculations or analyses are performed when input data is received, and the results align with the input data. Therefore, they reflect events (e.g., mounts or dismounts) that occur in the user's/customer's tape infrastructure. Time based computations are based on the passage of time, and these computations reflect summarizations of what has occurred during predefined or user-defined time periods.

Figure 11:
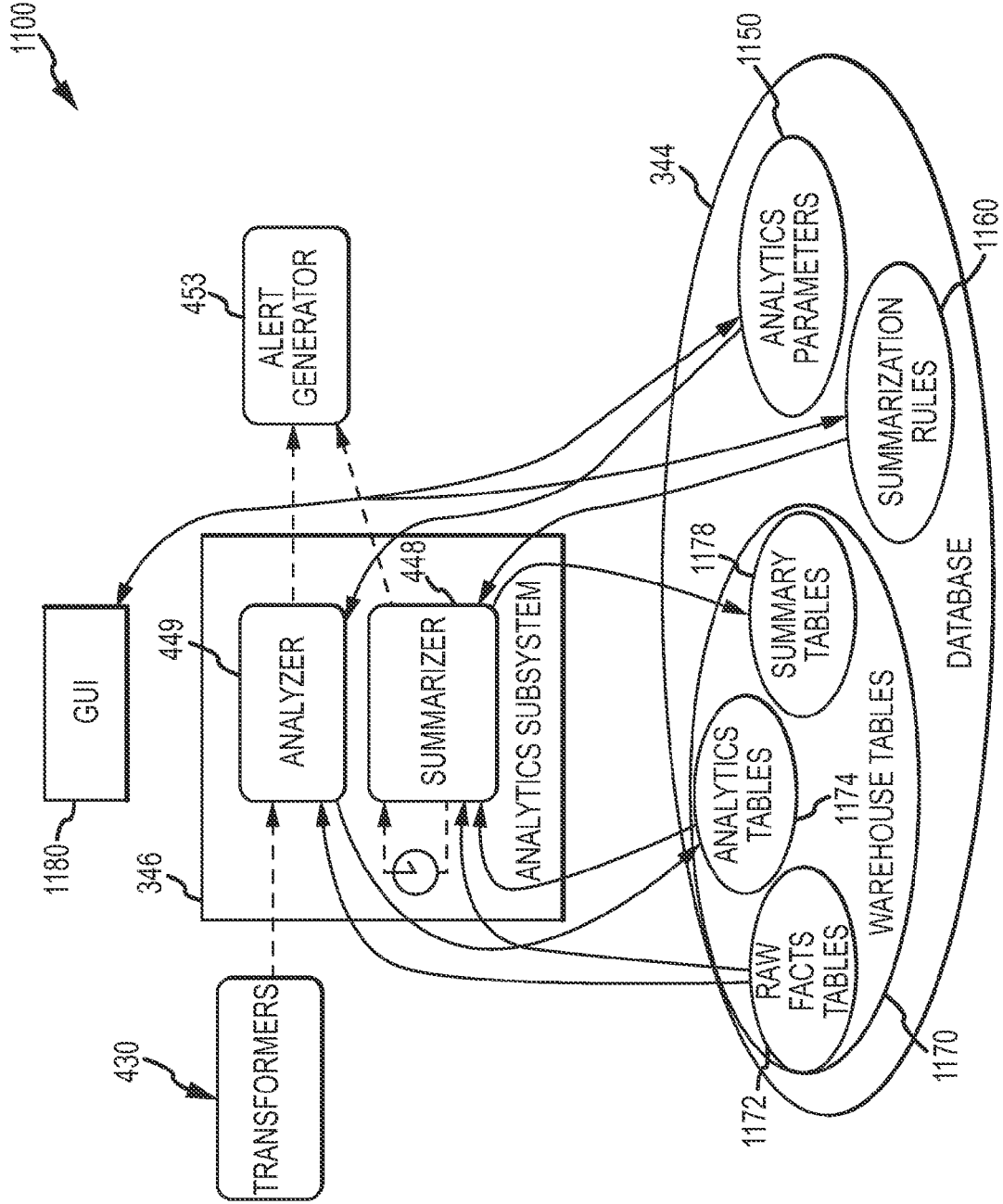
FIG. 11 illustrates a schematic diagram of a portion of a data storage system implementing a data analytics subsystem to perform analyses of raw tape operations data and to perform summarizations, with the outputs of the analytics and summarizer being viewable in a GUI and used to generate alerts.

FIG. 11 illustrates in schematic or functional block form a portion of a data storage system 1100 implementing an STA application, with the analytics subsystem 346 and its operations being stressed or shown in more detail. FIG. 11 builds upon FIGS. 3 and 4 with like elements provided matching reference numbering and only explained in detail again where appropriate. As shown, two modules or tools 448, 449 (which may be provided as Java beans or the like) form the core of the analytics subsystem 346. The analyzer 449 is message driven (e.g., a message-driven bean).

During operation of the system 1100, transformers 430 from the data adapter subsystem send messages to the analyzer 449 as new data is inserted into the warehouse tables 1170 and tape system model tables of the STA database 344. The analyzer 449 reads the raw data from raw facts tables 1172 and computes the analytics, which are then saved in the database 344 in the analytics tables 1174 in the warehouse 1170. The summarizer 448 is time based (e.g., a timer-driven bean), and it runs periodically. The summarizer 448 reads data from the raw facts tables 1172 and the analytics tables 1174 of the warehouse 1170 from the STA database 344, and, in response, it computes sets of summarized results that are stored in the warehouse 1170 in summary tables 1178. The analytics results in tables 1174 and the summarized results in tables 1178 as well as portions (or all) of the raw facts in tables 1172 may be selectively viewed by a user via the GUI 1180 generated by the user interface module (e.g., module 348) of the STA application. Further, the analytics results and summarized results may be used by the alert generator 453 as input to determine when to generate an alert.

The specific analytic calculations performed may be built into the analyzer 449. An end user may be able to edit some analytics parameters 1150 used in the analytics calculations. An example is the "how many strikes until you are out" parameter used in a suspicion calculation. These parameters 1150 are given reasonable default values, and the default or currently defined parameters may be viewed and edited in the GUI 1180 by the user of the STA application. When these parameters 1150 are changed via the GUI 1180, all analytics calculations by the analyzer 449 may be recomputed to reflect the new values. While this may mean significant computation by the STA application, it avoids a discontinuity of data that would be present if existing results that were computed with old parameter values 1150 were kept in the database 344 in tables 1174 in the warehouse 1170 while new values were being computed with different parameters 1150 and stored in the analytics tables 1174.

The summarization rules 1160 control when summaries are created, by the summarizer 448, and for what period of time. Summaries are computed for a specific time period, such as an hour, a day, or a month. The STA application is told what intervals to use for these computations and when to start the calculations, and, in this regard, a set of default rules 1160 may be provided with each installed STA application. For example, a default rule 1160 may cause the summarizer 448 to compute both drive and media summaries stored in tables 1178 on a daily basis such as each night (e.g., at midnight or the like). Another rule may call for summaries to be computed over a user-specified number of days or computing weekly summaries every night (e.g., a moving average).

The summarization rules 1160 may be viewed and edited by the user via the GUI 1180. Summaries are computed by the summarizer 448 based on these rules 1160 shortly after each set time period ends. A small delay of a few minutes or less allows for any records that are "in flight" at the end of a summary period to be received from the transformers 430 and processed by the analyzer 449 and summarizer 448. When a summarization rule 1160 is added or modified, summaries will typically be recomputed for past time periods, then summaries are computed for future times as each time period ends. When a summarization rule 1160 is deleted, all summaries computed using the rule may be deleted from the tables 1178 of the warehouse 1170.

Before turning to the alerting functions of the STA application, it may be useful to describe the analytics function in more detail as it may be carried out by the data analytics subsystem in conjunction with the user interface module (and, in some cases, the alerting module). The analytics subsystem may in some embodiments function to monitor and even predict media and drive health. It may identify questionable media and drives as well as tracking/reporting drive resets and annotations. The analytics information may be shared, in some cases, with ACSLS or similar systems. The analytics subsystem may also determine runtime performance, with this data then being viewed and organized via the GUI. Such runtime performance may include determining host software runtime statistics and queuing runtime statistics (with some calculations based on ACSLS or similar information shared with the STA application).

The following are representative examples of outputs or results of the data analytics subsystem. With regard to tape media, the analytics results (or at least gathered and/or summarized data) may include: life of media; loading; read efficiency; write efficiency; repositioning; permanent errors, media degradation; search versus RW; tape idle versus activity; signal quality; block error rates; and bad data. With regard to tape drives, the analytics, summarized, and raw (or reported) data may include: life of drive; life of servo/servo tracking errors; cleaning required; data throughput efficiency; permanent errors; drive subassembly; drive degradation; servo degradation; and environmental data. With regard to a library, the analytic or gathered/reported data may include: cartridge state; cartridge configuration; media degradation; drive state; drive configuration; library events; library capacity; library topology; partition information; library diagnostics and environmental data.

The data analytics subsystem typically will support drive and media trending analysis. This may include aggregating drive and media statistics from multiple sources to provide an overview of the entire tape infrastructure or data center environment. The trending analysis may also produce a comprehensive set of historical statistics including read/write, performance, capacity, exchange, and cleaning metrics. All drive and media data is then stored for the life of the managed device so as to provide depth for trending analysis.

The data analytics subsystem also supports drive and media health analytics. This may include generating health indicators representing a simplified view of the current state of managed devices. The health indicators may be generated through one or more algorithms or methods that utilize the historical performance of the monitored/managed devices in the tape infrastructure. These health indicators may also be designed specifically to highlight potentially vulnerable devices in a user's environment, e.g., devices that should be proactively replaced or maintained to avoid potential future problems in operation of the tape infrastructure.

The alerting module (such as module or subsystem 350 in FIGS. 3 and 4) of the STA application is used to support remote management of the health of a tape environment. The alerts may generally be thought of as including library and drive reports (which may be sent to the user or provided in the GUI) and also e-mail, text, voicemail, or other notifications (which may be sent to one or multiple addresses/recipients). Alerts generated by the STA application typically represent significant events in a monitored tape infrastructure. The STA application examines the data received from the external data sources and from its internal calculations by the data analytics subsystem to determine when an alert situation has occurred. When such a situation occurs, the STA application creates a record for the alert in its database, and then the STA application may send a notification, e.g., an e-mail or other message about the alert to one or more alert recipients. Alerts may also be viewed in the GUI, and the state of the alert may be modified by the user via this GUI.

Figure 12:
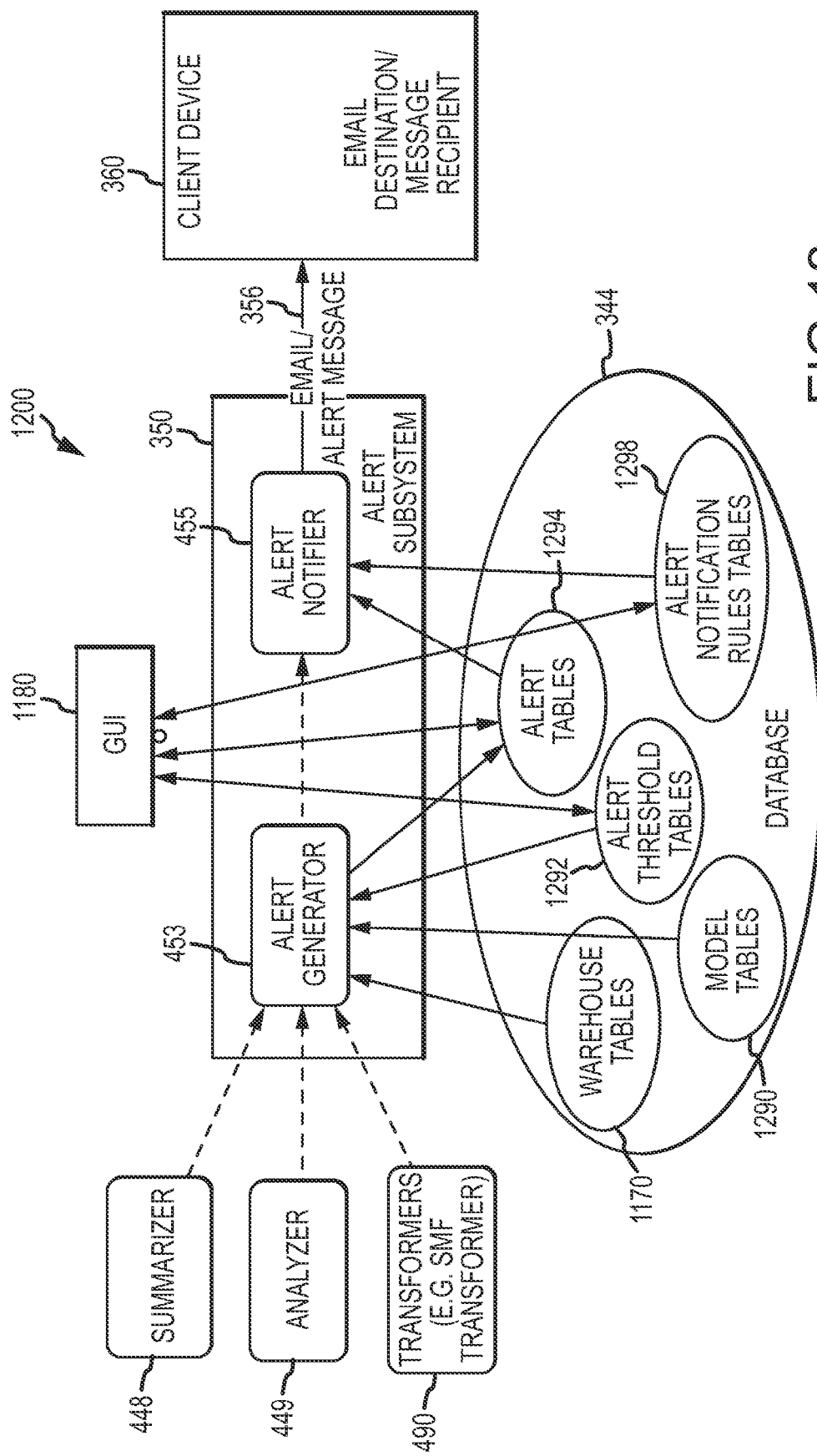
FIG. 12 illustrates a functional block or schematic illustration of a portion of a data storage system implementing an STA application to provide alerts via the STA alert subsystem.

FIG. 12 illustrates a functional block or schematic illustration of a portion of a data storage system 1200 implementing an STA application to provide alerts via the STA alert subsystem 350 to end users (via GUI 1180 and messages 356 received on a client communication device 360). This figure builds upon FIGS. 3, 4, and 11 with like components having like numbering. The alerting subsystem 350 as shown includes two message driven modules in the form of an alert generator 453 and an alert notifier 455 (e.g., message-driven beans or the like). "Alerts" are created by the alert generator 453 and stored in the alert tables 1294 of the STA database 344.

During operation of the system 1200, the alert generator 453 receives messages from the transformers 490, the analyzer 449, and the summarizer 448, with these messages being created after these other modules (or beans in some cases) update the database 344 (including the warehouse tables 1170 and tape system model tables 1290) with new records. The alert generator 453 reads these records and determines if an alert should be generated based, in part, on alert threshold values stored in tables 1292 of database 344. If so, the generator 453 creates a new alert record for alert tables 1294 of database 344 and sends a message to the alert notifier 455.

The alert notifier 455 reads the alert, e.g., in the table 1294, and the alert notification rules in tables 1298. Then, if appropriate, the alert notifier 455 will send a communication or alert message 356 (e.g., an e-mail message) about the alert to the specified destinations/recipients for receipt/viewing on client device (e.g., a wireless communication device, a personal computing device, or the like). The GUI 1180 may also be operated by a user interface module of the STA application to display alerts and allows the status to be updated/changed by the user. The GUI 1180 may also be used to create, update, and delete alert notification rules in tables 1298 of the STA database 344.

In some embodiments, the alerts have one or more of the following data elements: (1) a severity level; (2) a type, which gives a method for grouping alerts (e.g., similar alerts, such as drive alerts, may have the same type); (3) a reference to some entity in the model or warehouse tables, such as a drive, a tape media, or a library; (4) a simple state value, such as new, acknowledged, or dismissed; (5) a user-entered annotation; (6) a date and a time that the alert was created; and (7) a history of the changes to the alert.

The alert generation module 453 may be rule-driven (e.g., a rule-driven bean that implements a small number of rules, either hardwired or set up by the STA user). For example, the alert generator 453 may utilize one or more of three alert generation rules. First, a generator may alert upon library top level conditions. This rule may state that when the "top level condition," as defined in the library MIB or the like, changes that an alert is created. The type of this alert may be "Library," and the severity may be determined by the top-level condition. For example, normal may translate to "Info" severity, degraded may translate to "Warning" severity, and not operative may translate to "Error" severity.

Second, the generator may use a device rule to process SNMP Traps from a library. For example, Error and Check traps may result in "Error" severity alerts. Warning traps may result in "Warning" severity alerts. Information and Good traps may result in "Info" severity alerts. If a specific device can be identified, such as a drive, the type of the alert may match that device type, but, if not, the type may be set to "Library." Third, the generator may use a threshold rule to process drive and media analytics and exchange data. The user can specify any attribute from the analytics or exchanges records to monitor along with a threshold and direction. The user may also specify a severity level for the alert. When the alert generator observes the specified attribute crosses the threshold in the specified direction, an alert is generated. The type of the alert may be set to "Drive" or "Media" while the severity may be the specified value of the rule.

The alerts are inserted in the alerts table in the STA database 344, and a message is sent to the alert notifier 455 to determine if an alert message 356 should be sent. The alert notifier 455 uses the alert notifier rules in table 1298 to determine if a message should be sent (along with what form the message should take (e.g., an e-mail, a text message, or the like) and to which recipients/client devices 360). These rules include an alert type, a severity level, and a recipient (e.g., an e-mail address). When a new alert is generated that matches the alert type and severity in the rules of tables 1298, an e-mail or other alert message 356 is sent to the specified address.

The description of and figures herein showing the alerting mechanism are generally based on the issuing of email (or similar personally directed form like text or the like) to the customer/user of the system. Another significant function of the alerting mechanism is to generate automated service requests (ASR), with or without customer/user intervention, to a monitoring or call center (e.g., an Oracle Call Center) when the STA system detects problems in drives or libraries. Automatically attached to each ASR will be the hardware and STA logs necessary to determine the root cause of the problem.

The functionality of the GUI 1180 that is related to alerts allows a user to view a list of alerts (e.g., in a multi view), to view a single alert (e.g., a single view), to edit the status of the alert, and to insert an annotation on the alert. The GUI 1180 allows the user to specify the threshold limits in tables 1292 in the database 344 (e.g., whether to watch drives and/or media, an attribute to watch/monitor, the threshold value, the crossing direction, and the severity level). The GUI 1180 also allows the user to create, edit, and delete notification rules in tables 1298.

The STA user interface module/component (e.g., elements 218, 348 of FIGS. 2 and 3) of the STA application (e.g., applications 164, 210, 340 of FIGS. 1-3) functions to provide a unified tape monitoring interface. It may deploy a unified interface, such as a GUI on a personal computer or other client node or an interface on a mobile communications/computing device, that delivers a complete view across an entire tape complex or tape infrastructure of a data center. The user interface can be used by a data center manager to monitor libraries, drives, and media that may be provided in a single location or be geographically distributed (and/or remote from the manager using the user interface).

In some embodiments, the user interface module of the STA application provides a browser-based GUI. In other words, a user/customer may access the STA GUI using a compatible web browser on their client node/device, which is linked to a digital communications network. The user may enter an IP address or the hostname of the STA appliance or server when the STA application software is installed. Once the user enters valid login credentials (e.g., userID and password), they may be presented with a dashboard or overview screen. This screen may give a limited set of important information about a monitored tape infrastructure. From this initial screen, the user may drill down to more detailed information about the tape infrastructure.

The STA application may include focused views into a tape environment, and these may include specialized reports provided in the GUI. The specialized reports may be designed to simplify viewing and reviewing performance, health, read/write, capacity, and cleaning data elements so that a viewer/user of the STA application can quickly identify and focus on targeted areas within a tape environment. Report templates may be included that provide suspect drive and media reports. The STA application and its user interface module may provide pre-loaded/default reporting views in its GUI/user interface, but many embodiments also are designed with the flexibility to meet the needs of unique tape environments. With this in mind, the user interface module may enable a user to create and save their own report templates that are customized to suit their tape infrastructure and management/monitoring needs.

In operation, the STA application monitors and collects data about a number of entities. Examples include very concrete entities such as drives and media as well as abstract entities such as exchanges (e.g., the data about a cycle of a tape mount, I/O, and dismount) and analytics (e.g., the results of calculations performed on the data from an exchange). Entities also may include STA-specific concepts such as alerts and the configuration of library connections. The STA GUI, hence, functions to display and, in some cases, to allow editing of these entities.

Each of these entities may have a set of attributes that provide information about the entity. The STA user interface module provides various screens that display information about these entities. In some cases, various aggregations of these attributes (e.g., total megabytes read by a drive during a day or the average error count of a drive over time) or counts of events are of interest to a user, and the user interface may provide ways to display such aggregated values. Some of the entities have a hierarchy, and the user interface may provide ways of navigating this hierarchy. This hierarchy is defined in the STA data model and is reflected in the GUI. While the STA application may display individual entities or sets of entities, many screens will contain data from multiple different entities. In database terms, this is a "join" operation between the different entities. For example, a "drive health" display may pick up fields for drives, exchanges, and analytics. In this description, the term "information set" may be used to refer to a set of related attributes. Displaying these information sets constitutes a large portion of the GUI functionality. Groups of identically structured information sets, such as the drive health information sets for all drives in a library, are frequently used in the STA GUI.

With regard to a useful GUI structure, the STA GUI provides one or more "windows" or "screens." Each of the screens may be divided into "panels," that are each a section of the screen where "components" appear, with components including things like menu items, combo boxes, tables, graphs, and the like (which may also be termed controls, widgets, and so on). The STA application may show the data in an information set in various views. Some views show the attributes of a single or multiple information sets. Other views show aggregations of the attributes from a group of information sets. The aggregations may also include simple counts of items that meet specified criteria. Panels or screens that show these views may also include components that allow selection, sorting, navigation, or other functions.

In some embodiments, the user interface module of the STA application provides at least three basic types of views. First, a "single" view is provided in the user interface that shows a list of attributes for one single information set. This view is a list of named values, with the name/value pairs arranged vertically, for example, but other more complex arrangements (e.g., grouping related fields) may also be used. Second, a "multi" view is a table with multiple information sets. Each row is one information set and attributes of the information set are shown, for example, in columns. This typically is the same information shown in the single view but for more than one entity (but, of course, it is possible only one entity may be shown in such a table). Third, an "aggregate" view is provided that may also be a table. In this view, attributes of the information set are used such as for both rows and columns and show some aggregation in the cells of the table. Such a table may be thought of as a pivot or crosstab. In practice, variations of these three types of views are used throughout the STA GUI to display one or more information sets.

In addition to these three basic views, specialized views may also be provided such as a dashboard and an overview. A "dashboard" view may be provided that is a very high level view of everything that the STA application "knows" (e.g., collected raw data (in the warehouse and tape system model tables), analytics results, summarized data, health indicators, alerts, and the like). The dashboard view may be thought of as being a summarized or boiled-down version of the monitoring data. The dashboard functions to give the user a quick look at their entire tape infrastructure. The "overview" view also typically covers the entire tape infrastructure. This view provides additional detail over that provided by the dashboard view but may still provide summarized information. This summarized data may be presented in the form of charts, lists, tables, or other display components that are useful for meaningfully presenting the data from the STA database. Preferably, the STA application will be configured to provide a number of different graphs or tables that can be shown in the dashboard screen, and a user may be able to choose the items they want to be shown in the dashboard and overview screens of the user interface. The various graphs, tables, or reports on the dashboard may be called "portlets."

Figure 13:
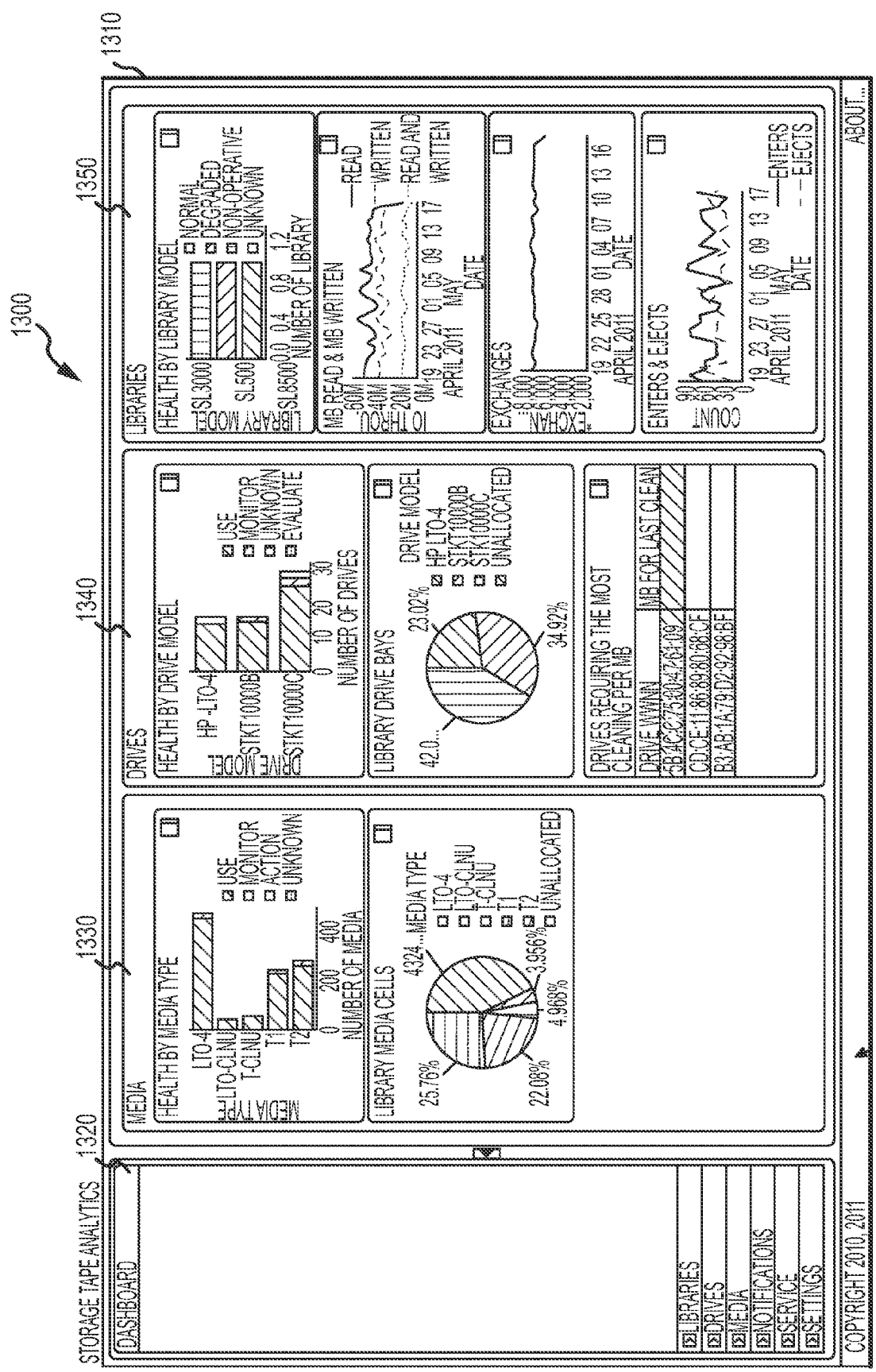

At this point, it may be useful to describe the STA user interface function with reference to several exemplary screens and views. FIG. 13 illustrates a screenshot 1300 of an exemplary GUI that may be generated by the STA application for display and interaction on a client device (e.g., a monitor of a tape operations manager's workstation or the like), and the GUI 1300 includes a window or screen 1310 providing a dashboard view, as shown with dropdown/menu panel 1320 (with the Dashboard view being selected). The dashboard of screen 1310 may be the first screen seen by an STA user when they log onto the STA system.

As shown, the dashboard view may include a number of panels providing STA data at a relatively high level. These may include: (1) a media panel 1330 (which may show, in smaller views or subpanels, health of media in the tape infrastructure such as by media type (e.g., use, monitor, action, and unknown indicators may be assigned) and may show types of media in library media cells); (2) a drives panel 1340 (which may show health by drive model, drive models in various library drive bays, and drives requiring the most cleaning per megabyte, or the like); and (3) a libraries panel 1350 (which may show health by library model, volume of data reads and writes, exchanges for a time period, enters and ejects by counts over a monitoring time period, or the like). Generally, the subpanels/views may be used to give a user status of components of a tape infrastructure (such as status of libraries, media, and drives) and may show alerts in some embodiments for various components/portions of a tape infrastructure. An "Action" element may be provided in the health portlets to call monitoring personnel (customers of the STA application/service) into action.

Figure 14:
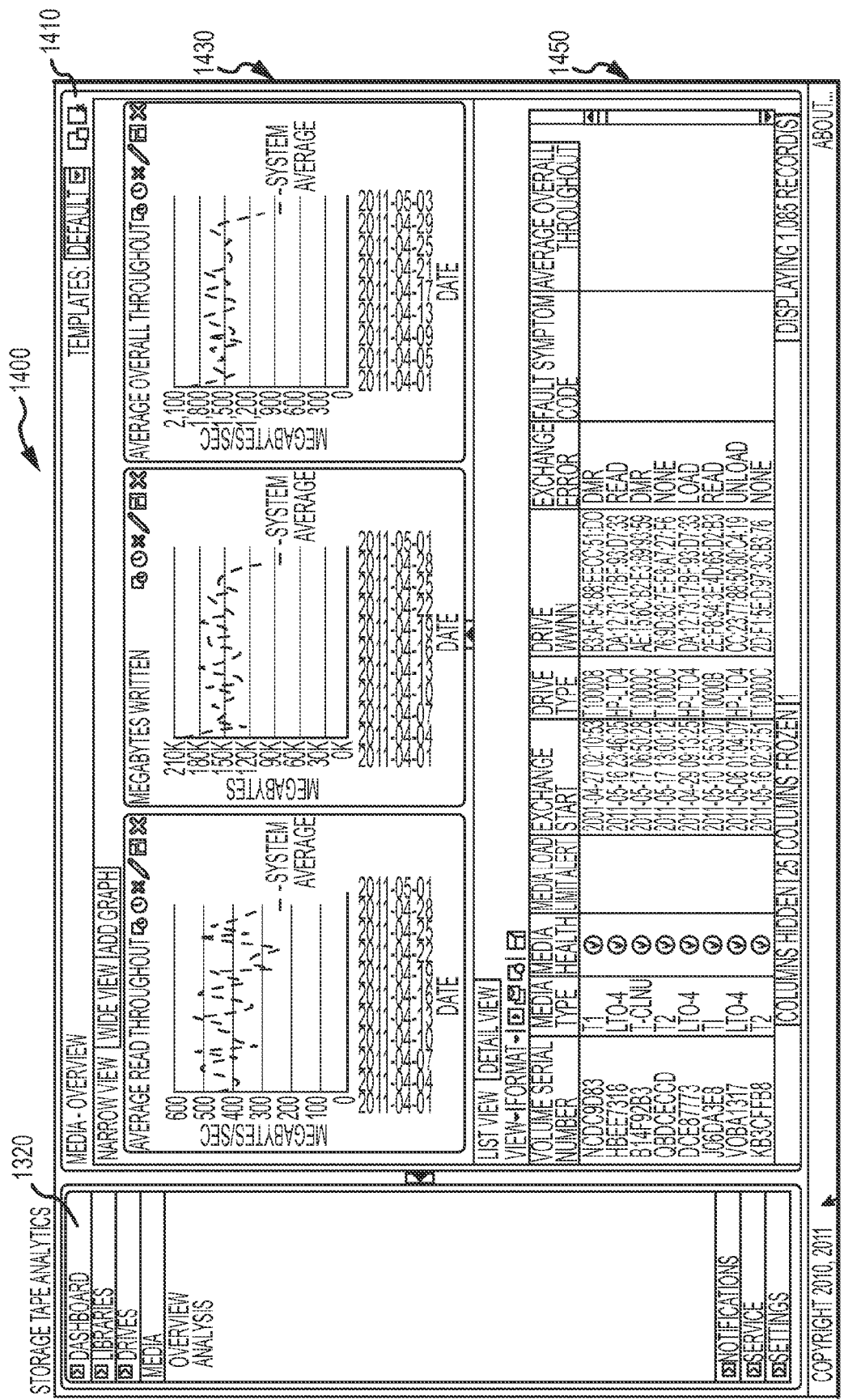

FIG. 14 illustrates a screen shot 1400 of the GUI provided by the STA application when an overview has been selected by the user for media as shown by the new state of the GUI panel 1320. A panel 1410 is provided that provides an overview view for media in the tape infrastructure monitored by the STA application. The panel is shown to include data 1430 in graph format (e.g., average read throughput, megabytes written, and average overall throughput) and also data in table form (or in list or multi view) 1450 (e.g., a table showing the following for each volume serial number: media type, media health, an alert status for a media load limit, an exchange start time, a drive type, drive WWNN, exchange errors, fault symptom codes, and average overall throughput).

Figure 15:
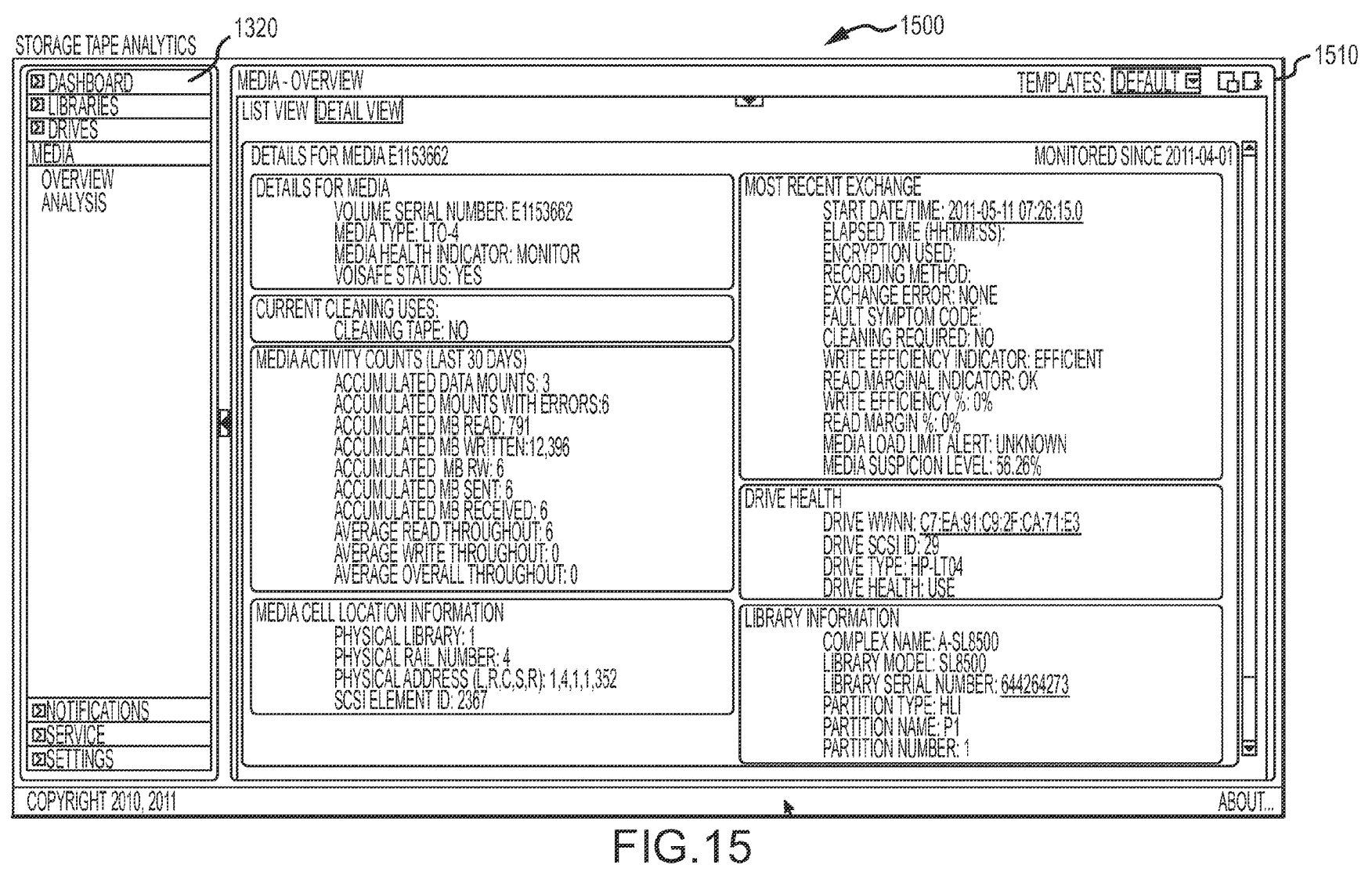

From the screen shown in FIG. 14, a user may choose to drill down or to view a single view for a particular component of the tape infrastructure. As shown in FIG. 15 with screen shot 1500 of the GUI, the user has selected a detail or single view for a particular tape media. This may provide additional STA data in raw form, in summarized form, and/or the results of analytics for the media (e.g., a health status or the like). For example, as shown, the panel or view 1510 may include subpanels or smaller views that provide: details for the media (which may include a calculated media health indicator), current cleaning uses, media activity counts for a particular prior time period, media cell location information, most recent exchange data (which may include exchange errors, a write efficiency indicator, and a media suspicion level as well as other analytics results), drive health, and library information.

Figure 16:
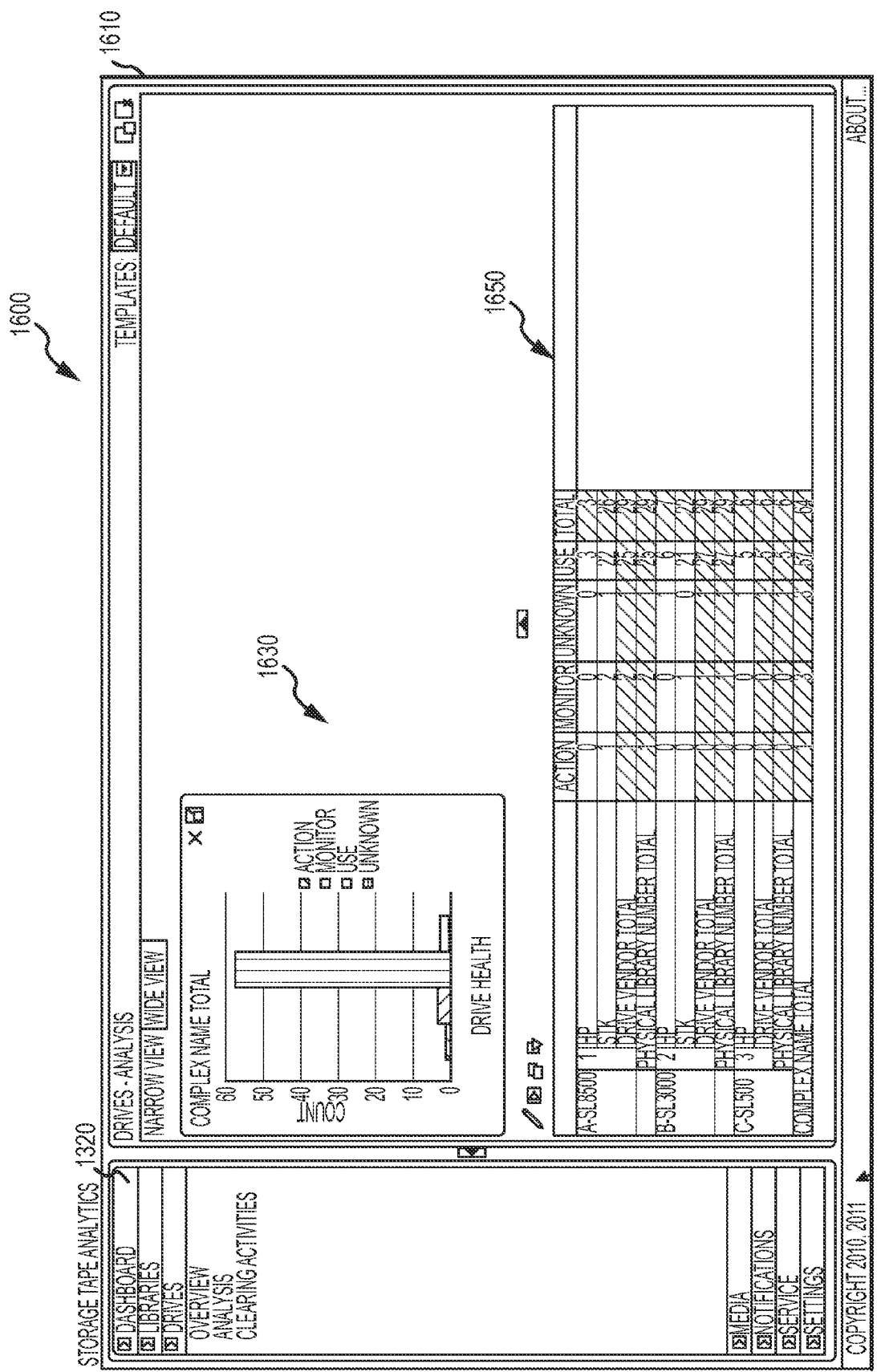

Instead of selecting an overview view, the GUI may be operated to particularly retrieve analysis data (e.g., graphics generated based on results/output of the analytics subsystem) for components of the monitored tape infrastructure. FIG. 16 illustrates a screen shot 1600 of the STA GUI after a user has selected from the pull down menu of dashboard panel 1320 to view analysis data for the drives of the tape infrastructure. In this non-limiting example, a panel or view 1610 is provided with drive analysis data from the STA database provided in graphical form at 1630 and in list/table form at 1650. This particular example shows computed or calculated health of drives with the health shown as being either unknown, use, monitor, or action (with use being good health and action being bad operational health).

As can be seen with these screen shots, much of the data captured by the STA application lends itself well to being displayed graphically. For example, a drive health report may show the latest values of drive health parameters. The STA tracks a history of these parameters in addition to the most recent values, and these values may be displayed in a multi view, with various times in the rows of the view. More particularly, this would be a multi view of the drive analytics (if individual data points are desired) or drives summaries (if periodic values are desired). Since these parameters are numeric, a graph is a natural way to show this data. Further, displaying this data as a graph allows the data for multiple parameters or for multiple drives to be displayed on one graph. Graphs may also be used to display the STA data in aggregate views. For example, pie charts and bar charts are good representations of rows or columns in an aggregate view. Small graphs called "sparklines" may be displayed inside multi and single views in the GUI. Sparklines show a graph, typically a line graph in a small size and without the usual axes and labels typically shown on larger graphs. The idea of the sparkline is to give a view of the trend in the parameter rather than a detailed view of the actual parameter values.

The single, multi, and aggregate views may be used for the different entities and information sets. In most cases, the multi and aggregate views also have selection criteria applied to them. For example, a multi view of drives might use selection criteria to limit this list to all the drives of a specific type or in a specific library. Various forms of selection may be provided by the STA user interface, tailored to the items being selected. For example, time ranges may be controlled with sliders or selections like "last 24 hours" or "last seven days" while the choice of drive type may be done using a list of possible choices, each with a check box next to it for example.

The STA GUI may, in some implementations, provide a user with capabilities to customize views to suit the user's needs. For example, ADF tables or other tools may be used to provide the ability to do sorting by clicking on column headers. The pivot tables used in the aggregate views provide the ability to swap rows and columns. In tables, columns may be hidden, exposed, and reordered. These capabilities are exposed to the STA application users. A user may also annotate many elements throughout the user interface. Annotations serve to help document key events, key decisions, anomalies, tape system and environment information specific to an installation, and so on.

The GUI also provides the ability to save the parameters used to define any view. Once a user has adjusted a view to show the data of interest, the user interface may save the parameters used to produce that view as a template. The users may give the template a meaningful name and choose to make the template visible to other users of the STA application/system. The saved template may include a base view, any selection criteria used for the view, any sorting that has been applied, and any column hiding choices. As will be understood, there are quite a large number of potential templates that may be displayed by the STA user interface module. It is likely that a user may be primarily interested in a small number or subset of all these available templates, and the user interface module allows them to customize these templates to specifically fit their tape monitoring needs. The STA application will, in some embodiments, provide the ability to assemble a set of views and/or panels into a customized screen. A user can select the views to be displayed on a screen and then save the customized screen layout. The views added to a custom screen can be either pre-defined or default STA views or customized views.

Figure 17:
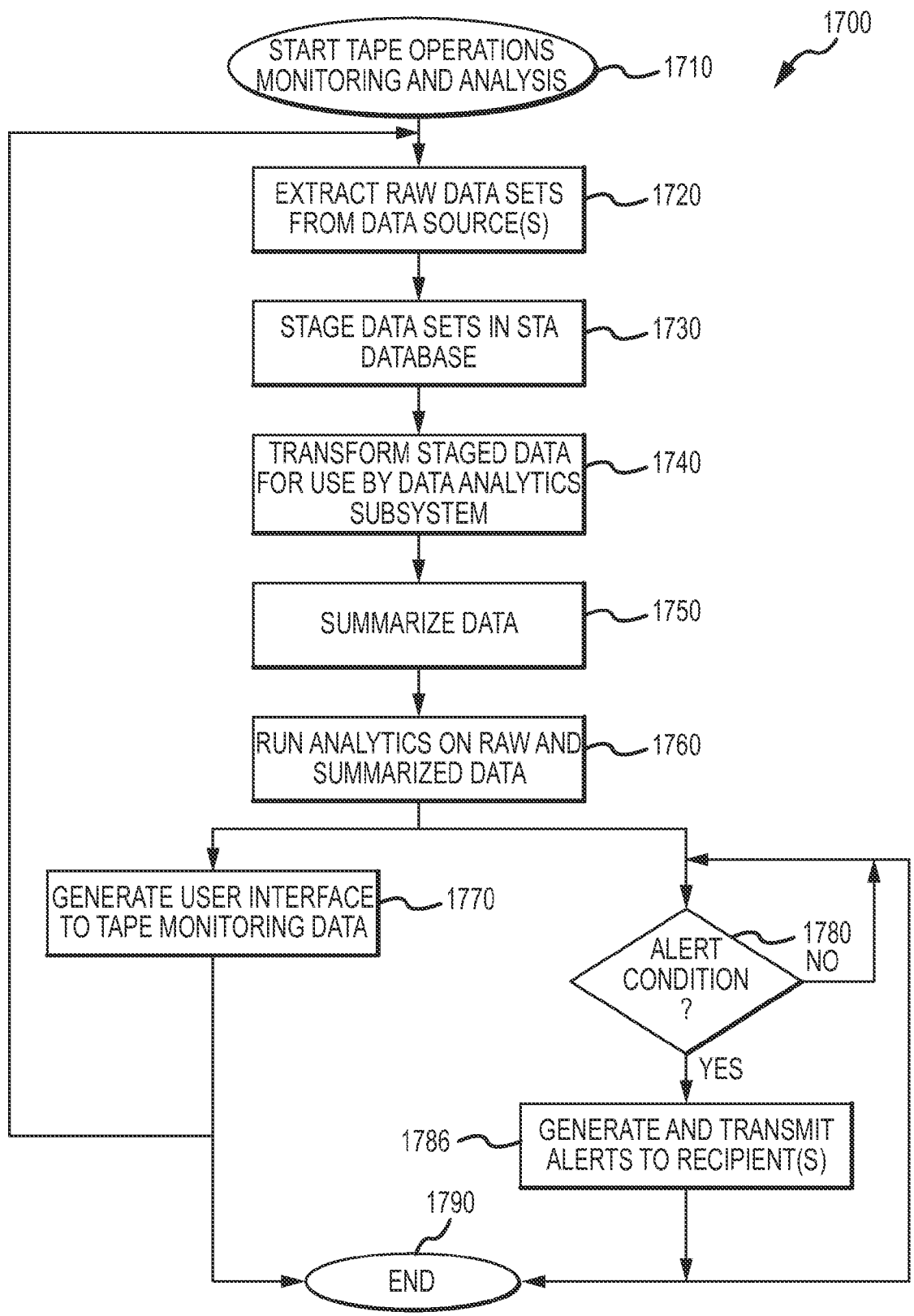

FIG. 17 provides a flow chart of a tape operations monitoring and analysis method 1700 that may be performed during operations of a data storage system described herein that includes and uses an STA application such as the STA applications shown in FIGS. 1-4. The method 1700 starts at 1710 such as with the connection of an appliance pre-loaded with an STA application into a user's data storage system or with the installation of an STA application onto a server that is communicatively linked with a data center (or tape infrastructure including one to many tape libraries), with a library management mainframe (in some embodiments), and with a user's/monitor's client device (e.g., a computer workstation, a mobile communication device, or other device for receiving data from an STA user interface module).

The method 1700 continues at 1720 with the STA application extracting raw data sets from the data sources. The data sources typically will include a tape library and the STA application may be provided direct communication with the library, and a data transport mechanism such as SNMP is used to communicate raw data (e.g., tape mount and dismount records) to the STA application. The mainframe data also may be gathered (requested in some cases by a data collector agent on the mainframe) and provided to the STA application to allow it to have a more complete set of operational data for each of the tape libraries (e.g., some of the data from the mainframe may not be found in the tape library data). At 1730, the STA application uses data loaders to store the raw data, typically with minimal parsing to retrieve useful or desired data, into staging tables in an STA database (provided in memory on the device running the STA application or otherwise accessible by the STA application). Then, at 1740, the staged raw data is processed by transformers (e.g., SNMP transformers) to normalize the data for further processing (use by the data analytics subsystem) and use in generating views of the STA GUI (use by the user interface generation module), and the transformed data is stored in tape system model tables and warehouse tables as discussed in detail previously.

The method 1700 then continues on with the data in these tables being summarized at 1750 and then (or concurrently) the summarized and raw transformed data being analyzed at 1760 (e.g., algorithms and computations being performed using analytics parameters) by the data analytics subsystem. The summarization 1750 may be performed to pre-compute some information to make the analytics module/processes at 1760 more efficient. The analytics may include computing operational values such as efficiencies and may also include determining current health of various components as well as predicting failures of these components (e.g., predicting a decline in the operational health of a drive or a tape media to a point where its use may not be advised or even possible). The results or output of the steps 1750 and 1760 are also stored in tables in the STA database.

At 1770, the method 1700 continues with generating a user interface (e.g., a browser-based GUI) to the tape monitoring data. The data includes the raw facts tables, the analytics tables, and also the summary tables, and the viewer may use default views or screens or may reorganize the displayed data or views to create customized templates for viewing the operational data for a particular monitored tape infrastructure or data center. The method 1700 may then end at 1790 or continue at 1770 or at 1720 (as data is continued to be received/gathered and processed by the STA application to update or refresh the STA data and, hence, the GUI/user interface at 1770).

At 1780, the method 1700 also is shown to include determining, with an alert module of the STA application, whether an alert condition has occurred (e.g., is an alert required based on the summarized data, raw data, analytics outputs, and alert notification rules tables). If not, the alert condition monitoring continues at 1780. If yes, the method 1700 continues at 1786 with the alert module generating an alert and transmitting alert messages to a list of recipients, e.g., sending an e-mail message or the like to each address in a list provided in the alert notification rules tables of the STA database. The alerts may also be presented in the user interface and stored in alert tables in the STA database. After step 1786, the method 1700 may continue at 1780 or end at 1790 (and, also concurrently may involve steps 1720-1760 as well as step 1770).

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. The above description is, of course, not limited to use with a physical library or data center with multiple tape libraries. The STA application can readily be used to monitor operations of a virtual library or data center. Further, the STA application may track operations based on physical groupings and/or based on logical groupings of entities.

The following discussion is provided to highlight and explain features of exemplary GUIs provided by the STA application of the present invention and its user interface modules (software or code). As discussed above, FIG. 13 illustrates a screenshot 1300 of an exemplary GUI that may be generated by the STA application for display and interaction on a client device (e.g., a monitor of a tape operations manager's workstation or the like), and the GUI 1300 includes a window or screen 1310 providing a dashboard view, as shown with dropdown/menu panel 1320 (with the Dashboard view being selected).

The dashboard view shown in the screenshot 1300 of an STA GUI is configured to provide a one-screen overview of health (by media type, by drive model, by library model, and the like). The one-screen overview also provides a summary of the component types in a monitored tape infrastructure (e.g., one, two, or more libraries on a customer site or managed by a customer in two or more sites) as well as activities occurring in the tape infrastructure (MB read, MB written, dismounts, exchanges, enters/ejects, and the like).

Figure 18:
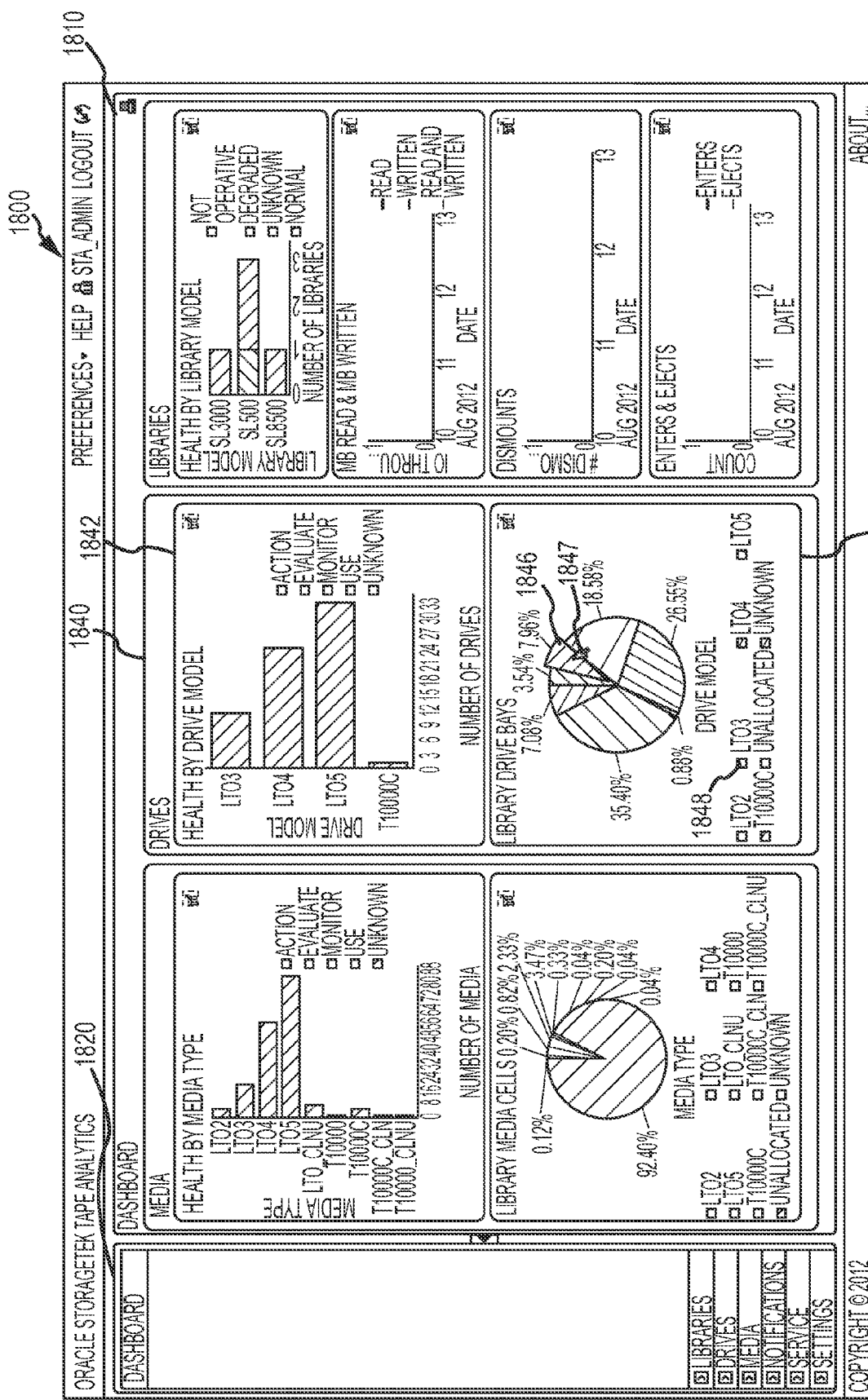
FIG. 18 illustrates a screen shot of another embodiment of a GUI generated by the STA application showing use of a pop up or similar mechanism to provide additional information associated with (and stored in memory) graphical elements to a user of the GUI based on their input (positioning of the cursor or the like)

FIG. 18 illustrates a screenshot 1800 of another exemplary GUI generated by the STA application in the dashboard view. The GUI of screenshot 1800 includes a screen 1810 providing a dashboard of the monitored data along with a dropdown/menu panel 1820 (with the Dashboard view being selected). One interesting aspect of the dashboard view of GUI 1800 is that it allows a user/operator to provide input to easily and quickly access raw or processed/summarized historical and/or current operating data for groups of or individual components. In other words, a user is able to drill down from the dashboard and other GUI screens/views to obtain more data that may be filtered or organized in a variety of ways that are useful for analyzing tape infrastructure data.

As shown, the GUI screen 1810 includes a drives panel 1840 with a first subpanel 1842 showing health by drive model as well as showing the number of drives of each model in the monitored tape infrastructure/system. A second subpanel 1845 shows graphically (e.g., with a pie chart) the library drive bays to illustrate the percentage of each drive model in the tape infrastructure/system that is being monitored by the STA application. Graphical elements provide quick access to more data on components of interest to the user of the GUI 1800.

For example, the user may provide user input (e.g., move their mouse or activate a touch screen) to position a cursor 1847 over a pie wedge (a first graphical element). The GUI module responds to this user input (a cursor fly over) by highlighting the selected pie wedge/graphical element 1846 and also highlighting one or more related graphical elements 1848 to provide additional information (e.g., drive model associated with the percentage-indicating graphical element 1846 or other cumulated or otherwise processed or raw data may be provided as a pop up in the GUI 1800).

The user may provide additional input (providing a mouse click, for example, when a cursor is on or over a graphical element as shown in FIG. 18) to select this graphical element 1846 or another graphical element to drill down with one-click access from one GUI screen (here a dashboard GUI 1800) to another GUI screen to obtain a pre-filtered set of additional data associated with the selected graphical element (e.g., filtered data on the drives of the selected model in the monitored infrastructure). In other words, the GUI module of the STA application acts to apply a filter associated with the graphical element (e.g., model drive in the example of FIG. 18). Additional data that may be provided may include information about the selected component such as manufacturing lot, historical usage in the tape infrastructure, shipping information, and so on, which may be useful in determining whether components were damaged in use or during shipping (e.g., a shipped lot of tape cartridges may have been damaged during shipment rather than during usage) or were defective upon arrival at a customer facility (e.g., were part of a manufacturing lot that had defects).

From a dashboard view, a user may make selections (e.g., in the pull down/menu 1320, 1820 of GUIs 1300, 1800) to cause the GUI module to filter the monitoring data for a tape infrastructure in particular ways. For example, as discussed above with regard to FIG. 14, the screen shot 1400 of the GUI provided by the STA application is created when a user has selected media in the panel 1320. A panel 1410 is provided that provides an overview view for media in the tape infrastructure monitored by the STA application. From the screen 1400 shown in FIG. 14, a user may choose to drill down or to view a single view for a particular component of the tape infrastructure. This is shown in FIG. 15 with screen shot 1500 of the GUI where the user has selected a detail or single view for a particular tape media. In this way, a user may navigate through the collected data by selecting a component ID. In this example, the component ID was for a particular tape cartridge by volume serial number.

Figure 19:
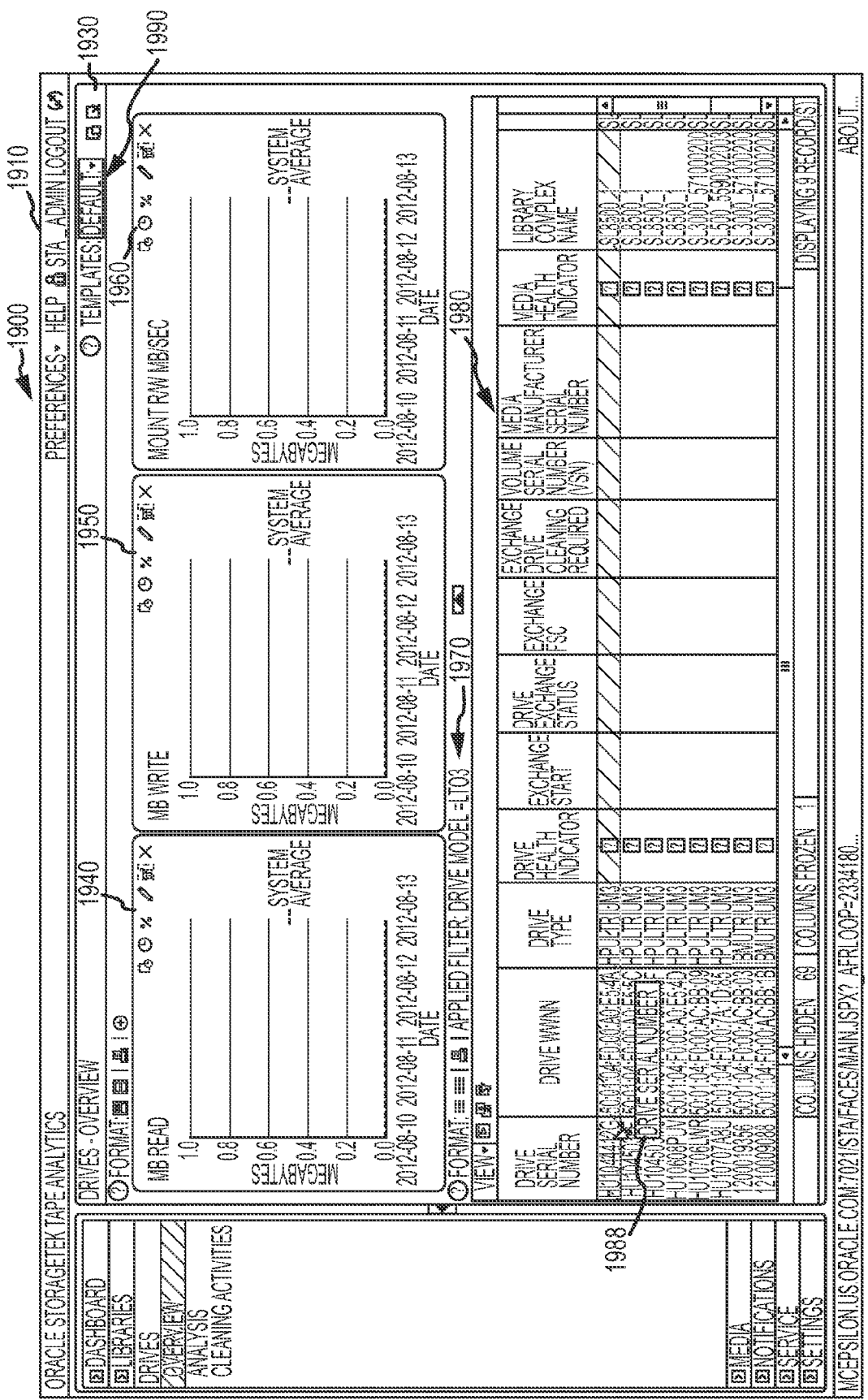
FIG. 19 provides a screen shot similar to that of FIG. 14 illustrating an exemplary GUI showing an overview of drive information gathered by an STA application during monitoring of a tape infrastructure.

In other cases, the user may have selected drives from the pull down/menu panel 1320 and been shown an overview of the drives of a tape infrastructure. An exemplary drive overview GUI 1900 is shown in FIG. 19 with screen 1910 that includes a drives overview panel 1930. This overview GUI screen 1910 includes panels showing MB read 1940, MB write 1950, and mount R/W (in MB/sec) 1960, all in graph form showing data collected over a particular time period. Additional information may be provided in such a graph including summary or calculated information such as system averages for these data elements over the same time period.

The user or operator of the GUI 1900 may enter a filter, which may be selected from a number of default filters and/or user-defined filters, with FIG. 19 showing use of a particular drive model filter at 1970. The applied filter is used to select the collected data to use in preparing the graphs for panels 1940, 1950, and 1960 and also for use in populating the table 1980. The table 1980 includes rows that are each associated with one particular system component, i.e., particular drives in the tape storage system being monitored that are of the model associated with the applied filter 1970. The table 1980 also includes a number of columns for organizing the component data, with this drive example including the following columns: drive serial number, drive WWNN, drive type, drive health indicator, exchange start, drive exchange status, exchange FSC, exchange drive cleaning required, volume serial number, media manufacturer serial number, media heal indicator, and library complex name. The table 1980 provides significant granularity in the data presented in the GUI 1900 for each component. In this example, a user is presented drive type, drive health, and media health for each individual drive in the tape system. The user may navigate using the GUI 1900 by selecting any of the component IDs as shown at 1988 to obtain additional information for each component (e.g., with pop up data (not shown in FIG. 19) or creation/linking to another GUI screen).

At 1990, a templates selection box/pull down is provided in the GUI 1900. As shown in FIG. 19, the user is using the default template to define the layout and content of the drive overview screen 1910 of the GUI 1900. However, the user may use the selection box 1990 to choose from a number of custom templates that may be provided with the STA application or that may be created by the present or other users (may share templates as discussed earlier herein). For example, a drive GUI 1900 may be customized to show all drives, to show only drive-based or related information, to show enterprise performance information for drives (over a particular time period), to show drive health, to show drive performance, to show drive utilization, to show last exchange data for the drives, and so on. This exemplary customization can then be saved in the form of a custom template.

Figure 20:
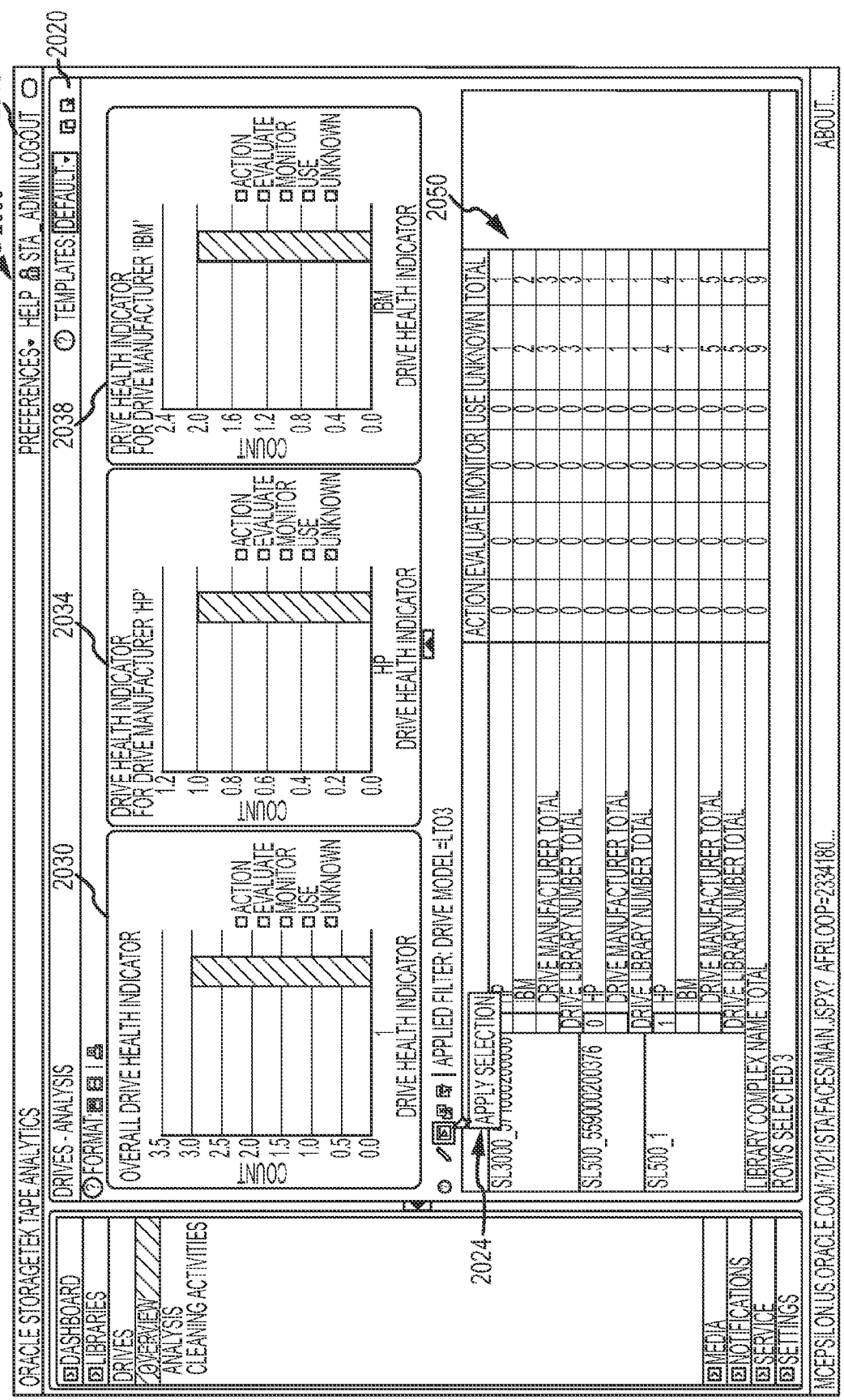
FIG. 20 illustrates a screen shot of an analysis GUI for drives showing a user selection of a subset of data within a pivot table and the generation of graphical representations of data gathered by an STA application for a monitored tape infrastructure.

At this point, it may be useful to discuss the use of pivot tables with an STA GUI. FIG. 20 illustrates a GUI 2000 that may be generated when a user selected analysis from the pull down/menu panel of GUI 1900 in FIG. 19. A screen or window 2010 is created with an information display panel 2020. A user has applied a selection as shown at 2024 to cause the drive analysis GUI 2000 to generate an overall drive health indicator subpanel 2030 and a pair of drive health indicator subpanels 2034 and 2038 for each user-selected drive manufacturer (e.g., showing health of drives by manufacturer). The GUI 2000 includes a pivot table 2050 organized presently by tape library, with a column showing the library name, a column showing the drive manufacturers (each with their own row of cumulated data from the STA application), and then a set of columns showing the number of drives in each health indicator category for each manufacturer.

The pivot tables of some embodiments of the GUI provided by the GUI module of the STA application are configured to allow a user to change the content and display of data within the GUI on the fly or in real time. For example, a user is able to convert a column into a row of a pivot table and to convert a row into a column. In this manner, the STA application not only gathers data but allows the user to vary how it is organized or cumulated and how it is displayed in a GUI.

Figures 21A, 21B:
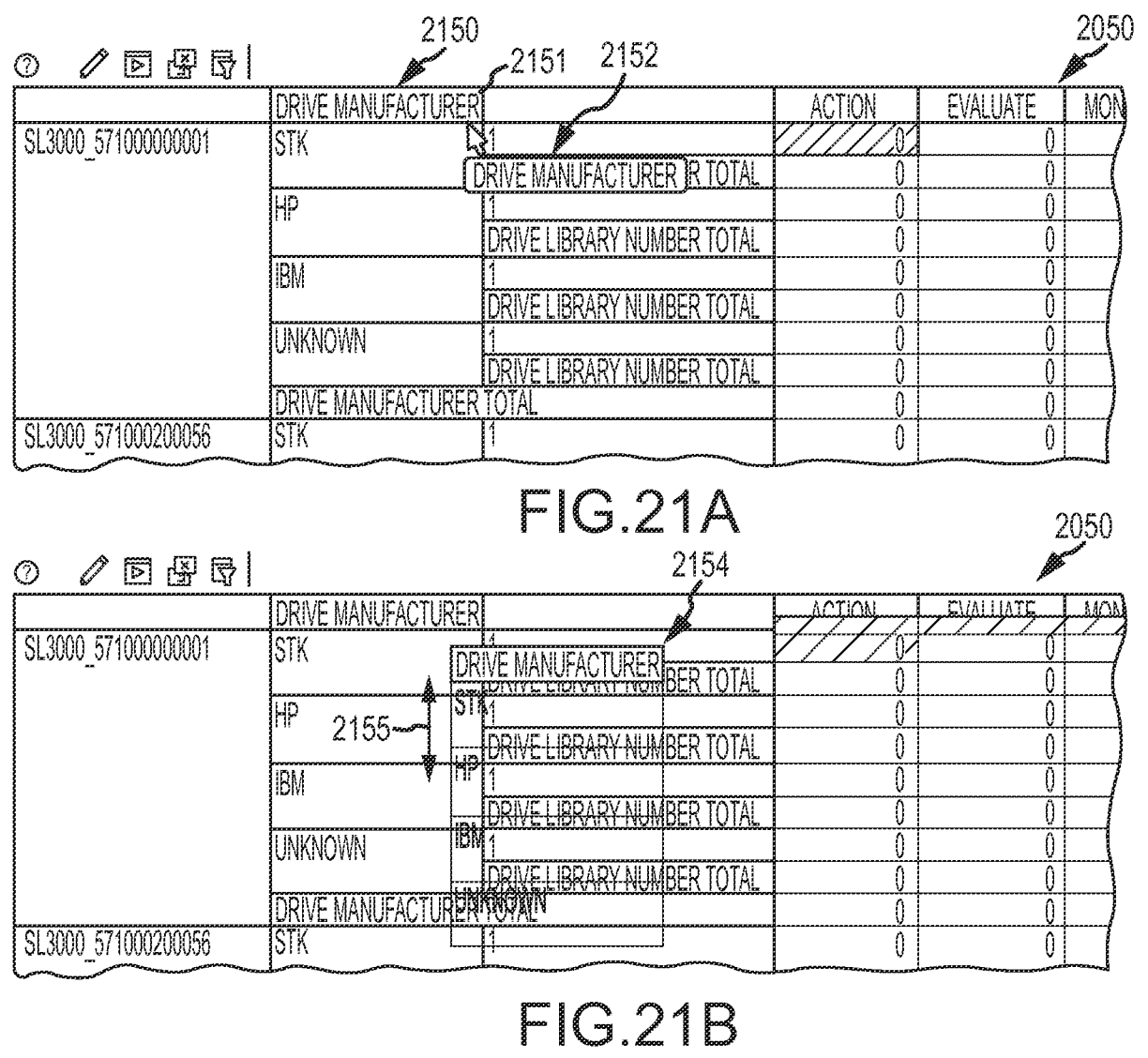

FIGS. 21A-21C illustrate a user modifying the pivot table 2050 of GUI 2000 by moving a column into a row and the resulting display of the modified table 2050. In FIG. 21A, the column 2150 has a header or heading 2151 of "Drive Manufacturer" with each drive manufacturer's data shown in a row of cumulated data (counts, health, and the like) in each tape library (as the table is hierarchically arranged by tape library in this example). The user has provided input (moved the cursor 2152) to select the column header 2151 of column 2150.

In FIG. 21B, the pivot table 2050 is shown where the user is dragging or moving 2155 the column as shown in ghosted form 2154 by moving their mouse or otherwise providing movement/location input via a user input device. In FIG. 21C, the pivot table 2050 is shown after the user has positioned the cursor just below the Action/Evaluate/Monitor/etc row and released the selected column header. The GUI module accepts this user input (column header relocation input) and processes it so as to generate a new row 2158 with label/header 2156, and the row 2158 is made up of the data previously presented as a column (e.g., listing of drive manufacturers for each column immediately above it in the table 2050, here showing health indicators to provide a quick view of the health of drives for each drive manufacturer across all libraries of a tape system rather than within each library). The other portions of the pivot table 2050 are reorganized and data recalculated (if/as necessary) to allow this column-to-row conversion to occur.

With the above understanding of the STA GUI in mind, it may at this point be useful to describe the STA GUI during use by a user or operator. In this regard, the following provides a number of examples of using the STA GUI (or STA via a GUI) to answer specific operational or maintenance questions regarding a tape system that is monitored by an STA application. The questions and functions of the STA GUI are not limiting but are examples that further the understanding of the value and unique uses of an STA application and its user interface.

One question or query that can be answered by use of the STA user interface is "how many total libraries/drives/media/etc. are in my tape storage system (i.e., being monitored by the STA application)?" The question can be answered in at least three different ways through operation of the STA GUI.

First, via the dashboard configured to show the number of system components, the user may simply be able to add up count values shown in the dashboard or one of its panels (e.g., of libraries or similar components in a panel such as one showing health for each component type along with a count). In a pie chart representation or other graphical representation, count values sometimes may be provided by mousing over or performing a cursor fly over of each of the graphical elements showing the component of interest (such as drives, libraries, or the like). Second, an overview screen (such as a drive, a media, a library, or other component overview screen) may provide a listing (e.g., at the lower right corner of a table) of the total number of records displayed such that as long as there are no filters being applied this will provide a total number of a component being monitored by the STA application. Third, an analysis screen (e.g., a drive, a media, notifications, or other analysis screen of the STA GUI) provides pivot tables typically with a total column providing numbers for various components (such as drives in a library) and a total row providing totals of a column (e.g., number of drives having a particular health indicator such as action, evaluate, monitor, use, or unknown).

A second question that may be answered through the use/operation of the STA GUI is "how many drives/media of Type X are in my environment?" From the dashboard view, a fast way to answer this question is mousing over the relevant section of a pie chart or a bar graph. One benefit to using this method is that the user can then click on a selection, and the GUI will bring up an overview screen showing the STA gathered data/details for just that specific drive/media type. These types of graphs in the GUI are organized by media/drive type, which facilitates this operation. From an analysis screen or view, the totals of various drives or media types are provided in pivot tables (or analysis tables) at the bottom of corresponding columns. This technique or operation of the GUI is useful if the user wants information broken down over a number of criteria (e.g., by library, by media type, by media state, and the like).

A third type of question that the GUI may be operated/used to answer is: "what are the top 3 (or another number of) drives in my system in terms of utilization?", "what is the total time in motion (lifetime of drive)?", "what is the time in use in the last 30 days (or other time period)?", "what data passed yesterday (or some other time period)", and "what is the number of mounts last February (or other past time period)?" Note, "utilization" may have a number of meanings with each typically being monitored or tracked by the STA application such as lifetime hours in use, amount of data passed, number of mounts, and other measures. Further, the STA application and its GUI allow a user to access this information for a number of time periods.

Regarding the total time in motion (lifetime of drive), this information is provided by specific drives, and it is tracked by the STA application. The GUI may be configured to include a column with a header such as "Drive Lifetime Hours in Motion," and a user may provide input such as clicking/selecting a sort arrow (e.g., a "sort descending" arrow) to cause the top or first drives in this category (in terms of time in motion) to be presented at the top of the column. Regarding time in use in the last 30 days, the user may look in the GUI for a column in an analysis table with a header such as "% Drive Utilization (30 Days)", and selecting or clicking the associated sort arrow ("Sort Descending" arrow) will present the top drives in this category.

A fourth type of question that may be addressed with the STA GUI is "which drive has had the most errors in the last 30 days?" (or which piece of media and is there any correlation between the two). To answer this question, a user may navigate to an overview screen of the STA GUI. Then, the user may apply a template such as one configured to provide drive health information to obtain the desired answer (e.g., a drive errors in the past 30 days column will be provided in the displayed table). A graph can be created by the user by selecting the rows of the displayed table that they wish to show/include in the graph and then clicking/selecting the "apply" icon in a tool bar provided above the displayed table (e.g., above table 2050 or the like). For media, the process would be similar as it may involve a user navigating to a media overview screen and applying a media health template. Then, a column is displayed in the table of the GUI with a header such as "Mounts with Errors (30 Days)." The user can then select or click on a sort arrow (e.g., a "Sort Descending" arrow) to obtain their answer.

To look for correlations, the user may navigate the GUI to the libraries-exchanges screen because each exchange is tracked or monitored to obtain detailed information. Further, each exchange involves one drive and one piece of media, and each exchange is an action or tape system activity that is shared by those two components (and by the library and robotics as well). With regard to correlations, the user can select or click on the "filter" icon in the data table on this GUI screen. For filtering criteria, the user can click on or select a filter such as "Match ALL entered criteria" and then enter an exchange start date (e.g., 30 days prior to the present date).

The user can further enter the drive serial number of the drive that has been exhibiting the most errors, and then click or select the apply filter button/icon to dismiss the dialog box and apply the filter criteria to the STA-gathered data. In some GUI embodiments, the user is then presented with a list of all exchanges within the last 30 days involving the particular "faulty" drive. To then see the media involved or associated with errors, the user can operate the GUI to sort by a related column (e.g., a column with an Exchange Overall Status header, an Exchange FSC header, a Media Health Indicator header, or the like). The GUI screen will then display the volume serial numbers which will allow the GUI user to identify whether there is a correlation. The GUI may also be operated so as to sort or filter by volume serial number if they identify a specific volume and wish to limit the display to exchanges involving both the faulty drive and the suspect piece of media.

A fifth question that may be answered through operation or use of the STA GUI is "can you show me the drives whose efficiency has significantly declined over time?" The STA application records and can display via the GUI many measures of efficiency with regard to data transfer rates. These include read, write, and R/W combined rates. In addition, the STA application collects these rates per mount, per time period (e.g., per 30 days), and per exchange. The STA application also obtains some direct efficiency numbers from the drives themselves. To view this type of data from the GUI, a user may apply a template configured to show drive performance. The template (and its filter criteria) may produce a table with columns with headers such as drive serial number, mount read (in MB/sec for last 30 days), mount write (in MB/sec for last 30 days), mount R/W (in MB/sec for last 30 days), average mount read (MB for last 30 days), average mount write (MB for last 30 days), and average mount RW (MB for last 30 days).

The GUI may be used for graphing the numbers/data presented in such a table to show increases or decreases in efficiency over time and also to provide a useful comparison to the system baseline. To obtain the graphs with the GUI, the user can select rows of the table (such as top 5 rows or the like), and the user may then click/select the apply icon to put the data into the graphs. The graphs of interest can then be added to the graphing pane or panel (which can be done before or after applying the rows).

A sixth question that may be answered by operation of the GUI of the STA application is "since we experienced an error in a tape job in our system at a particular time today, can you show me the drive and media involved?" In a site or system where each "job" is an independent exchange (i.e., mount, read/write data, and dismount), one quick way to access this data (answer to the question) via the STA GUI is to navigate to the libraries-exchange screen. By default, the rows in the table shown on this GUI screen/view will be sorted by the exchange start time. The user can look for entries in the table at or near the time associated with the tape job error. If there are numerous exchanges at the user's site or in their STA-monitored system, the user may filter the data such as with setting the exchange start time and exchange end time to values that reduce the number of rows in the table (reduces the displayed data set). To answer the question, the table may include columns or fields in the table that may be of particular interest such as ones labeled as exchange overall status, exchange FSC, or the like. Note, with the STA GUI, the user can click or select on drive and/or media identifiers to go to a screen with full details about either one. The user may also go to a notifications or similar screen to determine whether there was a notification (or alert notice) that is related to the failure/tape job error.

A seventh question that may be answered readily with the STA GUI is "have all my drives been upgraded to the latest firmware?" This question can be answered from the drives-overview screen of the STA GUI. The user can go to this screen and then apply a template such as the drives-base-information or a similar template, which causes the GUI to show the drive firmware revision as well as other useful data in columns of a table. Typically, firmware is checked for a specific drive type/model since it is clear that the firmware levels will differ and be independent across drive types/models. If the user wishes to have a table that encompasses information for all drives, the user can select "View-Sort-Advanced" in the GUI, and then, in the dialog box that is presented, the user can sort first by drive model and second by drive firmware version. If the user instead wishes to have a table for a specific drive model, the user can use the GUI to bring up the filter dialog box and filter by the drive model of interest. After applying this filter, the user can operate the GUI by clicking on or selecting the "sort" widget for the drive firmware version column in the table.

The above exemplary uses of (questions that can be answered by) the STA GUI are useful for explaining the value of the user interface to the tape system/infrastructure data obtained by operation of an STA application. As can be seen from the above, the GUI allows a user to navigate through the data quickly and efficiently. For example, a user can select items within cells of a table such as but not limited to component IDs to graph data associated with that cell or to link to another screen with additional data on that component (such as data for a particular drive, a particular piece of media, a library, and so on). For example, a user can navigate from a drive to media that may have passed through that drive during system operation to a library (and vice versa), which allows the GUI to provide a full navigable circle through the data (do not have to back out through a hierarchy of screens as is common with some user interfaces). Of interest in identifying problems, a user can navigate through the history of use of media and drives, e.g., a user may identify a drive that has an error and obtain a list of exchanges for that "bad" drive to perform further analysis. During such navigation, data is correlated on the fly and also is being updated by the STA application as it is gathered/processed from the monitored tape infrastructure (e.g., as new exchanges, dismounts, and the like occur the data in the GUI is updated on an ongoing manner).

In some embodiments of the GUI, all graphs on a view can be readily synchronized by a desired time period. For example, a graph synchronize button or icon may be provided in a GUI screen with graph panes/panels. A time range may be adjusted or set for one of the graphs (such as health of drives in a library), and the synchronize button/icon may be selected to apply this time range to all the graphs in a view such that the data being graphed all corresponds to the same time range.

In other or the same embodiments, historical data may be included or deleted based on a user's choice or selection. For example, the user may be prompted in a GUI screen to choose to show data on drives or media that has been removed or that is no longer used in the monitored tape system. Data is saved for these prior system components by the STA application, but it may or may not be appropriate to include this information in the STA GUI. For example, it may be useful to determine if a drive is faulty to include data on removed drives to determine whether media that has been replaced was the cause of errors in this drive (e.g., the drive is not truly faulty or error prone).

A number of extensions or enhancements may be provided to the STA GUI provided by the STA application (e.g., via modifications to the user interface module such as module 348 of the system of FIG. 3). For example, the dashboard may be adapted to be fully or nearly fully customizable by a user. This may involve the user customizing the layout of the panels or by customizing elements within such panels or portlets (e.g., a user may change a number of columns in a table and information included in each column). The user interface module can be configured to allow a user to drag and drop panels/portlets and/or components within the GUI so as to change the layout (or look and feel) of the GUI and its displayed tape infrastructure monitoring data. Also, the user can choose (from a pulldown list/menu or the like) for data to be displayed in tables (e.g., lists of monitored components that may include action items for one or more component), graphs, and/or reports, and a user may customize these displays of selecting sets of related data for inclusion in the display (e.g., related to a storage system to a library, to a geographic location, to a business unit, and so on).

Further to this end (as discussed below), additional panels or portlets may be provided in the dashboard (with some embodiments including 15 to 30 or more portlets and one embodiment providing about 20 portlets). Each of these portlets, in turn, may be independently controllable or customizable (e.g., each portlet of the dashboard may have its own set of controls allowing a user to customize each portlet independently (e.g., use the same or different settings for each portlet)). There may be multiple versions of each portlet, which may be useful for allowing a user to filter each portlet differently (e.g., by differing dates, locations of components, libraries for monitoring, and the like), and each portlet and its unique (or independently set) filters may be used to create a portlet template.

Dashboard customization may involve providing an annotate (or annotation) box in a portlet for descriptive purposes. The user may insert an annotate box in a portlet that allows the user to insert a set of default notes/annotations to a portion of the dashboard or to insert informational text/notes into a portlet with an annotate box, and this is useful for allowing an operator to provide commentary on why a portlet was created and customized in a particular manner or to note why a particular tape drive, piece of media, or other component was being monitored. In some embodiments of the STA application, the text provided in an annotate box of an STA GUI is included in reports and/or in print outs of a GUI.

The user interface module may be adapted to provide "quick links" in the STA GUI to provide simplified or expedited navigation to view data on a tape infrastructure monitored by an STA application. A button or other link (live link) may be provided to allow a user to jump to a new screen, e.g., by selecting a component (or count of multiple components of a kind) within a list or table to obtain more data on that component, by selecting an apply template button to apply one of several templates to context, and the like, which is desirable to avoid forcing a user to perform multiple clicks/selections to apply templates or otherwise hunt for particular data/views.

The user interface module of the STA application may be configured to provide enhanced templates management. For example, a user may be able to create templates by customizing default templates (or those created by others). These templates may be named and stored for future use by the user. Further, the user interface module may allow the user to make one or more of these user-defined/created templates (a customized template) a default template for future use of the STA GUI. Alternatively, the user may be able to select from a set of predefined templates provided with the STA application to define which of these templates are default templates for their STA GUI. This allows multiple users of an STA application to each have their own set of default templates for use in accessing/viewing their tape infrastructure data that is collected and processed by the STA application (e.g., a set of default templates is linked to each user's login information and is used to generate the STA GUI and its screens with numerous portlets, graphs, tables, and other content).

The templates are sharable in some embodiments of the STA application. To this end, a user may initiate import and/or export of templates within their GUI to transfer one or more templates to or from another user of an STA application. The sharing may be within a single company/STA user or among differing companies/STA users (e.g., to provide cross-customer templates). For example, a template may be saved as an XML file and sent to another user as an XML file. This allows other users to use the same template with their own and different set of tape infrastructure data (e.g., different libraries with differing infrastructure storing differing sets of data). This may be useful for setting up strategies for capacity planning (e.g., when entering/using new media), performance analysis, health assessment, and multiple other functions which may be similar across a number of companies or STA users' environments.

The STA application provides a powerful context-sensitive filtering capability. Filters are provided throughout whereby a user can reduce or expand the information set (or "InfoSet") that is being analyzed or looked at according to the available data fields and data values. The data fields and data values are context-sensitive and only presented as options if such data can be filtered on. One InfoSet will have a different set of filtering options when compared to another InfoSet. Filters can remain in place across multiple screens. Filters use Boolean logic with ANDs and ORs and also have a number of filter criteria that can be applied to a data element type and its corresponding value. For example, when filtering on media, a user may be allowed to filter on all attributes associated with that media, which may be a large number such as up to 100 or more attributes. Additionally, when filtering on one value for the media, such as a media's serial volume number, the filter can be adapted to only present the user with the relevant, comparative filter options of "Is," "Isn't," "Starts With," "Contains," "Doesn't Contain," "Ends With," "Greater Than," "Less Than," and the like. These same capabilities apply throughout the STA UI for other monitored, analyzed, and alerted upon entities' attributes and their corresponding values.

In addition to sharing of templates, the user interface module may be configured to facilitate exporting of STA data and information in the GUI. In prior iterations, exporting was generally limited to .XLS files while more recent implementations support exporting of STA data (or GUI data such as data, tables, graphs, and the like) in comma-separated values (CSV) files and pdf files.

The user interface module may be configured such that the dashboard can be operated by a user of an STA GUI so as to act as a report designer (i.e., the dashboard itself is a report designer). For example, the GUI may be operated to define a set of executive report rules, and these executive report rules may be used by the GUI (or an associated report generator) to create a report that can be transmitted to a predefined recipient (e.g., "the busy executive" or other recipient looking for a summary of or subset of certain monitoring data). For example, a pdf file (or digital data file with another useful format) may be created and sent to a recipient, and the pdf file may provide data (based on the report rules) similar to that found in one column or a subset of a dashboard (and any annotation boxes and their text may be included in this column/subset of the dashboard data). In this manner, the dashboard can be manipulated by a user to act as a report generator rather than requiring a user to open a separate report generator interface to attempt to create a report.

The user interface module (as explained in more detail below) may be configured to present an STA GUI that facilitates use of logical groups for accessing the STA data. For example, a logical group button or other selection device may allow a user to select one of a number of logical groups (e.g., grouping of components and their data by a set of attributes). The attributes may be STA tracked and/or user defined and may be defined by entity assignment rules (e.g., multiple criteria). The logical groups may be static/manual in that the group does not change over time, and a user may point and click items/components to be in each logical group. The logical groups may also be dynamic in that items/components in each logical group may change over time (e.g., reevaluated periodically at a default or user time period such as once every hour). Once the logical groups are setup/defined, a user may filter the STA data (such as drive health) by logical group.

The user interface module of the STA application may be specifically configured to support mobile users and their access of the STA GUI. For example, one implementation of the user interface module presents an STA GUI that is configured to suit a particular user's mobile device and its screen size/limitations. This may involve the user interface module determining the user is accessing the STA application with a mobile device and then determining the size of the mobile device's screen/monitor. If the device has a screen with a size below some preset size (such as less than a 7-inch screen), the user interface module may provide the STA GUI in a first format such as to show one column of the presently generated STA GUI. If the device instead has a screen with a size at or greater than some preset size limit (e.g., greater than about 7 inches), the user interface module may provide the STA GUI in a second format such as to show two columns of the presently generated STA GUI (e.g., the dashboard or another screen). Additional numbers of differing formats for displaying the STA GUI may be used to support access by a wider range of mobile devices (e.g., smartphones, computer pads, computer tablets, Internet/network access-enabled digital reading devices, and the like).

Typically, the STA GUI is provided via a mobile website that is accessed via a mobile device, and the STA GUI is not presented using an application downloaded and running on the mobile device. To further enhance mobile access, the user interface module may present the STA GUI to the mobile device in a read and/or view only mode. For example, the mobile device user may access the STA application and view one column of the dashboard (or two columns or some other subset of the dashboard or other screen of the GUI). The user may be allowed to select a template for such viewing, but the template typically will not be created or modified by the mobile device user and will, instead, be selected from a set of previously created and saved templates and applied to the live or dynamic STA content/data.

As shown in FIG. 13 with screen shot 1300 of a STA dashboard, the dashboard acts as the main screen for the STA application. Using the dashboard, users can select from a number of varied panels and/or subpanels (interchangeably called "portlets" herein). The user interface module of the STA application is configured or adapted such that each of these portlets displays some information on how the user's monitored tape infrastructure or library environment is presently operating or has operated historically or both. In one implementation of the user interface module, there are three types of portlets including a graph portlet, a table portlet, and a report portlet.

Figure 22A:
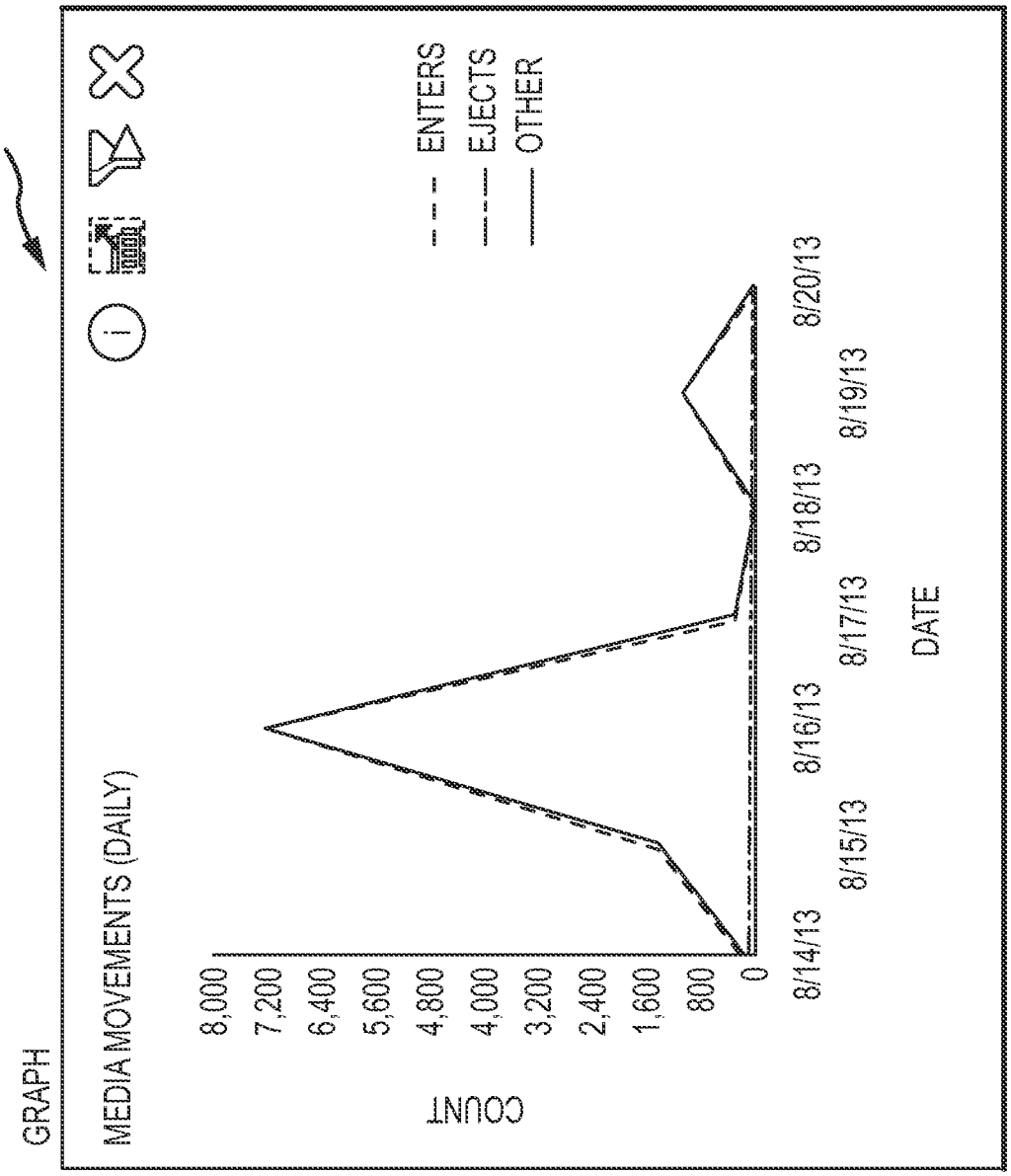

FIGS. 22A-22C illustrate partial screen shots showing examples of each of these types of portlets that may be provided in a dashboard (or other screen) of an STA GUI. FIG. 22A illustrates a screen shot of a graph portlet 2210 that may be generated and displayed by the user interface module while a user is accessing/using an STA application. The graph portlet 2210 displays information graphically. The graph may take many forms including a bar chart, a pie chart, or a line chart, with the form sometimes being selected to suit the source data. For example, many portlets display values over a time range (default or user-defined via the STA GUI), and, in such cases, the graph provided in portlet 2210 may be a line graph as shown in FIG. 22A. Other graph portlets, though, may be used to display categorical summaries, and these graph portlets may be configured to provide data with a pie graph.

FIG. 22B illustrates a screen shot of a table portlet 2220 that may be generated and displayed by the user interface module while a user is accessing/using an STA application (in the same or a different dashboard with portlet 2210). The table portlet 2220 is generated to display information in a table. The table in the portlet 2220 functions like the tables described elsewhere in this description as being produced by the STA application, e.g., allow for sorting, for row selection, and the like). FIG. 22C illustrates a screen shot of a report portlet 2230 that may be generated and displayed by the user interface module while a user is accessing/using an STA application (in the same or a different dashboard with portlet 2210 and/or with portlet 2220). The report portlet 2230 is generated or designed to display its STA information in a vertical form or format, and consists of name-value pairs with detailed information addressing a specific topic (e.g. data written report).

The dashboard (and other GUI screens/views) may be generated by the user interface module of the STA application so as to be fully (or very) customizable. For example, a dashboard may be displayed initially with a first set of portlets (e.g., 1 to 10 portlets or some other initial/first number of portlets). Then, the user may customize these portlets and add additional portlets such that the dashboard displays a second set of portlets that differs in number and/or content compared to the first set of portlets (e.g., the second set may include up to some predefined maximum number (e.g., 20 to 40 portlets with 30 portlets being allowed in one implementation of the STA application)). There typically are no limitations set on which portlets that may be added by a user via the STA GUI, and users may even add multiple instances of the same portlet in some cases (e.g., with differing templates applied in each to display the same data in differing forms and/or formats and/or with differing filtering applied to the STA data).

Figure 23A:
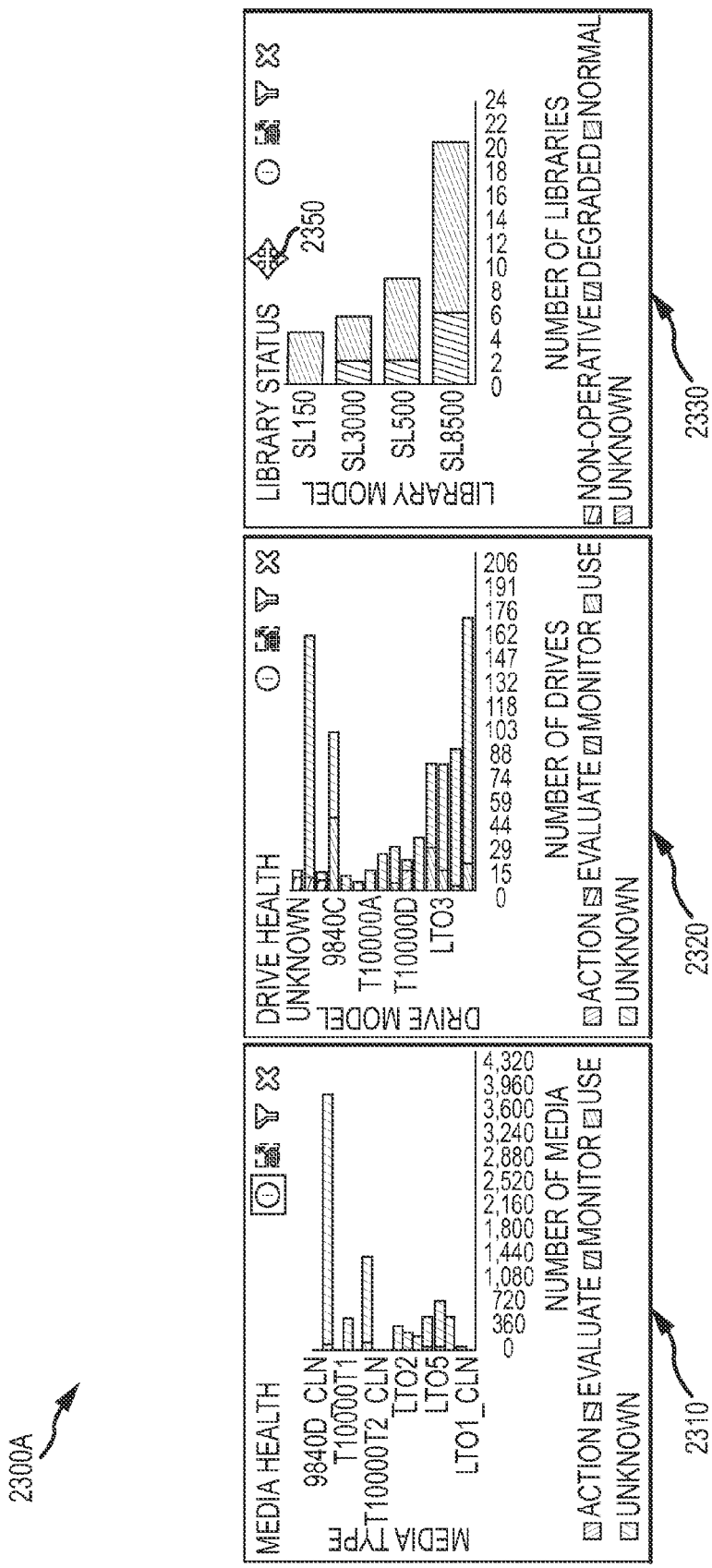
FIGS. 23A and 23B illustrate partial screen shots showing examples of an STA dashboard in first and second states showing customization of the dashboard by a user moving a portlet.
Figure 23B:
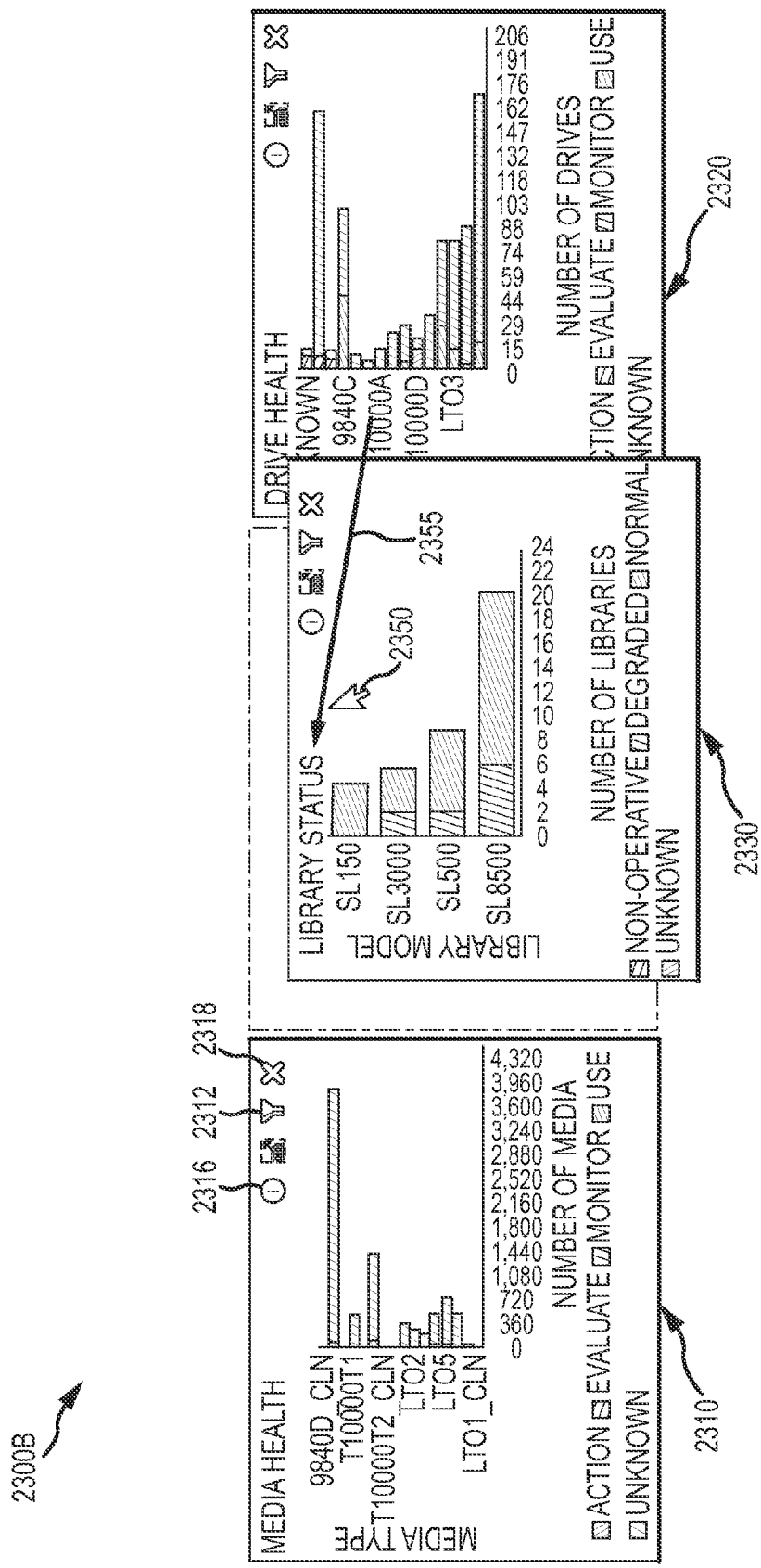

FIGS. 23A and 23B illustrate partial screen shots 2300A and 2300B showing examples of an STA dashboard in first and second states, respectively, showing customization of the dashboard by a user. Particularly, the user interface module of the STA application may be configured such that a user can customize a dashboard by rearranging or repositioning one or more portlets in the dashboard. FIG. 23A illustrates a dashboard 2300A in a first state with a portlet 2310 in a first position (left-most position on a dashboard 2300A), a portlet 2320 in a second position (middle or center position on the dashboard 2300A), and a portlet 2330 in a third position (right-most position on the dashboard 2300A). The user may be able to rearrange the portlets 2310, 2320, 2330 such as by dragging and dropping one or more of the portlets.

An initial rearranging (or customizing) step is shown in FIG. 23A where the user has used an input device (e.g., a mouse, a touch pad, a touchscreen, or the like) to select the portlet 2330 for movement as shown with icon 2350 (indicating movement of portlet 2330 may be in any direction on dashboard 2300A). FIG. 23B illustrates the dashboard 2300B in a second state as the user has dragged (as shown by arrow 2355 and arrow icon 2350) the selected portlet 2330 to a new position and released the portlet 2330. In this example, the portlet 2330 has been moved or dragged and dropped into a position between portlets 2310 and 2320, which the user interface module responds to by moving the portlet 2330 to the middle or center position and moving the portlet 2320 to the position previously occupied by portlet 2330 (e.g., to the right-most portlet position in dashboard 2300B).

A user may further customize a dashboard by removing a portlet. For example, a removal button or icon (such as the "X" icon 2318 shown in portlet 2310) may be selected or clicked upon to cause the removal of the portlet associated with the removal button/icon (e.g., clicking the icon 2318 will cause the removal of portlet 2310 from dashboard 2300A or 2300B).

In many STA application implementations, all or a subset of the portlets may be filtered according to their data set to further hone or customize the information displayed to the user. For example, the portlet 2310 is shown in FIG. 23B to include a filter icon 2312 (e.g., a funnel or other icon shape/design), and the user may choose a filter by selecting or clicking on this icon 2312 within the portlet 2312 (e.g., a filter icon is provided in or associated with each portlet in this dashboard example). As a result, the dashboard may be updated to open a popup or data entry box where the user is prompted to enter a set of filter criteria for the corresponding portlet. The attributes or criteria available for filtering may differ (be set independently for each portlet) and may depend upon the data set viewable through a particular portlet. The filtering mechanism used for portlets may be the same as used elsewhere in the STA GUI as described herein. After a filter is applied, the filter icon may be changed in its appearance (e.g., modify the icon shape or color or adding an icon "badge") to visually indicate that a filter is applied by the user interface module. When a user saves the dashboard in a template, the filter is also saved with the portlet. Again, each portlet is, hence, customizable by applying differing (or the same) filter to the data displayed via that portlet.

The portlets may optionally be annotated by a user via use of the STA GUI. In one embodiment, annotation involves a user attaching some free-form text to one or more of the portlets, and this text may differ for each portlet. For example, an annotation icon or button 2316 may be provided in a portlet 2310 as shown in FIG. 23B, and the user may select/click the annotation or information button 2316. The user interface module responds to this user input by presenting a popup or data entry box/balloon in which the user may enter their text (via a user input device such as a keyboard or voice recognition devices or the like). Then, when the user saves the dashboard in a template, the text in the annotate box is saved with the portlet. The text may be displayed within the portlet (e.g., within portlet 2310) and/or may be shown in other views such as when the data of the portlet is reported out to a user/report recipient.

The user of the STA GUI may spend a significant amount of time and effort performing customizations to a dashboard to get it to have the look they desire and to display the STA data in a desired manner (and to display the subset of STA data desired for monitoring their tape infrastructure). To keep the user from having to repeat this customization process each time they open up the STA application, the user interface module (or STA application) is adapted to allow the user to save the customizations in a template. The template may be configured to store: the selection of portlets; any filters applied to the portlets; and any annotations applied to the portlets. The user may select a name for the template that has meaning to them or their company/entity. The template may then be recalled by the user-given name, and all customizations will be applied again by the user interface module when it generates and displays a dashboard or other view with an STA GUI. The user typically can save an unlimited number of different templates.

As discussed briefly above, executive reports provide a significant improvement to the STA GUI and are useful for highlighting the power of dashboard templates. With executive reports, users can select a saved dashboard template to run periodically or on-demand with output being, for example, to a file (e.g., a pdf file or the like that can be transmitted to the "busy executive"/recipient) rather than to the screen of the GUI. Users can choose a report run frequency (e.g., daily, weekly, monthly, quarterly, annually, or the like), can run reports on-demand, and can optionally select one or more email recipients to receive the stored output file (pdf file in their inbox or other accessible location).

In one embodiment of the user interface module, users are able to define an executive report on a particular page of the STA GUI (e.g., on a setup and administration: executive reports policies page or the like). For example, FIG. 24 illustrates a dialog box 2400 (or report definition dialog) that may be used to facilitate a user definition of an executive report. The dialog box 2400 prompts the user at 2410 to enter a report name (e.g., a user-meaningful name) and select at 2420 the saved source dashboard template upon which to base the report. Reports may be run, as shown in FIG. 24, at or just after midnight (e.g., according to the STA system clock) on the date specified in the dialog box 2400 by the user at 2430 and will repeat according to the run frequency set in the box 2400 at 2440. The running of reports may be an entirely background process for the STA application. For example, the user typically does not have to be logged in at the time the report is run by the STA application. The dialog box 2400 may also prompt the user at 2450 to specify one or more report recipients (e.g., by email address). If any email recipients are specified at 2450, those recipients will each receive a copy of the report output file (e.g., an executive report in the form of a pdf file or the like). The report output may also be available via the STA GUI (e.g., located under Home: Executive Reports or the like).

At this point in the description, it may be useful to provide a number of examples of particular dashboard portlets or panels that may be provided in an STA GUI. These portlets may be considered "Mainframe" or "Nearline" reports as these reports may be of particular interest to STA application users running tape libraries attached to mainframe systems (e.g., mainframe 142 shown in system 100 of FIG. 1). With this in mind, FIGS. 25-35 each illustrates an exemplary mainframe or nearline report provided in differing dashboard portlets.

Figure 25:
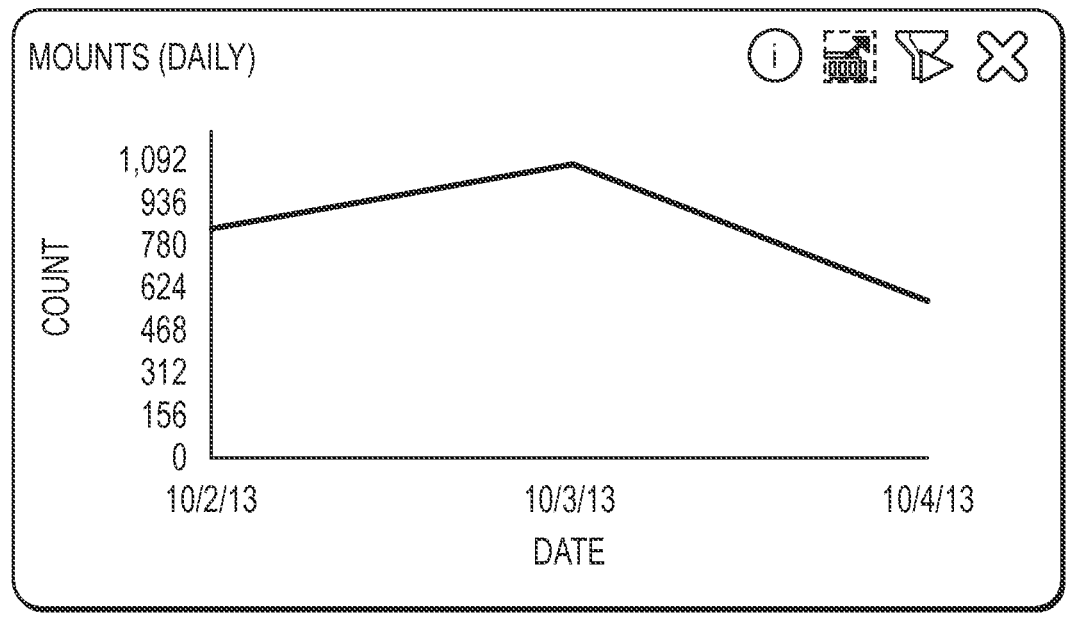
FIGS. 25-35 each illustrates an exemplary mainframe or nearline report provided in differing dashboard portlets.
Figure 26:
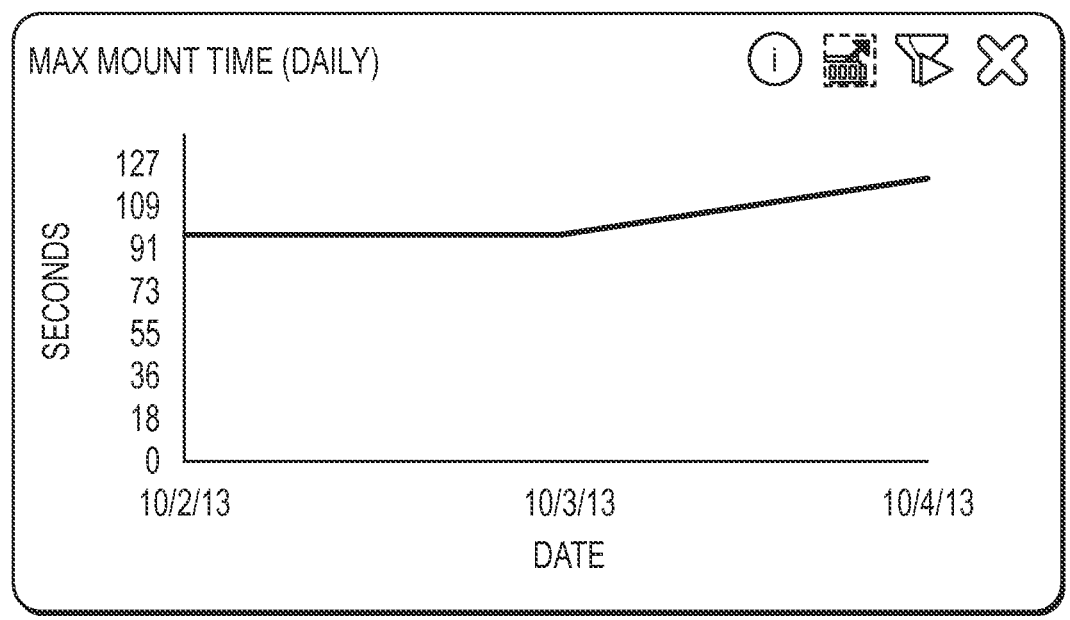
Figure 27:
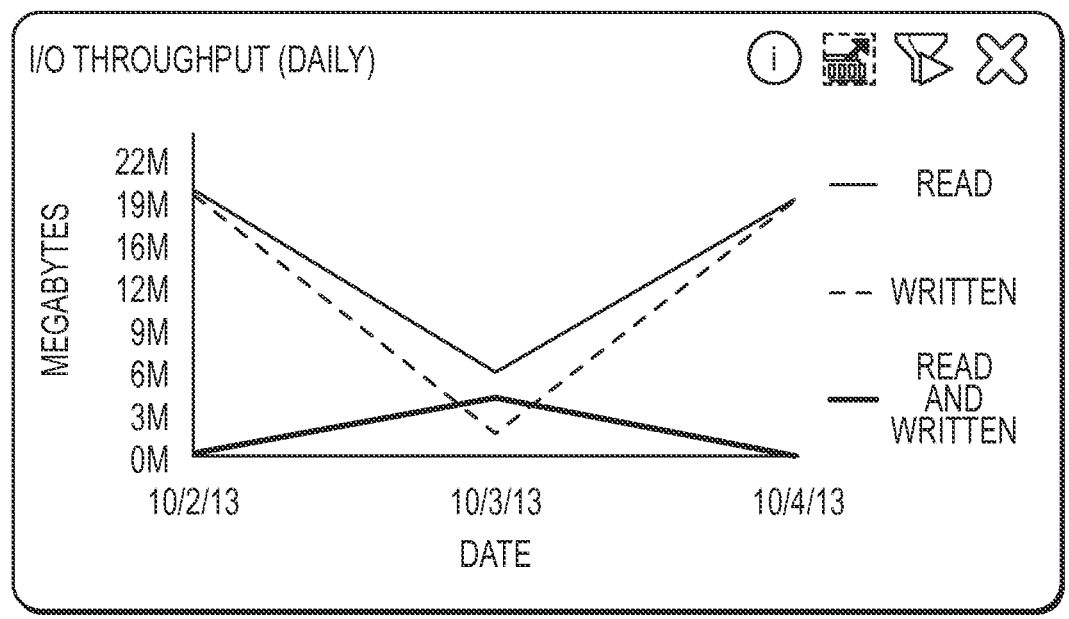

In FIG. 25, a portlet 2500 is shown that may be included in a dashboard (and defined in a stored template). The portlet 2500 provides a mounts graph showing, over a predefined time period, the number of mounts across selected libraries that an STA application is presently monitoring for an STA user. In FIG. 26, a portlet 2600 is shown that presents a maximum mount time graph. This graph displays the maximum mount times (time from slot until loaded in a drive via a robot and tape loaded) for mounts. In FIG. 27, a portlet 2700 is illustrated that is configured to display an I/O throughput graph. The I/O throughput graph shows the sum of megabytes read, written, and combined (with differing lines) across user-selected libraries.

Figure 28:
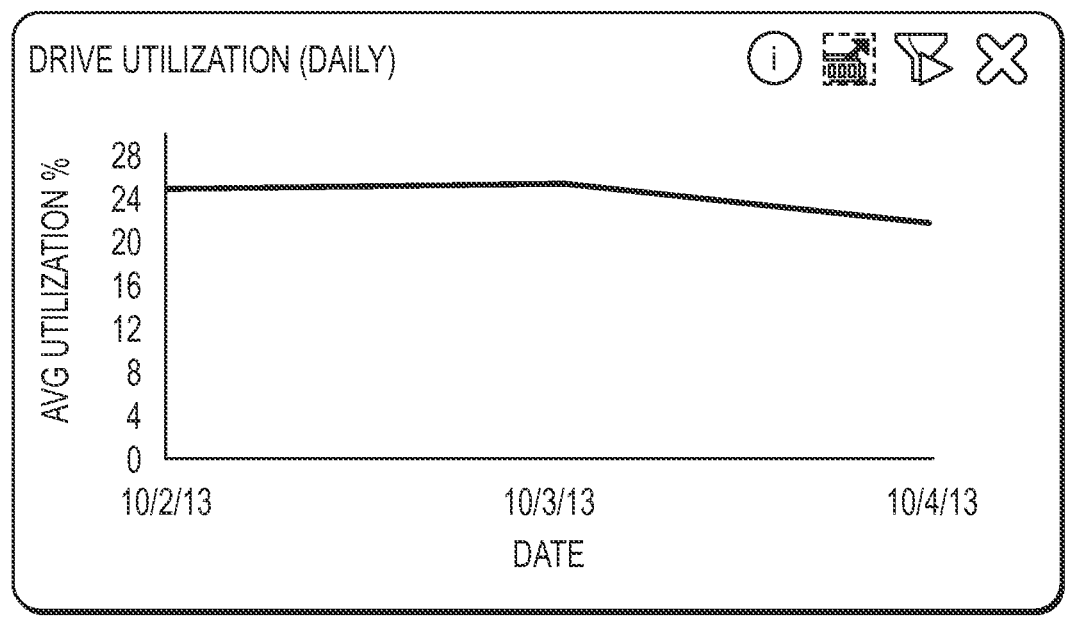
Figure 29:
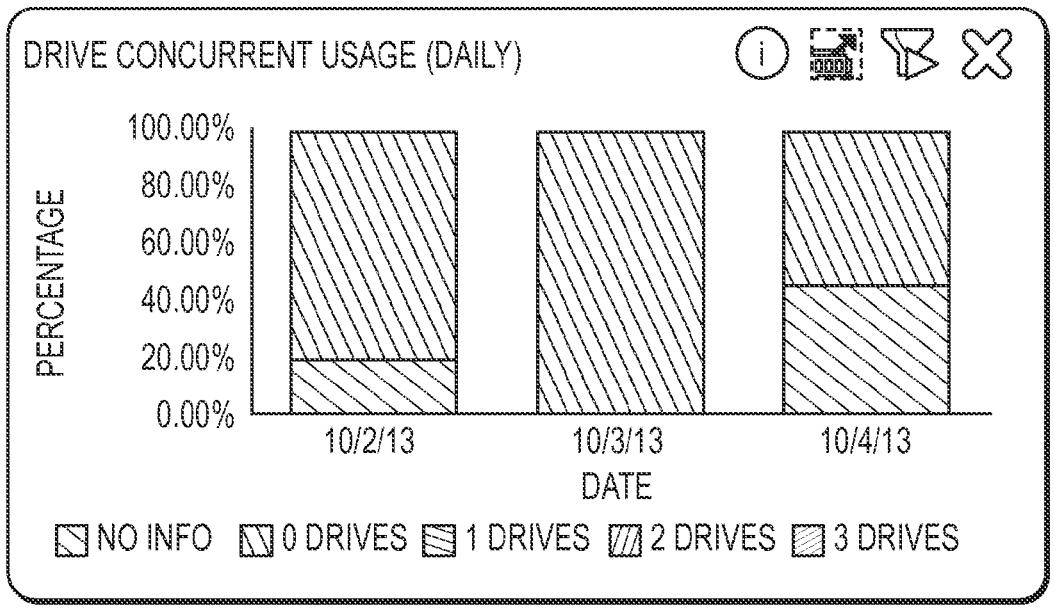

FIG. 28 illustrates a portlet 2800 that is configured to show a drive utilization graph, which shows the percentage of time the user-selected drives were occupied. In FIG. 29, the portlet 2900 is shown to provide a drive concurrent usage graph. This graph displays the number of drives concurrently in use during the specified time period. Each stacked bar in the graph of portlet 2900 breaks down the percentage of time that the indicated number of drives were concurrently in use.

Figure 30:
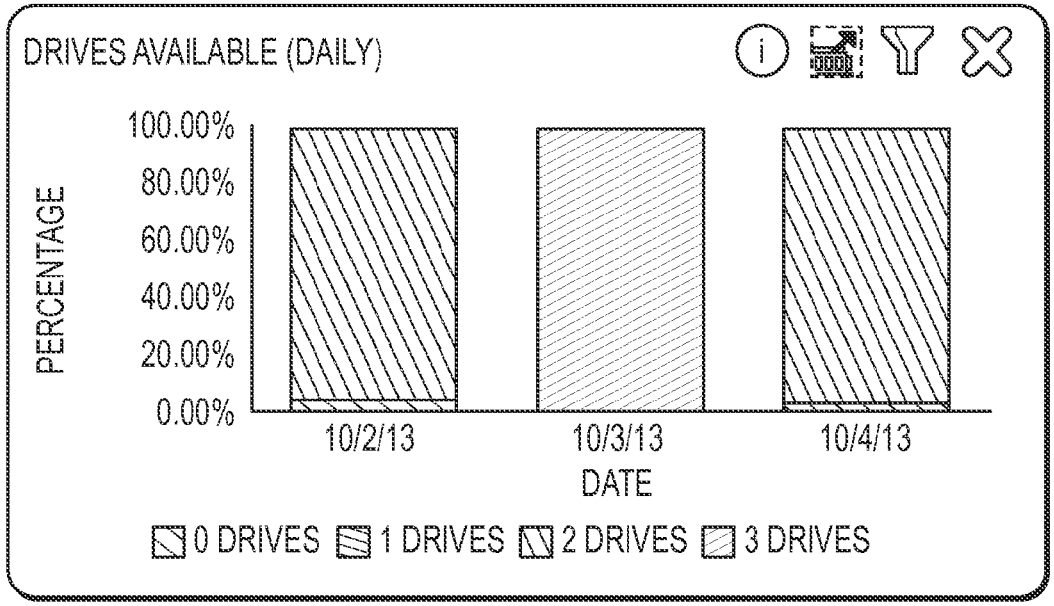
Figure 31:
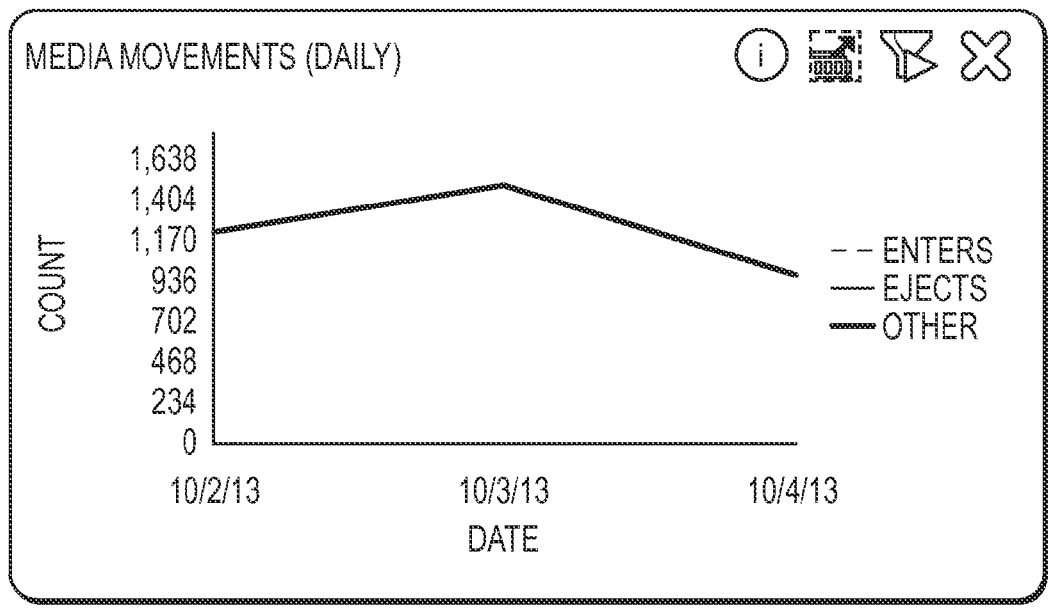
Figure 32:
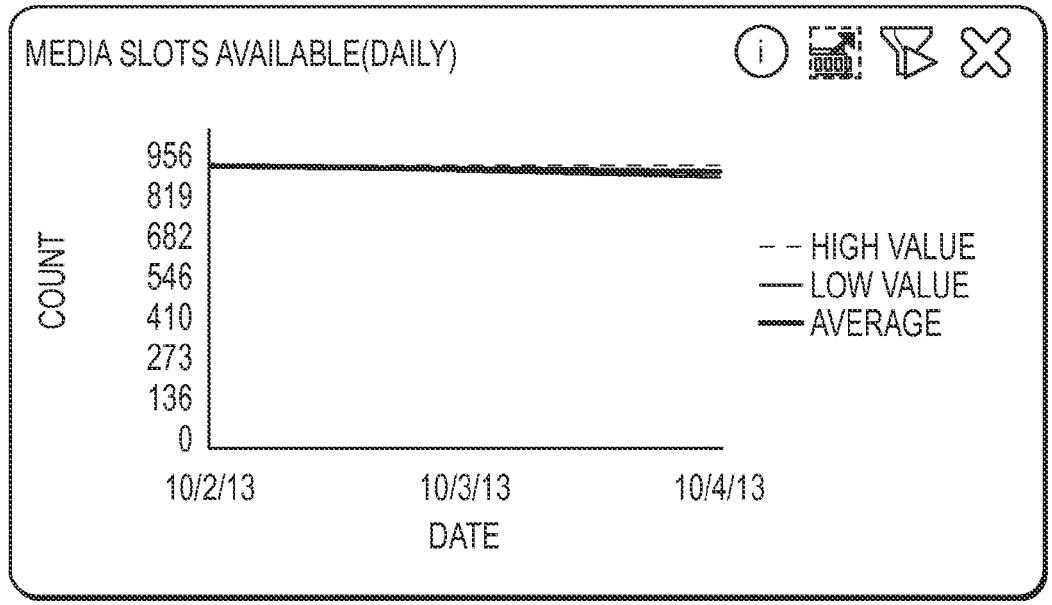

FIG. 30 illustrates a portlet 3000 that is configured to show a drives available graph, which displays the number of drives concurrently available during the specified time period. Each stacked bar, in this non-limiting example, breaks down the percentage of time that the indicated number of drives were concurrently available. FIG. 31 provides a portlet 3100 with a media movements graph, which displays the total number of media that were entered, ejected, or otherwise moved (e.g., over all the libraries the STA application is monitoring for the STA application user). In FIG. 32, a portlet 3200 is provided that displays a media slots available graph, which shows the number of available media slots. This graph is shown to include the high, low, and average available slot count over the monitored time period.

Figure 33:
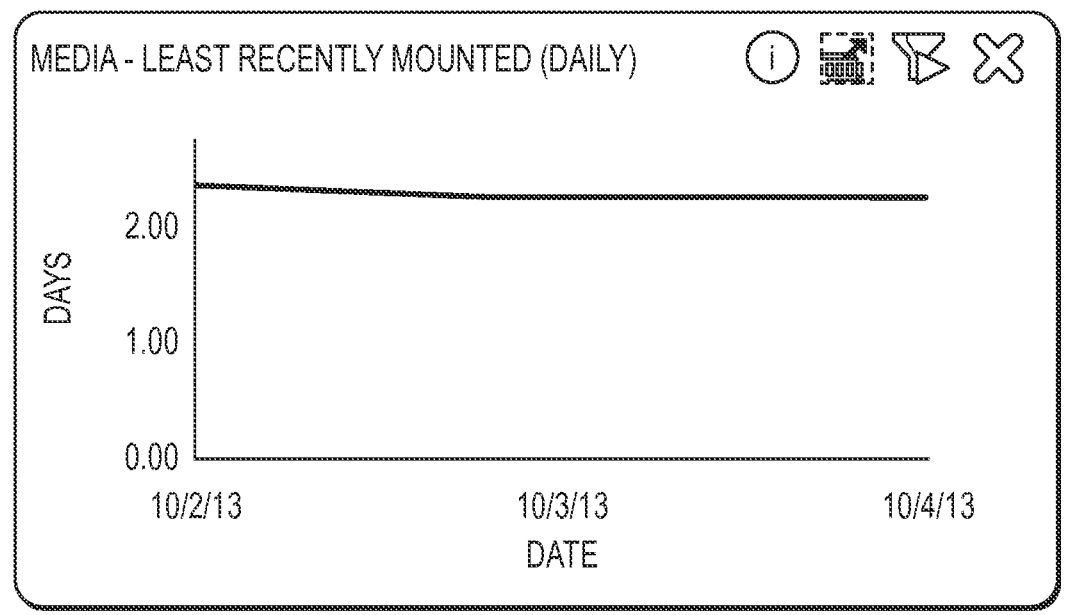
Figure 34:
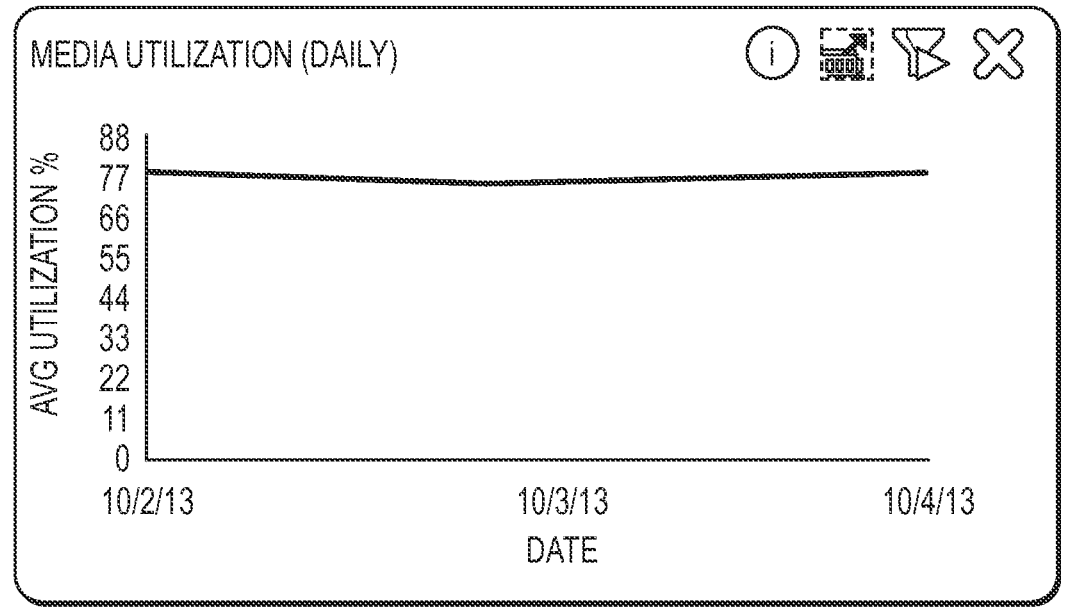
Figure 35:
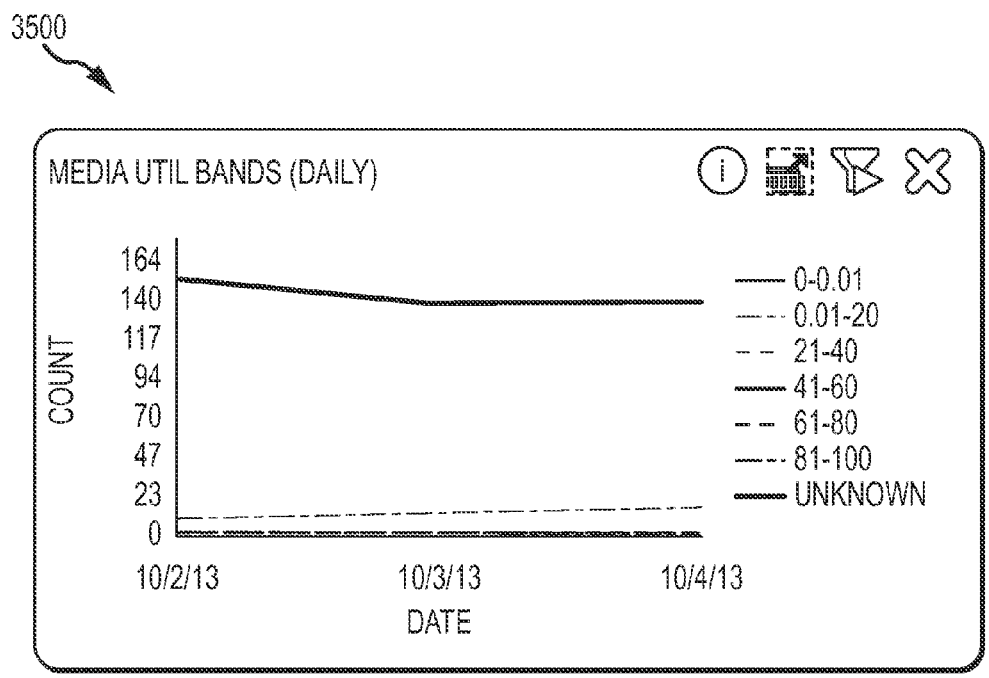

FIG. 33 provides a screenshot of a portlet 3300 configured to display a media-least recently mounted graph that shows the longest time since the prior exchange for any particular piece of media. In FIG. 34, a portlet 3400 is shown that includes a media utilization graph, which displays an estimate of the average "fullness" of the selected media for which activity has been recorded by the STA application. FIG. 35 provides a portlet 3500 that displays a media utilization bands graph. This graph displays an estimate of the amount of media that is used within the cartridges. In this example, the bands used are 0 to 0.01 percent, 0.01 to 20 percent, 21 to 40 percent, 41 to 60 percent, 61 to 80 percent, 81 to 100 percent, and unknown, but other embodiments may use other bands in portlet 3500.

Figure 36:
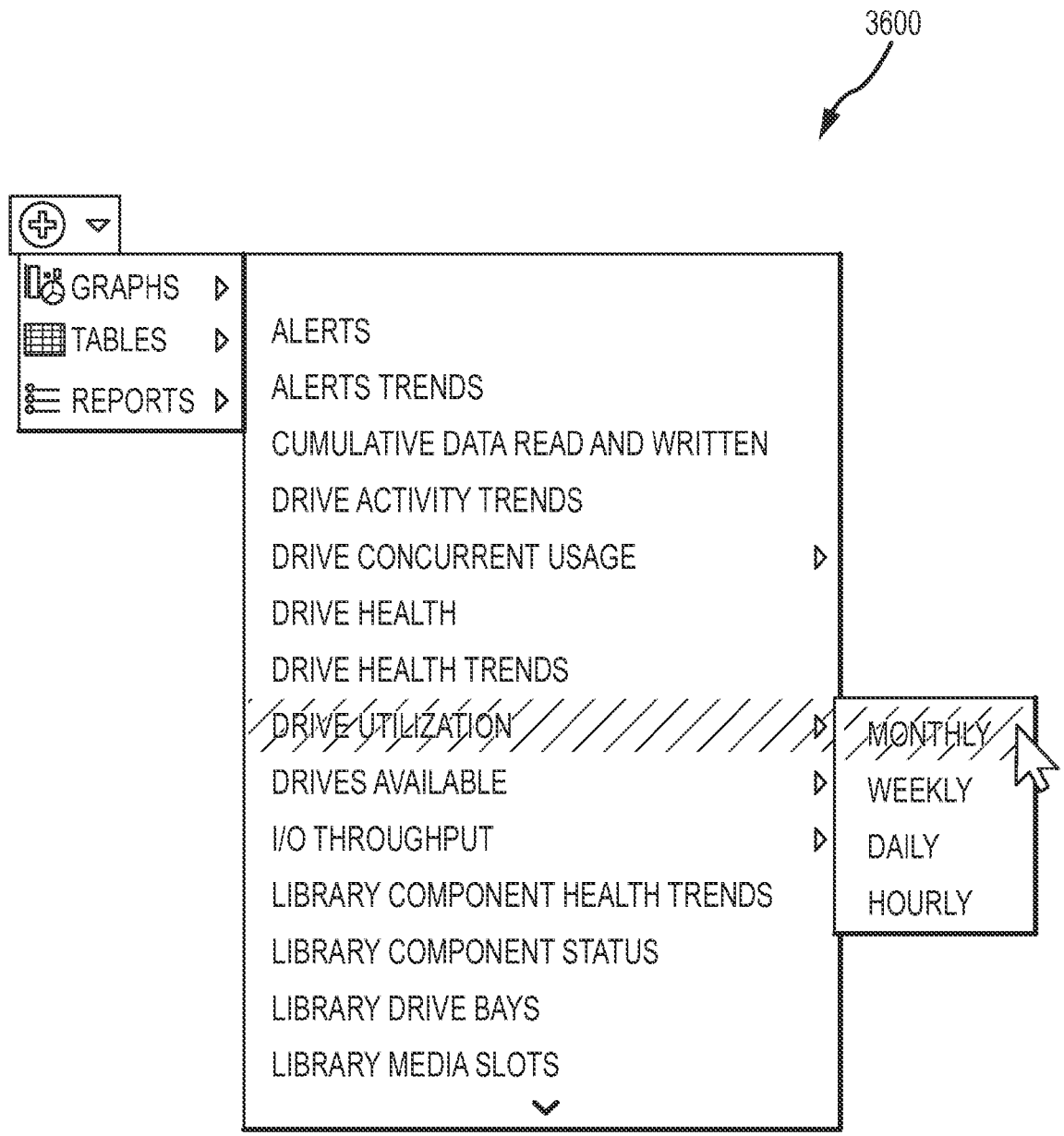
FIG. 36 illustrates a partial screen shot of an STA GUI dashboard that may be used to set granularity for plotting a portlet and its report/graph/table.

The data for the mainframe or nearline reports (and portlets shown in FIGS. 25-35) may be collected on hourly, daily, weekly, monthly, or other time period bases. This data collection period can be thought of as the granularity of the portlet (or its report/graph). A user of the STA application and its GUI may choose which of a number of such granularities to plot when adding one or more of the portlets (e.g., portlets shown in FIGS. 25-35) to a dashboard. FIG. 36 illustrates a partial screen shot 3600 of an STA GUI dashboard that may be used to set granularity for plotting a portlet and any included report/graph/table. As shown in FIG. 36, a user is adding a portlet to display a drive utilization graph, and the user is moving the icon (or mouse arrow) down a set of granularities to select one for use in plotting the graph (e.g., a monthly granularity).

In some implementations of the STA application, the STA application may be configured to support media validation in addition to providing historical, current, and future/predictive health indicators for such media. For example, the adapter, analytics, and user interface modules (modules 346 and 348 in the STA application 340 of FIG. 3) may provide such media validation functionality or, in some cases, the STA application may include an added module (e.g., a media validation module) that perform these functions when the STA application is used to monitor one or more tape libraries. STA GUI screens such as screen 1300 in FIG. 13 may have panels or portlets that support media validation rather than displaying media health information such as shown at 1330 in FIG. 13 or in the dashboard 1810 in FIG. 18.

In one preferred embodiment, media validation is carried out fully or at least in part with a media validation analytics module, which is provided as a subroutine of the STA analytics module (e.g., module 346 of STA application 340 of FIG. 3). This module/subroutine may perform a "lazy" calculation of summaries of data gathered for each piece of media in a tape library, and these summaries are used to provide error detection (identify degraded media) and also to provide media validation suspicion levels. Media validation is useful as it allows the STA application to be more than a mere passive observer of tape library operations. Instead, the STA application can be proactive by providing media validation suspicion (e.g., history may be minimal for a piece of media such that have to provide suspicion levels). Media validation is also useful because it can be difficult to determine health of media when the STA application receives tapes from outside sources (so no history on these tapes and their operations/ health). In some cases, the STA application can significantly speed up time for media validation to be completed with some implementations only requiring one meeting with a drive (e.g., a drive used by the media validation analytics module as a measurements drive).

In some STA implementations, media validation is initiated in a relatively manual fashion. This may involve a GUI being updated to show screens indicating health of media by type, and a user of the STA GUI may be able to drill down to inspect particular pieces of media in a tape library. The user may select a particular piece of media and initiate a thorough evaluation (or "validation") of the selected media. This may involve a scan, and it involves a user actually causing a tape cartridge to be inserted into a drive and read as part of the validation process. Further, the user may even be able to select, via the STA GUI, a drive to use in the testing/validation of the media.

The results of the validation (including reading statistics) are then provided in a portlet of the STA GUI for the selected media and the STA-selected drive or the user-selected drive. A value added by the media validation process is that an analysis is run on the media and recommendations are provided to the user via the GUI (and/or via alerts) such as to replace the media, to monitor the media, or to continue to use the media (media was validated). The media validation run by the STA may be interrupted (e.g., when the media is required for data storage or retrieval during normal operations) and restarted without loss of test results, which are assembled and processed for presentation to the user in the STA GUI.

Instead of manual media validation, the media validation may also be carried out in a more automated basis. For example, media validation may be policy-based, with default criteria being used to identify which media should be validated (e.g., a set of threshold values for one, two, or more criteria are satisfied) or the policies/validation selection criteria may be user-definable or user-selectable policies (e.g., via a drop down list in the GUI or one of its dialog boxes displayed when a user initiates a media validation setup process). Then, the STA application operates to monitor all media and to initiate media validation whenever the set validation policies are met by historical data, current data, or even predictive health indicators for the media. There are several types of automated policies that a user may select when scheduling a media validation. These may include, but are not limited to, policies that support random selection, media health in a given state, period of non-use for a given piece of media, newly entered, bad MIR, periodic review, and the like.

The STA application and corresponding system described herein provides a number of advantages through the provision of media validation. The STA-based media validation uses near real time to test a piece of media and not stale historical data. To this end, the media validation method or process carried out by the STA application may use a drive within the monitored (customer's) tape library to perform the validation test. A dedicated validation/test server and data path is not required to perform media validation. The tests or test steps performed as part of media validation may be reordered by the user and a validation test can be resubmitted.

At this point in the description, it may be useful to describe one useful, but not limiting, example of an STA application configured with an analytics module and user interface module adapted specifically to implement media validation.

In this exemplary STA application implementation, there are three areas in the STA UI where the user interacts directly with the media validation analysis subroutine (or "MV" or "Media Validation") of the analytics module (e.g., via GUI screens): (1) Setup & Administration->Media Validation; (2) Tape System Activity->Media Validation Overview; and (3) Tape System Hardware->Media Overview.

Each of these user interactions is described in detail below, but it may be useful to first discuss some general or often-used MV terminology. First, the following STA validation types may be used (and, optionally, selected by a user) in media validation: (a) Basic Verify: Verifies cartridge is mountable; (b) Standard Verify: Verifies two cross sections of data on cartridge are readable; (c) Complete Verify: Verifies all data on cartridge is correct; (d) Complete Verify Plus: Verifies all data on cartridge is readable including decompression and decryption; and (e) Verify & Rebuild MIR: Verifies and corrects MIR information on cartridge, if needed.

Second, the STA application may be implemented to support a number of STA policies or policy types (again, which may be user selectable via the STA GUI) as defined as follows: (a) Random Selection: Randomly selects cartridges for testing as defined by the policy parameters whenever a validation drive is available for a particular library complex; (b) Media Health=Action: Requests the policy specified validation test whenever X number of successive exchanges that resulted in an Action health for a particular cartridge have occurred; (c) Media Health=Evaluate: Requests the policy specified validation test whenever X number of successive exchanges that resulted in an Evaluation health for a particular cartridge have occurred; (d) Media Health=Monitor: Requests the policy specified validation test whenever X number of successive exchanges that resulted in an Monitor health for a particular cartridge have occurred (note, Action, Evaluate, and Monitor may correspond with three suspicion levels (or predictive health indicators with Action being more serious/degraded than Evaluate, which is more serious/degraded than Monitor); (e) Extended Period of non-use: Requests the policy specified validation test whenever X number of days have passed since an exchange for a particular cartridge has occurred; (f) Newly Entered: Requests the policy specified validation test whenever a cartridge was entered within the last X number of days; and (g) Bad MIR Detected: Requests the policy specified validation test whenever a bad MIR has been detected in a cartridge. The policies may include, but are not limited to, policies that support random selection, media health in a given state, period of non-use for a given piece of media, newly entered, bad MIR, periodic review (e.g., one per year), and the like.

Figure 37:
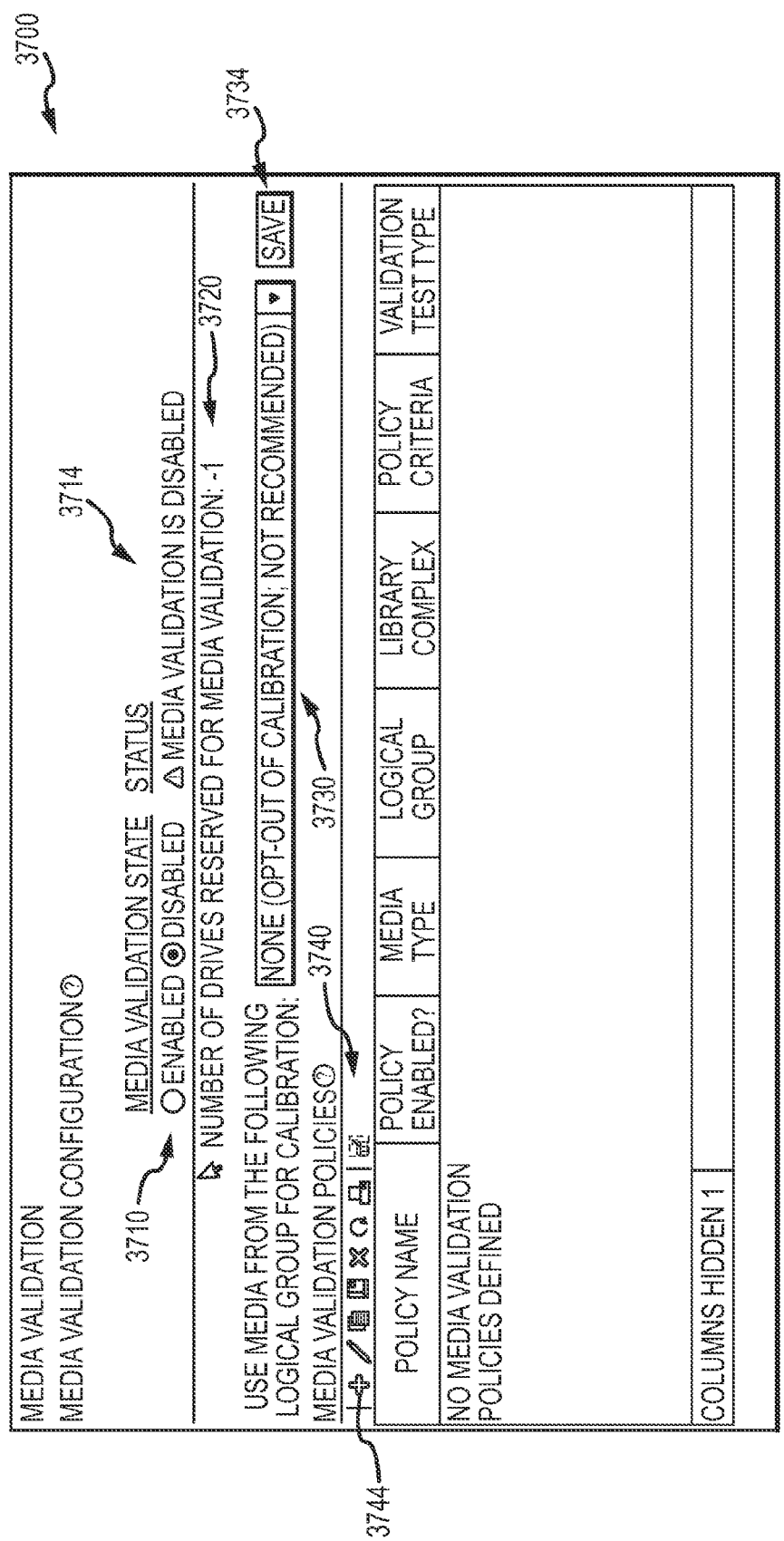
FIG. 37 illustrates a media validation configuration screen provided by the STA GUI module to provide access to media validation functions of the STA application.

With regard to setup and administration, FIG. 37 illustrates a media validation configuration screen 3700 provided by the STA GUI module to provide access to media validation functions of the STA application. At this screen 3700, the user can enable and disable STA MV (e.g., globally for the entire system) as shown at 3710. The user can also see at 3714 the current enable/disable status and, possibly, reasons why (e.g. SNMP version down level) this status exists.

With regard to a set of one or more MV drives in the tape library or libraries, the user can see the number of drives reserved for MV as shown at 3720, and click on that link to see the drives themselves such as on a filtered Drive Overview screen. The user may also initiate a test on the MV drives. With regard to MV media, the user can select at 3730 the media group to be used to qualify MV drives. Further, with regard to MV policies as shown at 3740, the user can add, edit, and delete MV policies. Also, at 3740, the user may enable and disable individual policies.

More specifically with regard to enable and disable at 3710, the user can enable and disable MV for the entire system using the radio buttons. If MV cannot be enabled or has been disabled by STA as a result of checking the configuration or MV test failure, the reason for this will be presented in the status area 3714 when possible (i.e., when the STA application can specify what caused the failure) but, of course, this is not possible in all cases. With regard to the number of drives reserved for Media Validation set at 3710, drives are reserved for MV use at a monitored tape library (or libraries), e.g., by SLC (i.e., not typically within the STA application). The STA application queries the library to find out which drives are reserved and presents the total number here. Clicking this link 3710 will navigate to a drives overview screen, thereby displaying those drives in a MV drive pool.

It should be understood that drive qualification is facilitated by the availability of media to use for testing the drives that can be used from their libraries. The user designates which media can be used for this purpose at 3730. Clicking the "Set" or "Save" button 3734 saves the user's selection. The logical group of drive qualification media should also be set up beforehand by the user to contain media that is: (1) Applicable to the drive(s) being qualified and (2) Suitable for qualification (so called "Gold" media). The MV module will use any and all of the media in this group for qualification. The user can also select no logical group, thereby disabling drive qualification. This is known as 'opting-out' of drive qualification. Opting out may be responded to by requiring user confirmation. If the user selects no media for qualification, a confirmation popup may be caused to appear in the STA GUI requiring the user to a button to confirm they wish to opt out of drive calibration (and what this may mean such as the inability to detect false positives if a drive is degraded due to validating an excessive number of bad tapes). In the UI, this may be called or labeled "Calibration" or the like. Drives and media also can get requalified or calibrated on demand at a later point such as when conditions warrant such further validation steps.

Figure 38:
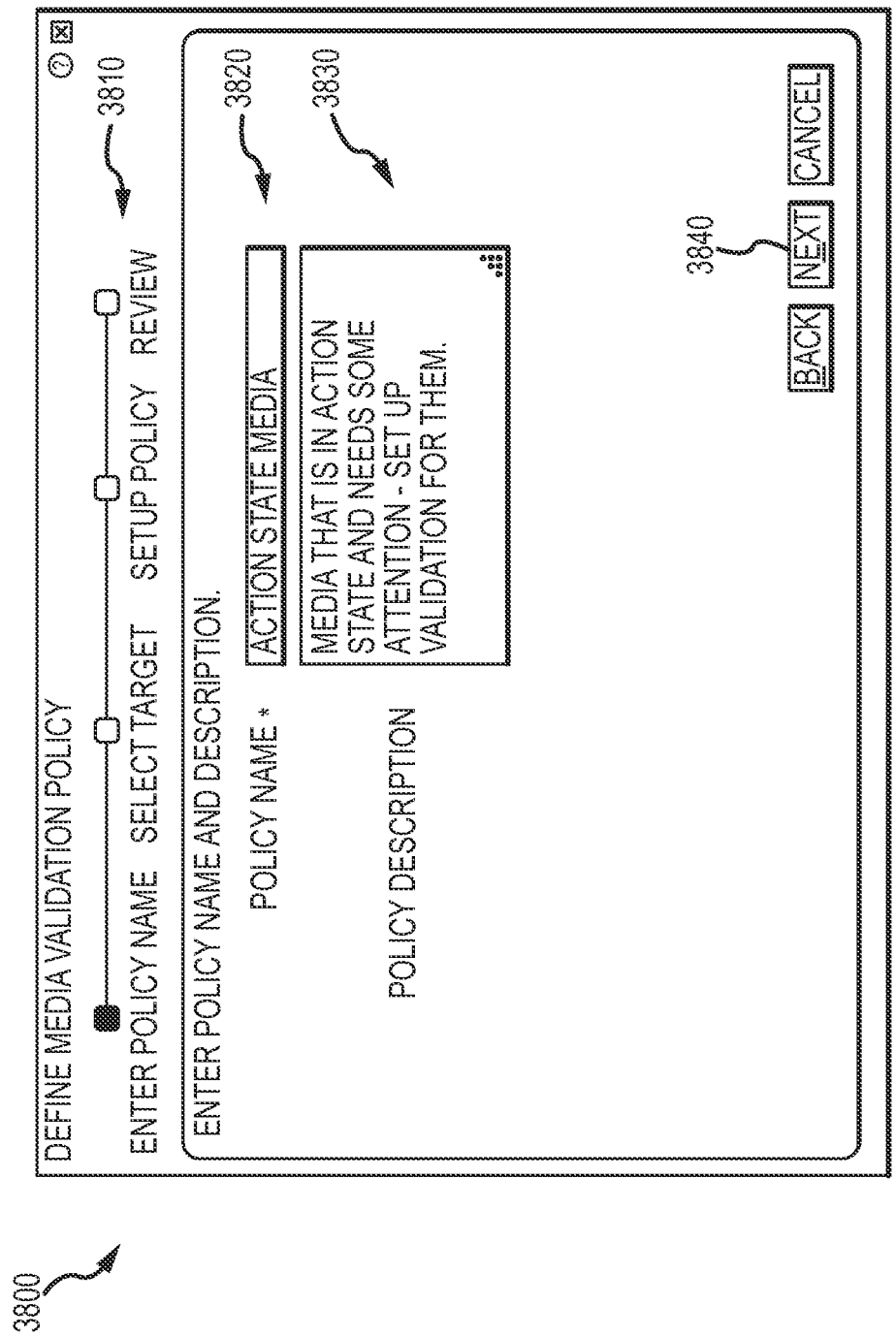
FIGS. 38-42 illustrate screens that may be provided in an STA GUI during a media validation policy setup/definition by a user.

A new policy can be created using the "+" button 3744 on the screen 3700, and the STA GUI module may respond by providing the user a wizard as shown in the define media validation policy screen 3800 of FIG. 38. The screen 3800 provides a workflow bar at 3810 showing the validation creation progress, and, as part of step one, the user is prompted in boxes 3820 and 3830 to enter a policy name and description, respectively. Then, when this is completed the user is prompted to select a next button 3840.

Figure 39:
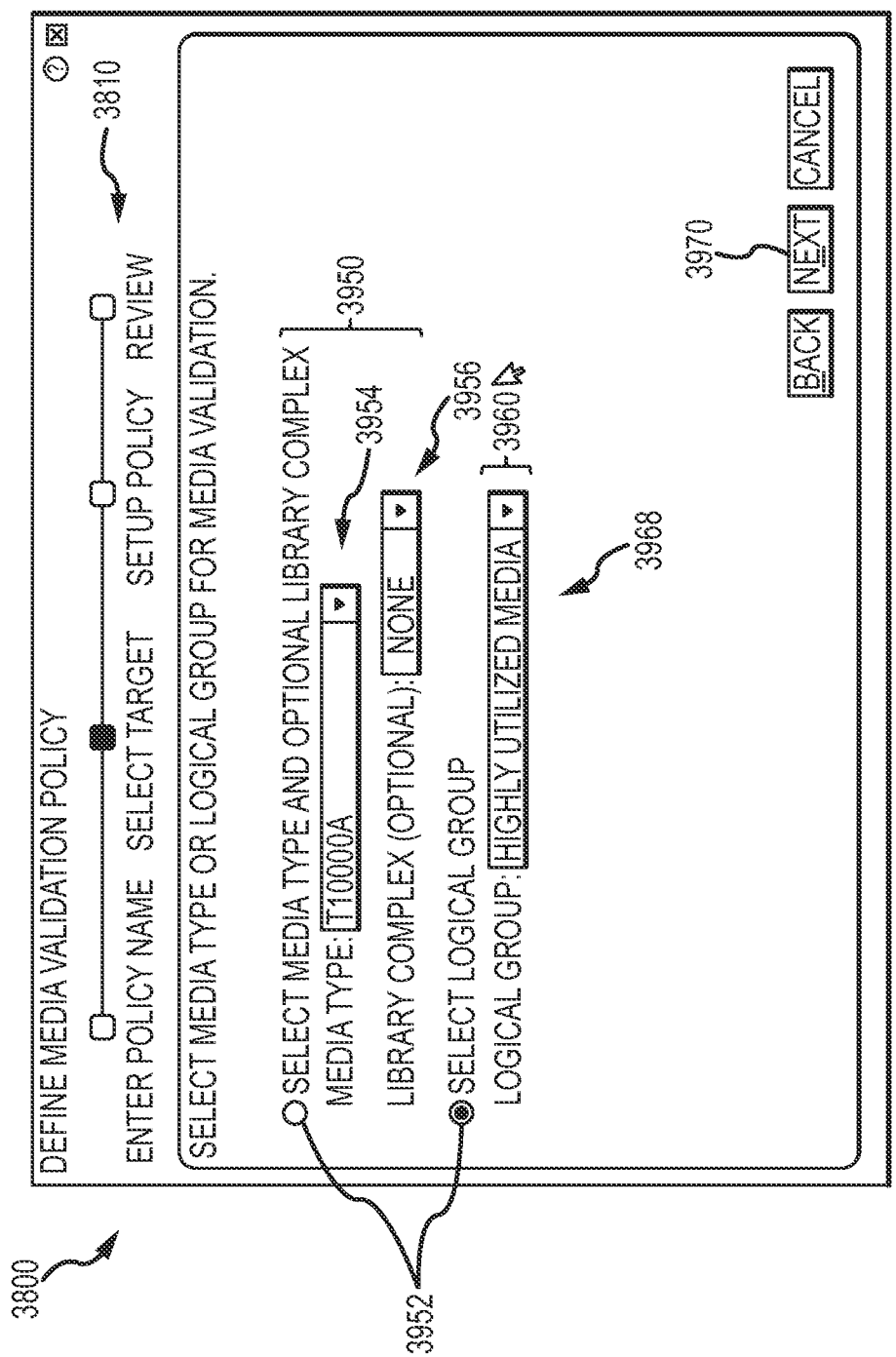

In response, as shown in FIG. 39, the screen 3800 is updated as shown with workflow bar 3810 moving from an enter policy name stage to a select target stage (e.g., proceeding to a second step). Further, the user may select either of the buttons 3952 in the screen 3800 to define the media validation policy by setting a media type and optional library complex at 3950 or by setting a logical group at 3960. If the user selects media type then the user can choose a media type from drop down list at 3954 and optionally choose a library complex at 3956. If the user selects (as shown) to choose a logical group, the drop down list at 3968 may be used to define which logical group to use for media validation under this particular validation policy (note, the logical groups would be defined beforehand to support the defining of media validation policies). When this is complete, the user may choose a next button 3970 to proceed with the validation policy definition process (or to step 3).

Figure 40:
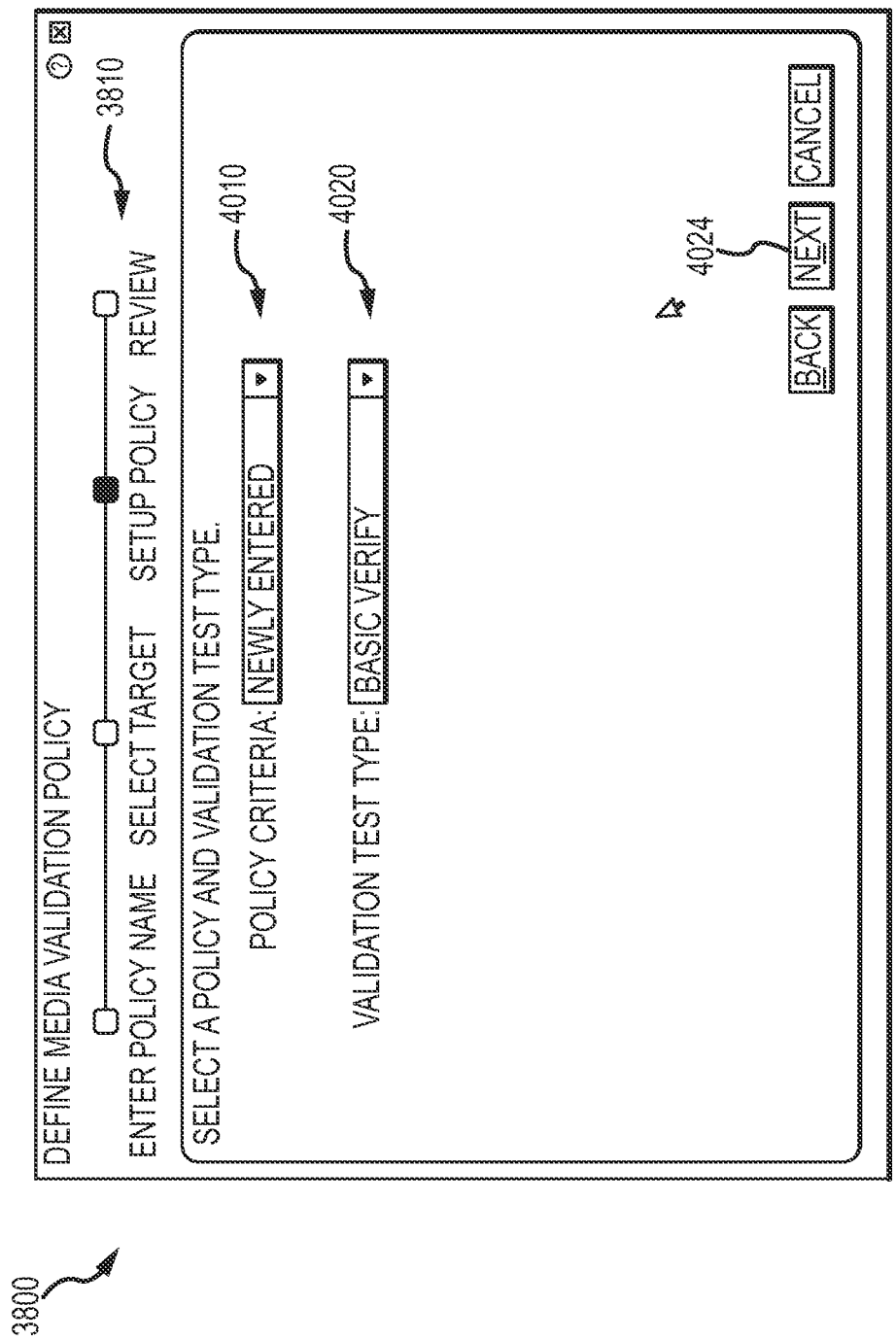
Figure 41:
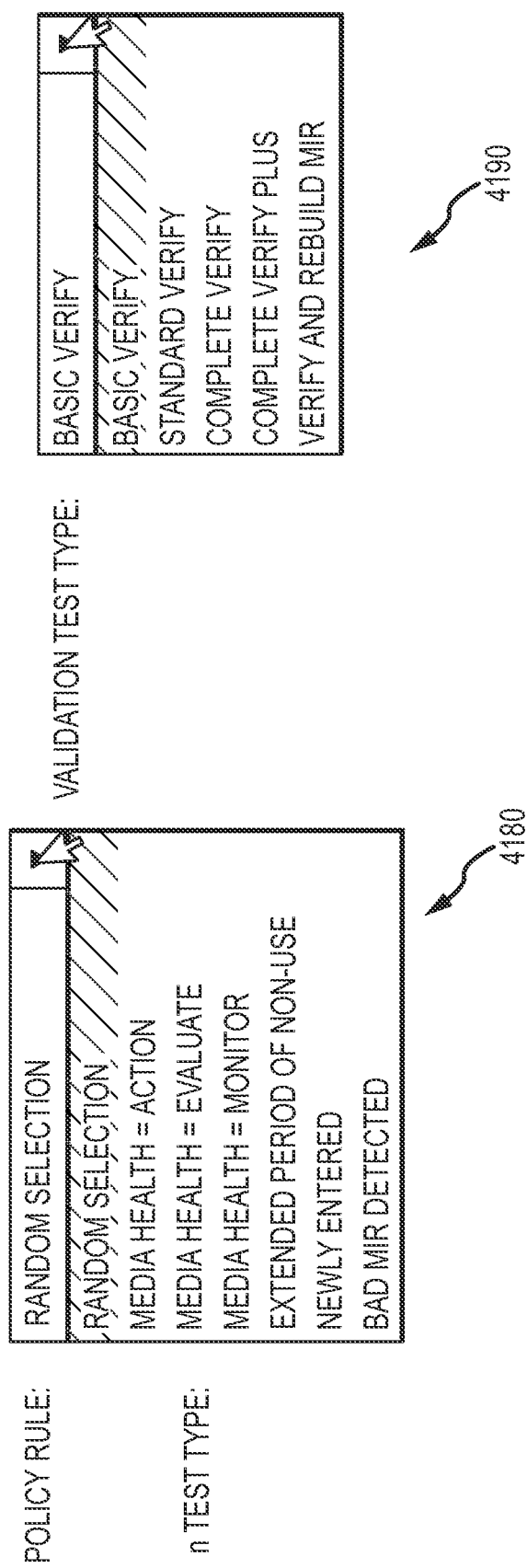

In response, as shown in FIG. 40, the screen 3800 is updated by the STA GUI module with workflow bar 3810 moving from a select target stage to a setup policy stage (e.g., proceeding to a third step). As shown, the user may now use dialog box 4010 with a drop down list to select a policy criteria (set policy rule) and use dialog box 4020 with a drop down list to select a policy validation test type. Note, additional policy parameters for day and exchanges may be presented/selected for certain policy rules. FIG. 41 shows the selections that may be provided in the drop down list for policy criteria at 4180 and for validation type at 4190. The user may then choose the next button 4024 to proceed to the next step of the validation policy definition process.

Figure 42:
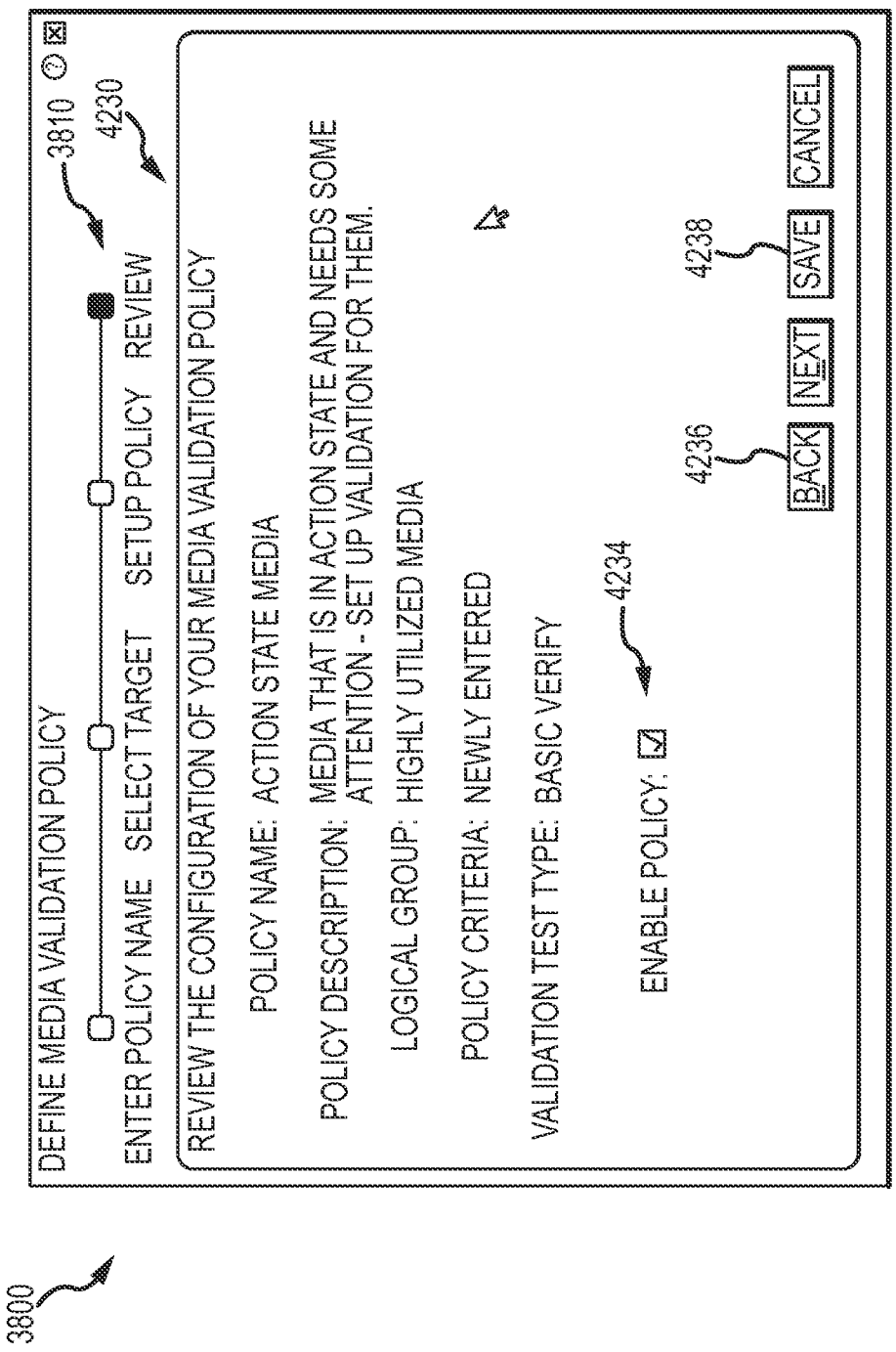

In response, as shown in FIG. 42, the screen 3800 is updated by with workflow bar 3810 moving from a setup policy stage to a review stage (e.g., proceeding to the fourth step). A panel 4230 is presented to allow the user to view and review all the selections they have made in the prior steps toward defining a new media validation policy. If corrections/changes are desired, the user may select a back button 4236 to return to a prior screen. Further, the user may choose at 4234 to enable the policy that has been created after they complete their review via panel 4230. Next, the user may decide to save the MV policy by selecting the save button 4238. Editing a policy can follow the same steps as adding a policy, with the information from the selected policy already filled in the wizard. Further, copying a policy follows the same steps as adding a policy, with the information from the selected policy already filled in the wizard. The user can choose a new name for the copied policy.

Figure 43:
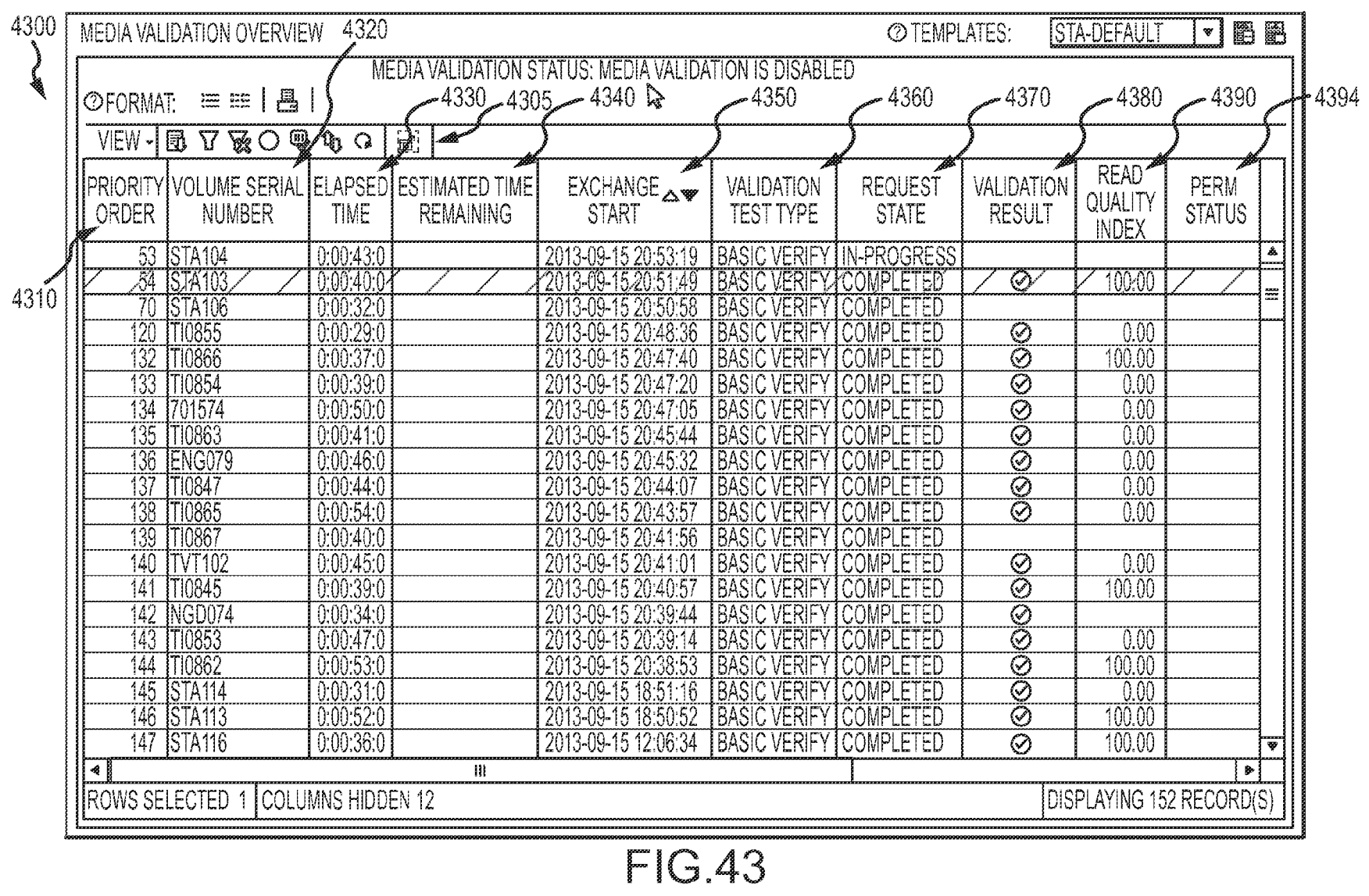

FIG. 43 illustrates a screen 4300 that provides a media validation overview. The media validation overview screen 4300 may include completed, in-progress, and pending MV activities. A number of columns may be provided in tabular form to provide MV relevant information (e.g., a media validation InfoSet) including: a priority order column 4310, a volume serial number column 4320, an elapsed time column 4330, an estimated time remaining column 4340, an exchange start column 4350, a validation test type column 4360, a request state column 4370, a validation result 4380, a read quality index 4390, and a permanent status 4394 (with the information believed to be apparent with review of the titles of these columns and the data displayed in FIG. 43).

The toolbar 4305 contains operations available on the MV queue, with these operations including (from left to right in FIG. 43): Export table (to XLS, CSV, or PDF); Filter table; Reset Filter; Cancel media validation; Resubmit media for validation; Reorder validations; Refresh table; and Detach table. With regard to the cancel operation, pending or in-progress MV's can be successfully cancelled. One or more rows can be selected to enable this action. With regard to the resubmit operation, one media validation can be selected at a time for a resubmit. A row can be selected to enable this action. The media selected for resubmit should not already have a pending or in-progress validation. When resubmitting, the user typically chooses a test type and, optionally, the drive to run the test on. With regard to the reorder operation, clicking the reorder icon may be responded to by generating a dialog that allows the user to reorder the pending MV operations.

Media validations can be interrupted for a number of reasons. A previously interrupted media validation can be rescheduled and, hence, the validation resumed at a future point. Resuming an interrupted validation could also take one of many flavors (or could be performed in a number of ways). For instance, it could be resumed from the point at which it left off. It could also be resumed at the point where new data was appended. In other cases, validation may be resumed and restarted at the beginning of the tape. Each resuming technique may be useful to serve a different purpose or goal.

Figure 44:
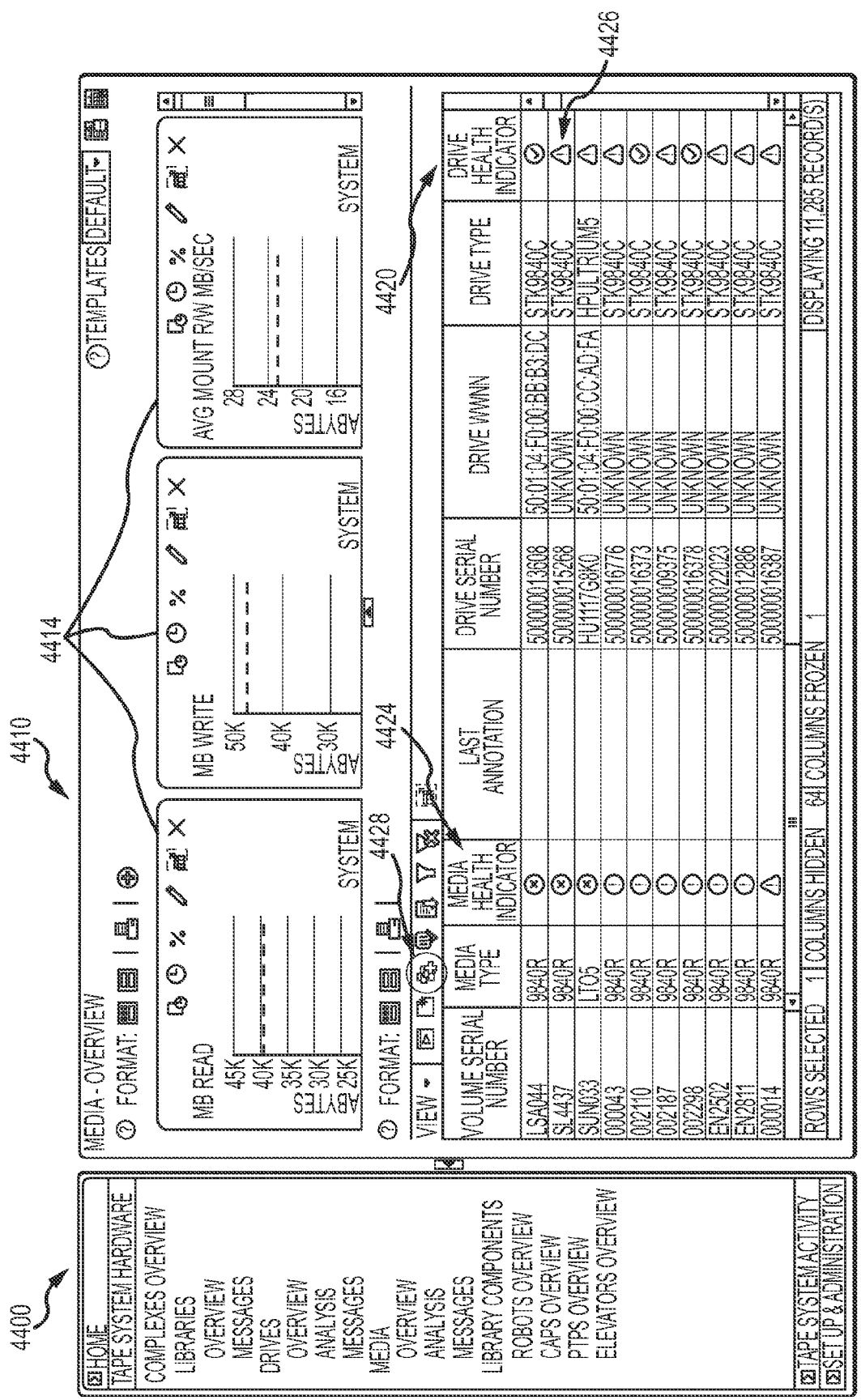
FIG. 44 illustrates an STA GUI screen with a media overview panel including a table that with a toolbar that allows media validation to be manually initiated by a user of the STA GUI.

FIG. 44 illustrates an STA GUI screen 4400 with a media overview panel 4410. The overview panel 4410 includes a number of graph portlets 4414 (e.g., MB read, MB write, and average mount R/W in MB/sec) and also includes a media table 4420 providing a variety of STA-gathered data on media in a library including media heath (as shown by media health indicator column 4424). A user may select a row (e.g., a piece of media) or rows (e.g., a number of media) as shown at 4426, and, in response, the user may be able to select an icon 4428 to manually initiate a media validation on this media. The MV initiation action typically is disabled if no media are selected by the user in table 4420.

An initiate MV pop-up may be shown when media is selected as shown at 4426 and the media validation button 4428 is selected from the media overview table 4420. If the selected media are valid (can be used in an MV process), the STA GUI may be updated to provide drive options for the media validation (when all the library complexes for the selected media are the same). If no media selected are valid, an error message can be displayed to the user in the STA GUI and provide the user the option to cancel the initiated media validation. If some of the media selected are valid validation choices, the STA GUI can be operated to provide a warning message with only the valid media that have been selected being displayed in the media validation table 4420. If all the selected media are valid, a plain text message may be displayed providing the count for the selected media. When initiating media validations manually, the user typically selects the validation test to run (e.g., basic verify or the like). They may also select a drive for the validation (but, note, drive selection may not be available when the library complexes for the selected media are different). After the user has submitted the new media validations (e.g., by clicking a create button or the like), these MVs may be provided on the media validation overview screen 4300.

As shown in FIG. 43, validation results for each media selected for validation may be provided in column 4380, and these results may include unknown (validation results not complete or the like), use (media passed MV), marginal (e.g., MV indicated an issue such as a suspicion level/percentage rate greater than a first and second threshold level), and failed (e.g., a suspicion level/percentage rate greater than the second threshold level). Column 4390 may provide real time updates to the media's read quality index (RQI) to assist analysis of actions to take based on the MV results in column 4380.

The MV algorithm implemented using RQI, which is the amount of reserve capability for error correction to correct data errors. Edge damage or scratches can indicate a low RQI meaning there is little left of error correction capability to read data. Any further damage may result in a permanent read error. False low RQI risk may be caused by debris or high-amplitude off-tracking (but these rarely repeat), and this difference is one reason STA MV is effective as it measure repeating low RQI measurements, which increases the suspicion of marginal recording with the media/tape. In some embodiments, STA MV may involve automatically retrying low RQI events within a drive in order to return a confident indication of marginal recording (but repeat testing is not required).

RQI may be obtained by: (1) finding the first non-zero MSC counter starting with MSC (n=16); (2) if count <1000, occurrences=count, else occurrences=999; and (3) then RQI equals ((16−n)*1000)+(1000−occurrences). Corrections are reported by bin counts. There are 16 bins, one of each quantity of correction that can occur. These are referred to as the MSC(n) (Multi-Symbol Correction) counters, where "(n)" is the number of bytes corrected. Bytes are referred to as symbols in the error correction community. The sixteen MSC counters can be used to generate a single value that is a meaningful measure of read margin, called RQI. The value is designed to be "higher or better" and "lower or worse." The value indicates margin and occurrence quantity.

In other or the same cases, a data quality index (DQI) may be obtained and used in validation. DQI is a measure of the amount of error correction left on the media. DQI is similar to RQI, but DQI is targeted specifically to the media because it factors out the drive's contribution. During drive calibration and qualification, the STA application may use the DQI to determine whether the drive is qualified or disqualified. DQI can be reported as a percentage, with a relatively high value being desirable.

A variety of validation algorithms may be used to perform media validation using the STA application. However, at this point, it may be useful to discuss a couple of specific examples that may be provided with the analytics module of an STA application. For an T10000D reading A/B/C/D, the following suspicion algorithm may be performed to provide STA MV: (1) initialize the STA MV environment by (a) qualifying a high RQI, zero retry drive and tape (e.g., these will become gold drive or qualifying (Q)-drive and gold tape or Q-tape); and (b) qualifying additional tapes with a lower limit of 75 percent (or other threshold) RQI (e.g., these will become the pool of Qn-tapes, with more than one being useful for reducing excessive wear on a single tape); and (2) validate customer tape or media selected for validation as follows: (a) pass—tape is good and exit STA MV; and (b) fail—resulting in rechecking the drive (e.g., standard verify) using a Qn-tape to minimize false positive due to drive failure (if the drive passes, the first drive was correct in calling customer tape bad but if drive fails, the first drive is in question (the first drive may be cleaned and verified using a Q and a Qn tape (if both tapes pass, clean likely worked and customer tape is bad; if only Qn tape fails, tape Qn and customer tape is likely degraded; if only the Q tape fails, the validation can be re-initialized and started over; if both tapes fail, the validation can be re-initialized, started over, and the first drive is likely bad))).

For an T10000C reading A/B/C/D, the following suspicion algorithm may be performed as part of STA MV: (1) initialize the STA MV environment (as discussed above for T10000D); and (2) validate customer or user-selected tape/media as follows: (a) pass—tape is good and exit STA MV; and (b) fail—resulting in forcing an application-initiated retry (up to some predefined number such 3 retries), drive continues to verify to next low-RQI or EOD, and the drive is re-checked using Qn tape to minimize false positive due to drive failure (if the drive passes, the first drive was correct in calling customer tape bad but if the drive fails, the first drive is in question (the first drive may be cleaned and qualified using a Q and a Qn tape (if both tapes pass, clean likely worked and customer tape is bad; if only Qn tape fails, tape Qn and customer tape is likely degraded; if only Q tape fails, the validation can be re-initialized and started over; if both tapes fail, the validation can be re-initialized, started over, and the first drive is likely bad))).

As discussed above, the results of MV for selected piece of media (or tape cartridge) may be: (1) "use" which corresponds with a tap passing validation when used in a certified drive in the STA-monitored tape library (an STA customer's or user's library); (2) "degraded" which may correspond with an RQI of less than some minimum threshold (e.g., 20 to 50 percent with 25 percent used in some implementations as the minimum RQI) or a read PERM; and (3) "failed" which may correspond with a read PERM in some cases. Each of these results may be represented or highlighted in the STA GUI in a visual manner such as with coloring of boxes/rows including the media or the validation results. In one example, red is used for a failed result, orange is used for a degraded result, and green is used for use result. In some STA GUI embodiments, the results (with or without color coding or other visual techniques) are used to update health indicators for media that has undergone MV.

In some cases, the degraded result or label may be the result of the tape having a low RQI (e.g., RQI<25 percent) and additional verification such as passing of the Qn tape or a low RQI for the Qn tape (e.g., RQI<25 percent or standard PERM) but passing of the Q tape (as discussed above). A failed result or label may occur when the tape has a low RQI and also both the Qn and Q tapes fail (e.g., RQI<25 percent or PERM).

Drives (e.g., the T10000C, the T10000D, and other drives) may be configured to perform a variety of media validation tests using the STA application. When a user of the STA application defines a media validation policy or initiates a manual media validation, the user may indicate via a UI which type of test to perform. The tests may include a basic verify test that verifies that the media is mountable and the media information record (MIR) is valid. In this test, the drive simply mounts the media and validates the MIR. This validation detects whether the MIR is unreadable or out of sync and also updates the following data attributes for the media: (1) exchange recording technique (i.e., recording format used by the drive to write to the media); (2) media suspicion level; and (3) MB written (i.e., total amount of data written to the media). In some implementations, the basic verify takes approximately two minutes to complete.

The test chosen by a user may be a standard verify that verifies that the highest priority areas of the media are readable. The drive verifies records at the beginning of the tape (BOT), end of data (EOD), and the outer-most wraps of data written on the top and bottom edges of the tape. This method typically takes about 30 minutes (maximum) to perform, regardless of the amount of data and the compression ratio used. Note, this test is typically not valid for blank tapes.

In other cases, the validation may involve a complete verify test that verifies that all data records on the media are readable. The drive does a record-by-record verification with no decompression and no decryption. By default, the validation starting point can be the beginning of the tape (BOT). Optionally, a user may choose to resume validation from the last verified location as indicated, for example, by the media radio frequency identification (RFID) chip. The drive validates data at maximum tape velocity, regardless of the compression ratio used on the media. This method may take hours to complete (e.g., 5 to 9 hours or the like), depending on the starting point, the amount of data on the media, and the drive type. Again, this test is not valid for blank tapes.

The media validation may involve running a complete verify plus test that verifies that all data records on the media are readable and may also involve additional checking such as StorageTek's Data Integrity Validation (DIV) checking. If the data records on the media include DIV cyclic redundancy check (CRC) codes added by the host, the data is decompressed and decrypted. Consequently, this test requires the validation drive to be encryption capable and connected to an Oracle Key Manager (OKM) or similar component. This test is not valid, in some cases, for drives configured with a FICON interface. By default, the validation starting point is the beginning of the tape (BOT). Optionally, the user may choose to resume validation from the last verified location, as indicated, for example, by the media RFID. This method can take hours to run (e.g., 5 to 9 hours or the like) depend on the starting point, the amount of data on the media, the drive type, and the compression ratio. This test is also not valid for blank tapes.

In other cases, the test chosen may be a verify and rebuild MIR test that verifies the MIR and rebuilds it if necessary. The drive, in this test, may first verify the MIR. If there are errors, the drive acts to find the last know good spot on the MIR, then does a high-speed locate to that point on the tape. The drive then does a record-by-record verification with no decompression and no decryption. If the MIR is invalid or out of sync, the drive reads all records starting from the beginning of tape (BOT) to gather the information necessary to rebuild the MIR and then rebuilds it. Records are not typically decompressed or decrypted. This is a useful test if there is a corrupt MIR on an exchange. The drive reads the data at maximum tape velocity. This method may take hours to complete (e.g., 5 to 9 hours or longer) depending on the starting point, the amount of data on the media, and the drive type. This is typically significantly faster than rebuilding the MIR, e.g., with a drive Virtual Operator Panel (VOP) or other process.

Drive calibration is a one-time setup process that begins as soon as drive calibration is enabled such as on a media validation screen. All drives in the validation pool are tested such as with the standard verify test, which may take one to two hours or more per drive. Once drive calibration is configured and enabled, it proceeds automatically with no need for manual intervention. If a new drive is added to the media validation pool, the STA application detects this and automatically begins calibrating the drive. The STA application also automatically recalibrates drives after a firmware update.

Calibration typically uses the following basic process. First, the STA application performs two standard verify validations for each drive, each time using a different media from the calibration media logical group. Second, the STA application analyzes the data quality index (DQI) values from the validations. For a drive to be qualified, the following criteria may be set and then have to be met: (a) one media must have a DQI greater than or equal to 75, and this is assigned to the drive as the primary calibration media; and (b) one media must have a DQI greater than or equal to 50, which is assigned to the drive as the secondary calibration media. Third, depending on the DQI results, the STA application proceeds as follows: (a) if both criteria are met after two validations, the drive is calibrated (a third validation is not necessary for this drive; (b) if only one of these criteria is met after two validations, a third validation is performed using a different media from the calibration media logical group; and (c) if both these criteria are not met after three validations, the drive is considered disqualified.

With regard to the result of drive calibration, if a drive passes calibration, two media can be assigned to it as dedicated primary and secondary calibration media. During the calibration process, these media are confirmed to be of high quality. Each drive has its own primary and secondary calibration media, and these media are used for all drive qualification activities on the drive. If a drive fails calibration, it is disqualified. Disqualified drives can be assigned a calibration state of "not suitable," and they are not used for any validation activities while drive calibration is enabled. They remain in the media validation drive pool until the user explicitly removes them (e.g., through the user interface or the like). Once all drives have been calibrated, the media validation configuration screen may be updated to display "Drive and media pool setup success—calibration has been successful" or a similar message. Detailed results about individual drives can be displayed via the user interface such as on a Drives—Overview screen or the like, and the user may review the results and take any appropriate actions.

Drive qualification is done to assure that a drive is still calibrated. It is an ongoing process that runs automatically in the background and requires no user intervention. The STA application automatically initiates a qualification whenever a media validation results in a degraded or failed status. During qualification, the drive is tested using a standard verify test in many cases. The test is performed using the primary and secondary calibration media assigned to the drive. Qualification follows a process similar to drive calibration.

The media used for drive calibration and qualification typically have to be assigned by a user to a manual logical group dedicated for this purpose, and this group is labeled or called the calibration media logical group (as mentioned above). There may only be one calibration media logical group for a user's entire tape library system. The user has to assign at least two media for each drive in the validation drive pool, and the media should reside in the same standalone libraries and library complexes as the validation drives. For example, if a user has eight validation drives in one complex and one validation drive in a standalone library, the logical group should include at least 16 media from the complex and two media from the standalone library. However, there is no maximum number of media that the user may assign to the group. In many cases, the user is allowed to add and remove media from the logical group according to their needs, and the STA application detects changes and uses new media as necessary.

With regard to automated media validation, the STA application typically allows the user to define any number of media validation policies, which automatically select media for validation based on a variety of user-defined criteria. For each selected media, the STA generates a validation request, which may be submitted to the STA validation queue. As soon as a compatible drive becomes available, the validation can be started, and this activity may be managed automatically by the STA application. Depending on the number of media validation policies and how they are defined, a single piece of media could potentially be selected for validation several times a day. To prevent this from happening, the STA application may be adapted to limit automated validations to a maximum number (e.g., one per day for each media or the like). Once a validation request has been generated for a piece of media, the STA application will not generate any additional validation requests for it that day (in this example), and the user may override this control function by submitting manual validation requests as desired.

The STA application may be adapted to select media for validation based on any of a number of pre-defined criteria such as the following exemplary criteria: (1) random selection (e.g., randomly select the media for validation whenever a validation drive in the standalone library or library complex is available); (2) media health=action (select media that have had a specified number of successive exchanges resulting in an exchange media health of action (e.g., 1 to 5 or the like)); (3) media health=evaluate (select media that have had a specified number of successive exchanges resulting in an exchange media health of evaluate (e.g., one to five or the like)); (4) media health=monitor (select media that have had a specified number of successive exchanges resulting in an exchange media health of monitor (e.g., one to five or the like)); (5) extended period of non-use (select media that have not had an exchange for a specified number of days (e.g., 365 to 1095 days or the like)); (6) newly entered (select media that have recently been entered into the library; and (7) bad MIR detected (select media with an exchange resulting in a bad MIR detected error (a bad MIR indicates degraded high-speed access on the media).

We claim:

1. A data storage system for monitoring a tape infrastructure including a tape library comprising a plurality of tape drives and a plurality of tape media for use in the tape drives, the data storage system comprising:

a server communicatively linked to the tape library;
on the server, a storage tape analytics application extracting and processing data sets from the tape library corresponding to operations of the tape library including use of the tape drives and the tape media during data storage in the tape library; and
a user interface module providing a user interface for viewing the extracted and processed data,
wherein the user interface is operable to receive user input to initiate media validation of a set of the tape media,
wherein the media validation comprises reading data from each of the tape media in the set using one or more of the tape drives in the tape library, and
wherein the media validation comprises determining a read quality index (RQI) based on the reading data and comparing the determined RQI with a minimum RQI.

2. The data storage system of claim 1, wherein the minimum RQI is 25 percent.

3. The data storage system of claim 1, wherein the set of the tape media is selected based on user input provided via the user interface.

4. The data storage system of claim 1, wherein the set of the tape media is selected, from the plurality of tape media by the storage tape analytics application, when each of the set of the tape media matches a media validation policy defined by user input provided in the user interface.

5. The data storage system of claim 4, wherein the media validation policy is based on a level of media health and wherein the level of media health is assigned to each of the tape media by the storage tape analytics application based on the extracted and processed data.

6. The data storage system of claim 4, wherein the media validation policy is one of: extended period of non-use, newly entered, bad MIR detected, periodic review, and random.

7. The data storage system of claim 1, wherein the media validation can be resumed for one the tape media from where the media validation left off, from where new data was appended to the tape media, or from the beginning of the tape media.

8. The data storage system of claim 1, wherein results of the media validation of the set of tape media are displayed in the user interface and wherein the results of the media validation are filtered, viewed, and placed into templates, exported, or used to generate an alert.

9. A data storage system for monitoring and analysis of a tape infrastructure, comprising:
a tape library comprising a plurality of tape drives and a plurality of tape media for use in the tape drives; and
a storage tape analytics application running on a computer extracting information sets from monitoring data collected from the tape library,
wherein the storage tape analytics application generates a user interface including media validation results generated based on the extracted information sets including insertion of one or more of the tape media in one or more of the tape drives, and
wherein the media validation results are provided by analytics including one of: verifying one of the tape media has an RQI greater than a threshold value in one of the tape drives, verifying the tape cartridge is mountable in the tape drive, verifying a number of cross sections of data on the tape cartridge are readable with the tape drive, verifying all data on the tape cartridge are correct, verifying all data on the tape cartridge is readable including decompression and decryption, and verifying and correcting MIR information on the tape cartridge.

10. The system of claim 9, wherein the one or more of the tape media are manually selected by a user operating the user interface or are automatically selected by the storage tape analytics application based on a media validation policy defined based on user input in the user interface.

11. The system of claim 9, wherein the media validation results include proactive recommendations for the one or more of the tape media.

12. The system of claim 9, wherein the one or more tape drives used in the media validation are calibrated by the storage tape analytics application using one or more validations for each drive using one or more of the tape media.

13. The system of claim 12, wherein the one or more tape drives are qualified for use in the media validation based on data quality index (DQI) values from the one or more validations.

14. A data storage system for monitoring a tape infrastructure including a tape library comprising a plurality of tape drives and a plurality of tape media for use in the tape drives, the data storage system comprising:
a server communicatively linked to the tape library;
on the server, a storage tape analytics application extracting and processing data sets from the tape library corresponding to operations of the tape library including use of the tape drives and the tape media during data storage in the tape library; and
a user interface module providing a user interface for viewing the extracted and processed data,
wherein the user interface is operable to receive user input to initiate media validation of a set of the tape media, and
wherein the set of the tape media is selected, from the plurality of tape media by the storage tape analytics application, when each of the set of the tape media matches a media validation policy defined by user input provided in the user interface.

15. The data storage system of claim 14, wherein the media validation comprises reading data from each of the tape media in the set using one or more of the tape drives in the tape library.

16. The data storage system of claim 14, wherein the set of the tape media is selected based on user input provided via the user interface.

17. The data storage system of claim 14, wherein the media validation policy is based on a level of media health and wherein the level of media health is assigned to each of the tape media by the storage tape analytics application based on the extracted and processed data.

18. The data storage system of claim 14, wherein the media validation policy is one of: extended period of non-use, newly entered, bad MIR detected, periodic review, and random.

19. The data storage system of claim 14, wherein the media validation can be resumed for one the tape media from where the media validation left off, from where new data was appended to the tape media, or from the beginning of the tape media.

20. The data storage system of claim 14, wherein results of the media validation of the set of tape media are displayed in the user interface and wherein the results of the media validation are filtered, viewed, and placed into templates, exported, or used to generate an alert.

21. A data storage system for monitoring a tape infrastructure including a tape library comprising .a plurality of tape drives and a plurality of tape media for use in the tape drives, the data storage system comprising:
a server communicatively linked to the tape library;
on the server, a storage tape analytics application extracting and processing data sets from the tape library corresponding to operations of the tape library including use of the tape drives and the tape media during data storage in the tape library; and a user interface module providing a user interface for viewing the extracted and processed data, wherein the user interface is operable to receive user input to initiate media validation of a set of the tape media, and wherein results of the media validation of the set of tape media are displayed in the user interface and wherein the results of the media validation are filtered, viewed, and placed into templates, exported, or used to generate an alert.

22. The data storage system of claim 21, wherein the media validation comprises reading data from each of the tape media in the set using one or more of the tape drives in the tape library.

23. The data storage system of claim 21, wherein the set of the tape media is selected based on user input provided via the user interface.

24. The data storage system of claim 21, wherein the media validation can be resumed for one the tape media from where the media validation left off, from where new data was appended to the tape media, or from the beginning of the tape media.

* * * * *

UNITED STATES PATENT AND TRADEMARK OFFICE
CERTIFICATE OF CORRECTION

PATENT NO.         : 8,849,784 B2                                                                Page 1 of 1
APPLICATION NO.    : 14/169485
DATED              : September 30, 2014
INVENTOR(S)        : Alber et al.

It is certified that error appears in the above-identified patent and that said Letters Patent is hereby corrected as shown below:

In the Claims

In column 65, line 37, in Claim 7, delete "one the tape" and insert -- one of the tape --, therefor.

In column 66, line 52, in Claim 19, delete "one the tape" and insert -- one of the tape --, therefor.

In column 66, line 62, in Claim 21, delete "comprising .a" and insert -- comprising a --, therefor.

In column 67, line 21, in Claim 24, delete "one the tape" and insert -- one of the tape --, therefor.

Signed and Sealed this
Twenty-eighth Day of April, 2015

Michelle K. Lee
*Director of the United States Patent and Trademark Office*